(12) United States Patent
Shibayama et al.

(10) Patent No.: US 8,608,198 B2
(45) Date of Patent: Dec. 17, 2013

(54) AIRBAG APPARATUS

(75) Inventors: Koji Shibayama, Kiyosu (JP); Kensaku Honda, Kiyosu (JP); Yuji Sato, Kiyosu (JP); Michiyasu Ito, Kiyosu (JP); Masashi Hotta, Kiyosu (JP); Masashi Aoki, Kiyosu (JP); Daisuke Yamamura, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 57 days.

(21) Appl. No.: 13/190,604

(22) Filed: Jul. 26, 2011

(65) Prior Publication Data

US 2012/0025499 A1    Feb. 2, 2012

(30) Foreign Application Priority Data

| Jul. 28, 2010 | (JP) | 2010-169543 |
| Jul. 28, 2010 | (JP) | 2010-169544 |
| Feb. 24, 2011 | (JP) | 2011-038561 |
| Jul. 14, 2011 | (JP) | 2011-155839 |
| Jul. 14, 2011 | (JP) | 2011-155840 |

(51) Int. Cl.
*B60R 21/2346* (2011.01)
*B60R 21/233* (2006.01)
*B60R 21/207* (2006.01)

(52) U.S. Cl.
USPC ............ 280/742; 280/730.2; 280/729

(58) Field of Classification Search
USPC .................. 280/736, 742, 730.2, 729
IPC ............. B60R 21/2346, 21/233, 21/207
See application file for complete search history.

(56) References Cited

U.S. PATENT DOCUMENTS

| 5,586,782 | A  | * | 12/1996 | Zimmerman et al. ..... 280/730.2 |
| 6,106,004 | A  |   | 8/2000  | Heinz et al. |
| 7,192,050 | B2 |   | 3/2007  | Sato et al. |
| 7,753,405 | B2 |   | 7/2010  | Ishiguro et al. |
| 8,052,168 | B2 | * | 11/2011 | Wipasuramonton et al. ........ 280/730.2 |
| 2006/0131859 | A1 |   | 6/2006 | Kumagai |
| 2007/0138773 | A1 |   | 6/2007 | Song |
| 2011/0109070 | A1 |   | 5/2011 | Tanaka et al. |

FOREIGN PATENT DOCUMENTS

| CN | 1789044 A | 6/2006 |
| JP | 09-118186 A | 5/1997 |

(Continued)

OTHER PUBLICATIONS

European Search Report dated Nov. 10, 2011 in corresponding European Patent Application No. 11175182.2.

(Continued)

*Primary Examiner* — Keith Frisby
(74) *Attorney, Agent, or Firm* — Posz Law Group, PLC

(57) ABSTRACT

An inflation portion of an airbag, which is inflated by inflation gas, is partitioned into an upstream inflation portion and a downstream inflation portion via a partition member. When being tensioned in a planar manner, the partition member has a length in a longitudinal direction that is longer than a length in a transverse direction perpendicular to the longitudinal direction. A pressure regulating valve that is closed at an early stage of a supply period of the inflation gas to the inflation portion and is opened from the middle of the supply period includes a slit-like inner opening that is provided on the partition member and extends in the transverse direction and a pair of valve body portions that are provided around the inner opening and are selectively positioned close to and separated from each other.

10 Claims, 43 Drawing Sheets

(56) References Cited

FOREIGN PATENT DOCUMENTS

| JP | A-10-067297 | 3/1998 |
|---|---|---|
| JP | A-10-217896 | 8/1998 |
| JP | A-10-324216 | 12/1998 |
| JP | A-2000-280853 | 10/2000 |
| JP | A-2005-029073 | 2/2005 |
| JP | A-2008-179231 | 8/2008 |
| JP | A-2008-201172 | 9/2008 |

OTHER PUBLICATIONS

Office Action dated Jul. 19, 2013 issued in corresponding CN patent application No. 201110210767.3.

* cited by examiner

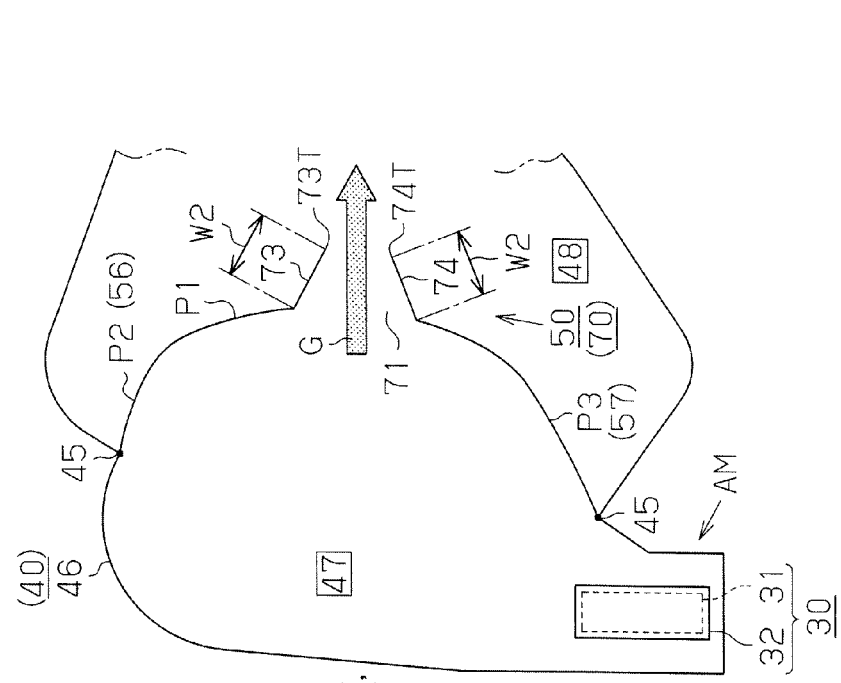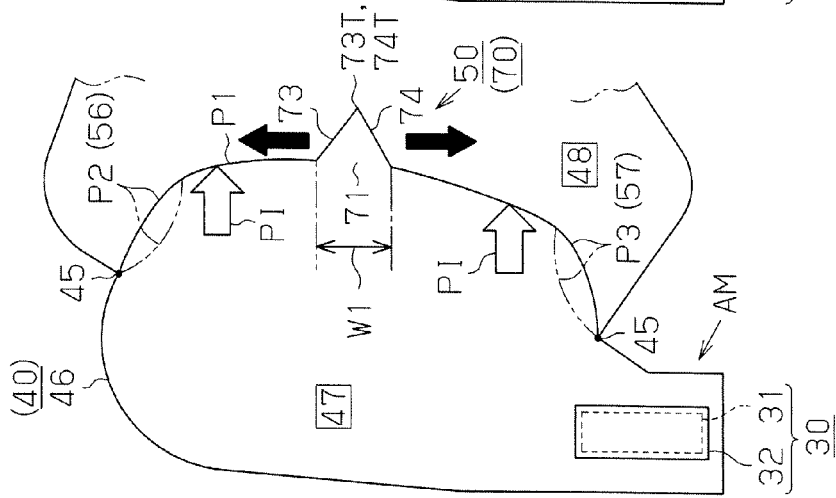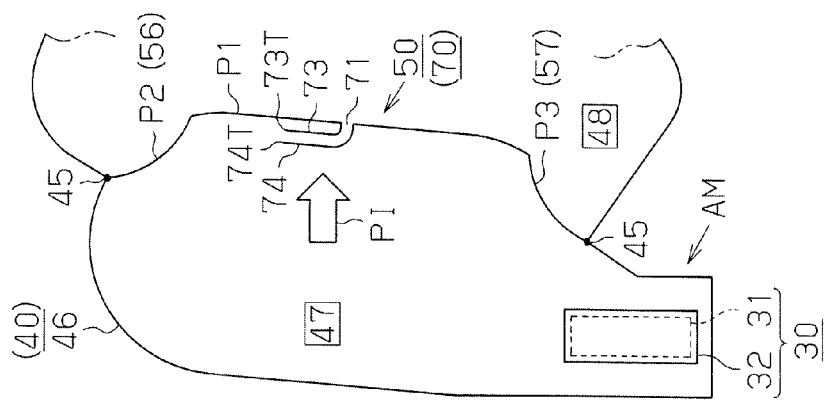

AIRBAG APPARATUS

BACKGROUND OF THE INVENTION

The present invention relates to an airbag apparatus that inflates an airbag when an impact is applied to a vehicle due to collision, thereby protecting an occupant against the impact.

An airbag apparatus is effective as an apparatus for protecting the occupant against an impact applied to a vehicle due to collision. Such an airbag apparatus includes an airbag in the form of a bag and an inflator for supplying inflation gas into the airbag.

One mode for such a type of airbag apparatus is a side airbag apparatus for protecting an occupant against, for example, impact from a side collision. In this side airbag apparatus, the foregoing airbag in a folded state and the inflator are incorporated into a seat back of a vehicle seat. In the side airbag apparatus, when an impact is applied to a member constituting a side part of the vehicle (body side portion), for example, a side door, from a side, the inflation gas is supplied from the inflator into the airbag. The airbag is inflated and deployed by the inflation gas and then, bursts out of the vehicle seat, with a part being left in the seat back. The airbag is inflated and deployed forward in a small space between the occupant seated in the vehicle seat and the body side portion. The inflated and deployed airbag is interposed between the occupant and the body side portion entering into the vehicle, thereby restraining the occupant as well as absorbing energy of the impact to protect the occupant against the impact.

Another mode for a side airbag apparatus is an airbag, the inside of which is not partitioned (hereinafter referred to as "Prior Art 1").

Japanese Laid-Open Patent Publication No. 10-67297 proposes still another mode for a side airbag apparatus in which a partition portion for partitioning an airbag into an upper airbag and a lower airbag is provided using a pressure regulating valve (pressure control valve) so that the lower airbag is inflated earlier than the upper airbag by the action of the pressure regulating valve (hereinafter referred to as "Prior Art 2"). A word inside a parenthesis following the name of each member represents the name of the member used in the publication. In the side airbag apparatus according to Prior Art 2, the airbag first inflates up to the height of the hip of the occupant and then, inflates up to the height of the chest. Thus, the impact can be absorbed more efficiently.

In the side airbag apparatus, the body side portion enters toward the inside of the vehicle due to the side impact, thereby pressing the airbag onto the occupant. With this pressure, the occupant is subjected to a load of the impact through the airbag. The load is expressed by a product of an area where the occupant is pressed by the airbag, that is, a pressure-receiving area of the occupant on the side of the airbag and an internal pressure of the airbag. To protect the occupant against the impact, it is desired that the load reach a predetermined value within a short time from start of entry of the body side portion and then, maintains the predetermined value irrespective of an entry amount (stroke) of the body side portion.

However, according to Prior Art 1, since the internal pressure and the pressure-receiving area increase with an increase in the entry amount of the body side portion, the load received by the occupant from the airbag gradually increases as the body side portion enters. The load does not reach the predetermined value until the body side portion enters to some extent. In addition, the load continues to increase even after it reaches the predetermined value and finally, exceeds the predetermined value. As a result, sufficient protection of the occupant against the impact cannot be started before the load has reached the predetermined value. After the load reaches the predetermined value, the occupant receives a load that is larger than the predetermined value through the airbag.

Prior Art 2 does not disclose specific configuration of the pressure regulating valve. For this reason, the relationship between the load received by the occupant from the airbag and the entry amount of the body side portion is unclear.

The load characteristics can be improved by providing the pressure regulating valve with a more complicated configuration. However, it causes an increase in costs of the airbag apparatus.

Such problem occurs in the above-discussed side airbag apparatus as well as other types of airbag apparatuses.

SUMMARY OF THE INVENTION

An objective of the present invention is to provide an airbag apparatus that can improve characteristics of a load received by an occupant through an airbag with a simple and inexpensive configuration.

To attain the foregoing object, according to a first aspect of the present invention, there is provided an airbag apparatus comprising: an airbag that is planar before supply of inflation gas and is inflated by supply of the inflation gas; an inflation portion provided in the airbag; a partition member that partitions the inflation portion into at least an upstream inflation portion and a downstream inflation portion; and a pressure regulating valve that is closed at an early stage of a supply period of the inflation gas to the inflation portion to restrict passage of the inflation gas from the upstream inflation portion to the downstream inflation portion, and is opened from the middle of the supply period to cancel the restriction, wherein the partition member has a length in a longitudinal direction that is longer than a length in a transverse direction perpendicular to the longitudinal direction when being tensioned to be planar upon inflation of the inflation portion, and the pressure regulating valve includes a slit-like inner opening that is provided on the partition member and extends in the transverse direction of the partition member, and a pair of valve body portions that are provided around the inner opening and are selectively close to and separated from each other.

According to a second aspect of the present invention, there is provided an airbag apparatus comprising: an airbag that is planar before supply of inflating gas and is inflated by supply of the inflation gas; an inflation portion provided in the airbag; a partition member that partitions the inflation portion into at least an upstream inflation portion and a downstream inflation portion; and a pressure regulating valve that is closed at an early stage of a supply period of the inflation gas to the inflation portion to restrict passage of the inflation gas from the upstream inflation portion to the downstream inflation portion, and is opened from the middle of the supply period to cancel the restriction, wherein the pressure regulating valve includes a slit-like inner opening that is provided on the partition member and extends in the transverse direction of the partition member, and a pair of valve body portions that are provided around the inner opening and are selectively close to and separated from each other, the partition member has opposing ends facing each other and is folded in half by being folded along a bend line such that the opposing ends are close to each other, and the partition member folded in half is disposed in the inflation portion in an uninflated and deployed state in the state where the bend line is located upstream of the opposing ends and is joined with the airbag at both opposing ends and both ends in a direction along the bend line.

According to a third aspect of the present invention, a side airbag apparatus for restraining and protecting an occupant seated in a vehicle seat via an airbag is provided. The vehicle seat includes a seat back and a pair of side supports provided on both sides of the seat back, the side supports each protruding toward the front of a vehicle and having a front end. The side airbag apparatus is stored in one side of the seat back. The airbag includes an inflation portion inflated and deployed forward from the side of the vehicle seat by inflation gas supplied from an inflator in response to an impact applied from the side of vehicle seat. The inflation portion is partitioned into a plurality of sections including at least an upstream inflation portion that receives the inflation gas and a downstream inflation portion that is adjacent to the front side of the upstream inflation portion and receives the inflation gas passing through the upstream inflation portion via a sheet-like partition member. The partition member is provided with a pressure regulating valve. The pressure regulating valve includes an opening that communicates the upstream inflation portion to the downstream inflation portion and a pair of valve body portions for selectively opening and closing the opening. The valve body portions of the pressure regulating valve are pressed by the inflation gas in the upstream inflation portion and contact each other during inflation of the upstream inflation portion and before restraint of the occupant to close the opening, and are separated from each other across the partition member by the external force generated from the restraint when the upstream inflation portion is inflated and restrain the occupant to open the opening. The opening is provided so as to be located in a region between the point away from a front end of the side support in the vehicle seat forward by 85 mm and the point away from the front end rearward by 15 mm, in the state where the upstream inflation portion is inflated and deployed.

According to a fourth aspect of the present invention, a side airbag apparatus for restraining and protecting an occupant seated in a vehicle seat via an airbag is provided. The airbag includes an inflation portion inflated and deployed forward from the side of the vehicle seat by inflation gas supplied in response to an impact applied from the side of vehicle seat. The inflation portion is partitioned into a plurality of sections including at least an upstream inflation portion that receives the inflation gas and a downstream inflation portion that is adjacent to the front side of the upstream inflation portion and receives the inflation gas passing through the upstream inflation portion via a sheet-like partition member. The partition member is provided with a pressure regulating valve. The pressure regulating valve includes an opening that is shaped like a slit extending in the widthwise direction of the vehicle seat and communicates the upstream inflation portion to the downstream inflation portion and a pair of valve body portions for selectively opening and closing the opening. The valve body portions of the pressure regulating valve are pressed by the inflation gas in the upstream inflation portion and contact each other during inflation of the upstream inflation portion and before restraint of the occupant to close the opening, and are separated from each other across the partition member by the external force generated from the restraint when the upstream inflation portion is inflated and restrain the occupant to open the opening. The inflation portion in the inflated state has an outer shape having a ratio of a length in the vertical direction to a length in the widthwise direction of the vehicle seat in a range of 1.1 to 5.0 in a cross section orthogonal to the front-back direction in the place where the partition member is provided.

BRIEF DESCRIPTION OF THE DRAWINGS

FIG. 11A is a view showing operation of the pressure regulating valve according to the first embodiment;

FIG. 11B is a view showing operation of the pressure regulating valve according to the first embodiment;

FIG. 11C is a view showing operation of the pressure regulating valve according to the first embodiment;

DETAILED DESCRIPTION OF THE PREFERRED EMBODIMENTS (First Embodiment)

A first embodiment of the present invention, which is embodied as a vehicle side airbag apparatus, will be described below with reference to FIGS. 1 to 13.

In the following description, it is assumed that the forward direction of the vehicle is frontward and the backward direction of the vehicle is rearward. Also, in the following description, it is assumed that vertical means a vertical direction with respect to the vehicle, and left-right means a direction relative to the vehicle in the widthwise direction and corresponding to left-right directions while the vehicle moves frontward.

Figure 2:
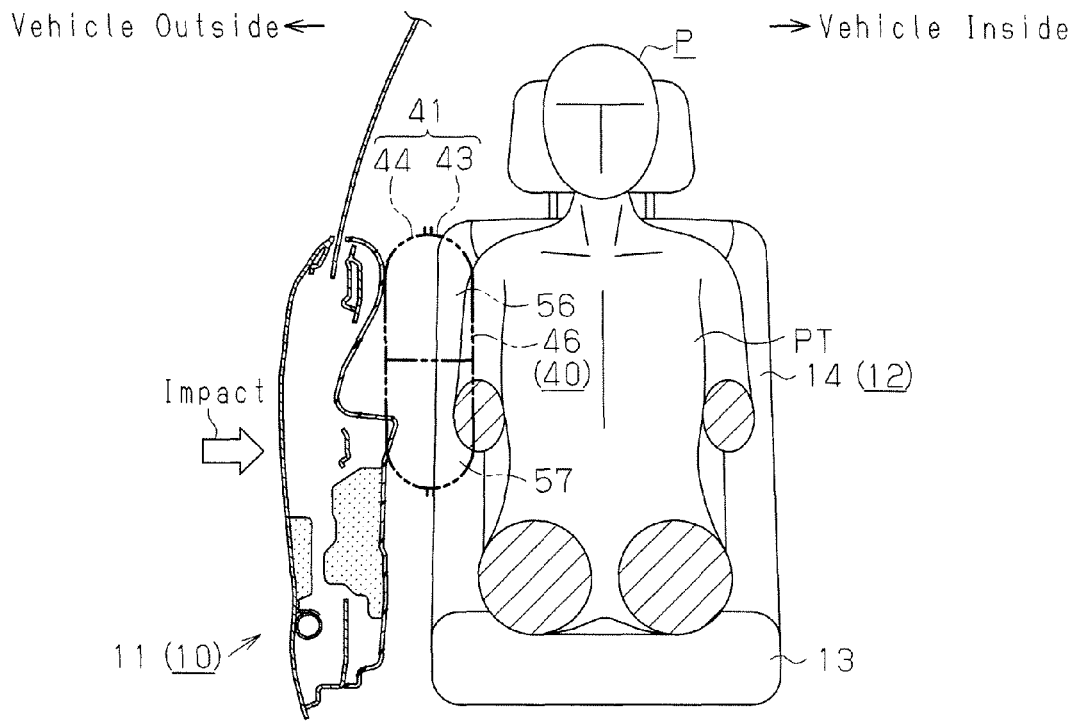
FIG. 2 is a front sectional view showing positional relationship among the vehicle seat, the occupant and a body side portion in the first embodiment.
Figure 3:
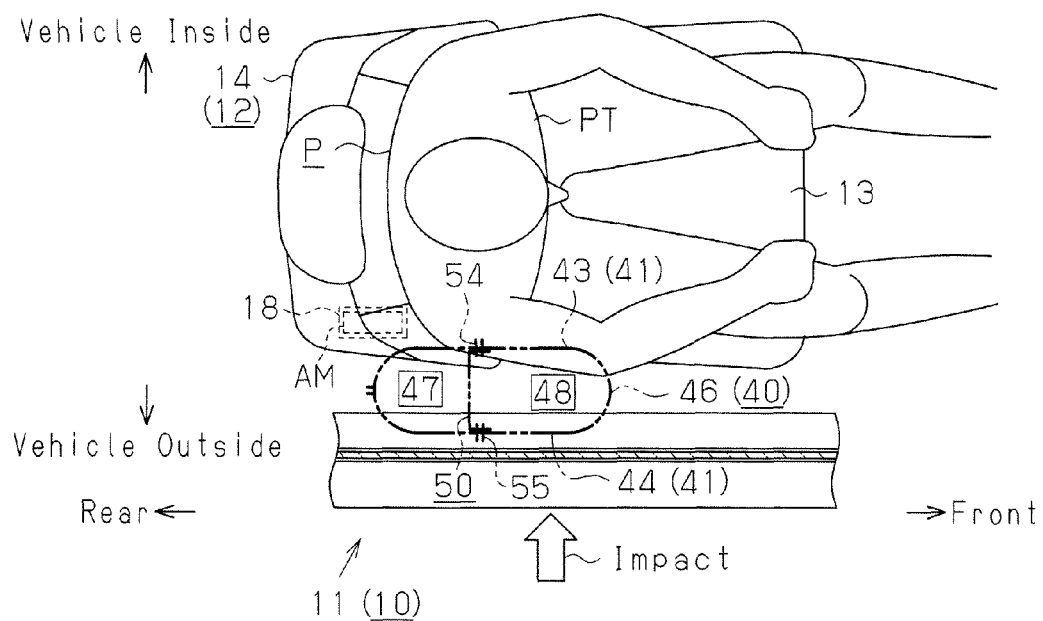
FIG. 3 is a sectional plan view showing positional relationship among the vehicle seat, the occupant and the body side portion according to the first embodiment.

As shown in FIGS. 2 and 3, a vehicle seat 12 is disposed in the vicinity of the inner side (right side in FIG. 2, upper side in FIG. 3) of a body side portion 11 in a vehicle 10. Here, the body side portion 11 refers to a vehicle component disposed on the side of the vehicle 10, and mainly includes a door and a pillar. For example, the body side portion 11 corresponding to a front seat is constituted of a front door and a center pillar (B pillar), and the body side portion 11 corresponding to a rear seat is constituted of a rear part of a side door (rear door), a C pillar, a rear part of a tire house and a rear quarter.

The vehicle seat 12 includes a seat cushion (seat portion) 13 and a seat back (back rest) 14 that rises from the back side of the seat cushion 13 and is adjusted by an inclination adjusting mechanism (not shown) in inclination angle.

Next, the inner configuration of a side part of the seat back 14 on the outer side of the vehicle will be described.

Figure 4:
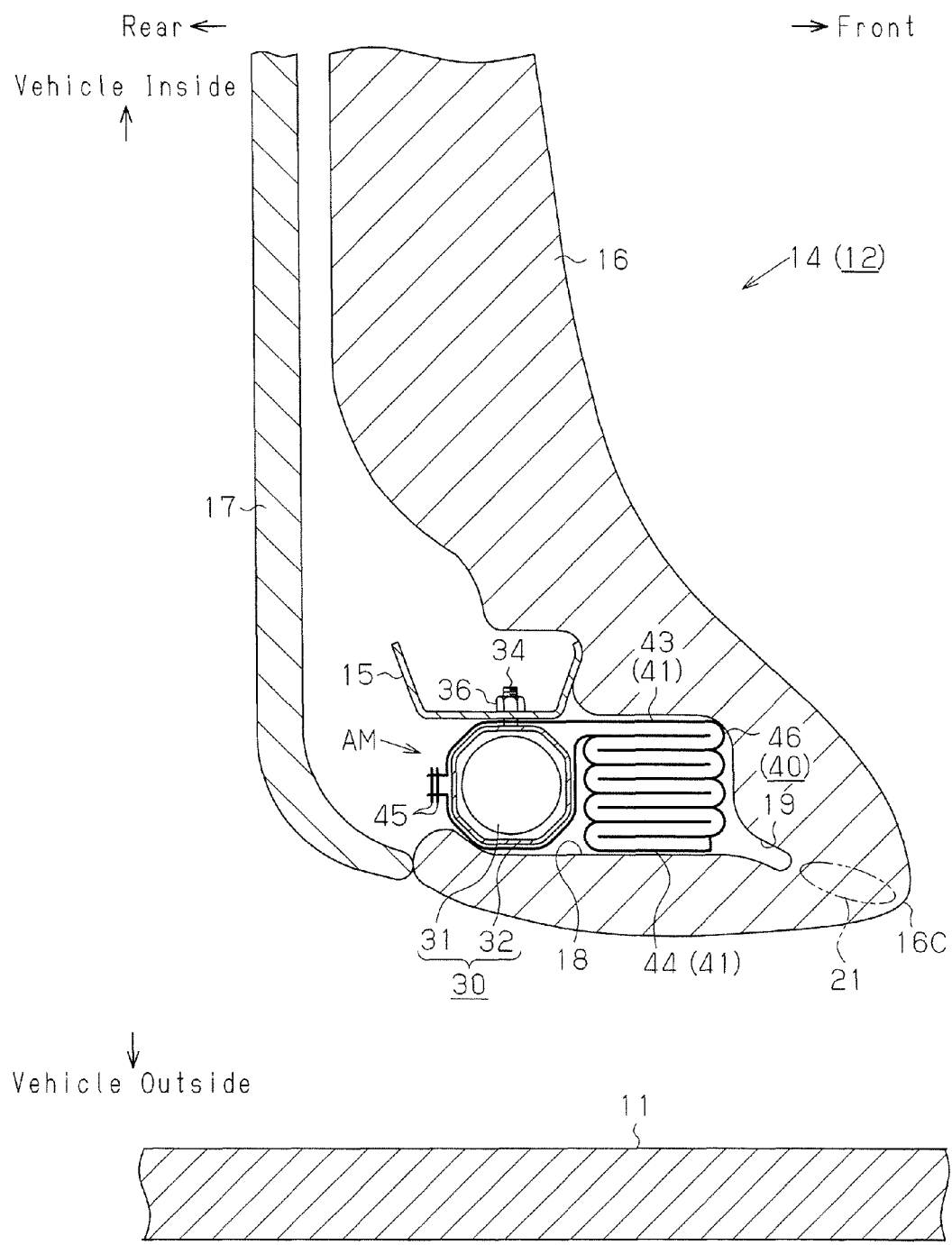
FIG. 4 is a partial sectional plan view showing an airbag module incorporated into a storage portion of a seat back, along with the body side portion according to the first embodiment.

A seat frame as a framework is disposed in the seat back 14. As shown in FIG. 4, a part of the seat frame is disposed on the outer side of the vehicle in the seat back 14 (lower side in FIG. 4) and this part (hereinafter referred to as "side frame portion 15") is formed by bending a metal plate. A seat pad 16 made of an elastic material such as urethane foam is disposed in front of the seat frame including the side frame portion 15. A hard back board 17 made of synthetic resin or the like is disposed in the rear of the seat frame. Although the seat pad 16 is coated with an outer cover, the outer cover is not shown in FIG. 4. This also applies to FIG. 13 described below.

A storage portion 18 is provided in the vicinity of the side frame portion 15 on the outer side of the vehicle in the seat pad 16. The storage portion 18 is located at a position diagonally rearward relative to an occupant P seated in the vehicle seat 12 (refer to FIG. 3). The storage portion 18 incorporates an airbag module AM as a main part of the side airbag apparatus thereinto.

A slit 19 extends diagonally forward on the outer side of the vehicle from a corner part of the storage portion 18 on the outer and front side of the vehicle. An area sandwiched between a corner part 16C on the front side of the seat pad 16 and the slit 19 (an area surrounded by a chain double-dashed line in FIG. 4) constitutes a breakable portion 21 to be broken by an airbag 40 described below.

The airbag module AM incorporated into the seat back 14 has an inflator assembly 30 and the airbag 40 as main components.

Figure 1:
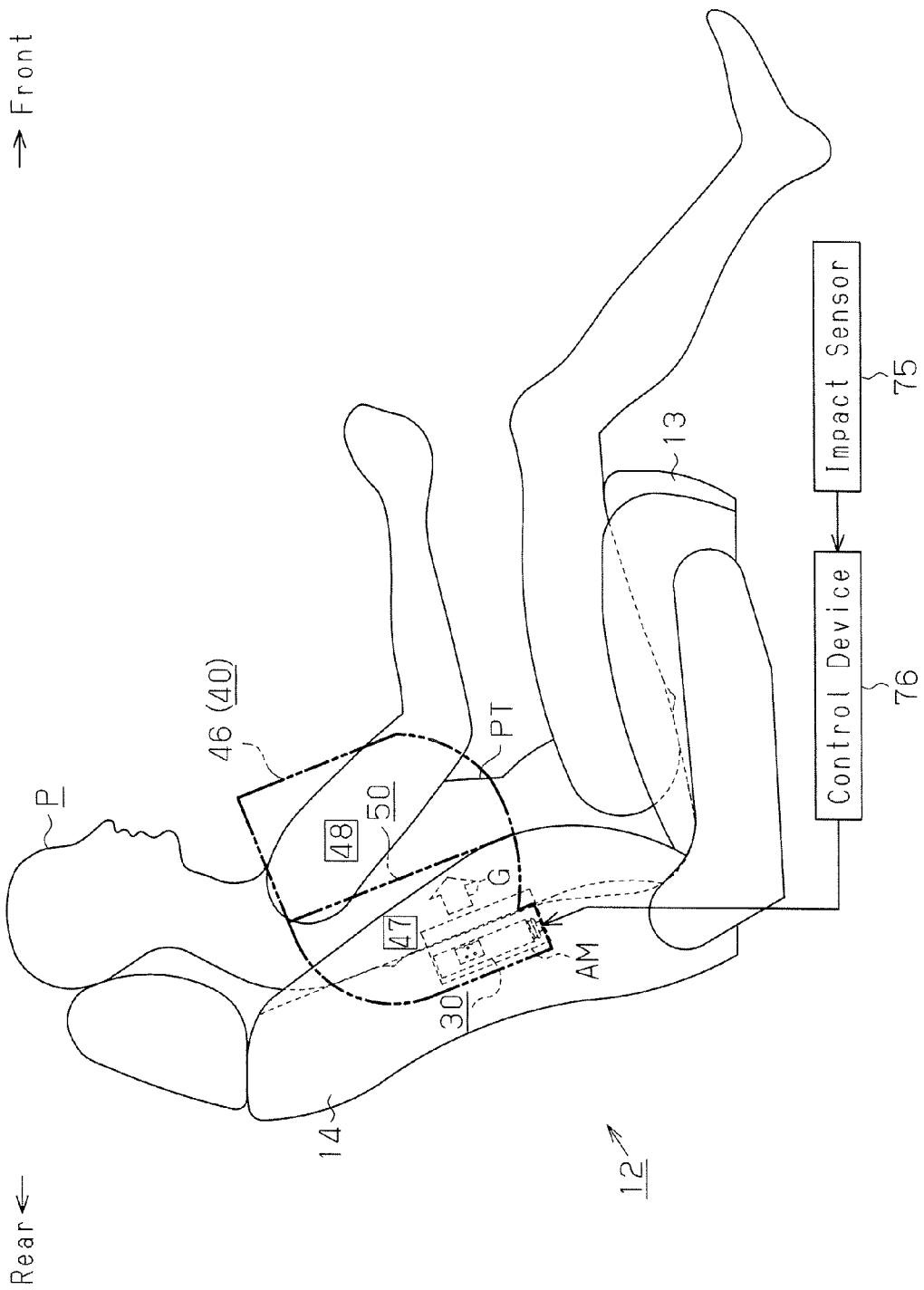
FIG. 1 is a side view showing a vehicle seat provided with a side airbag apparatus along with an occupant in a first embodiment of the present invention, which is embodied as the side airbag apparatus.

Next, each of these components will be described. For the airbag module AM and its components, the "vertical direction" or "front-back direction" mentioned in the first embodiment means a direction with respect to the seat back 14 of the vehicle seat 12, as shown in FIG. 1. It is assumed that the direction in which the seat back 14 stands is the "vertical direction" and the direction along the thickness of the seat back 14 is the "front-back direction". The seat back 14 is normally used in a state inclined slightly rearward. Thus, strictly speaking, the "vertical direction" is not the normal direction, but is slightly inclined. Similarly, strictly speaking, the "front-back direction" is not the horizontal direction, but is slightly inclined.

<Inflator Assembly 30>

Figure 5:
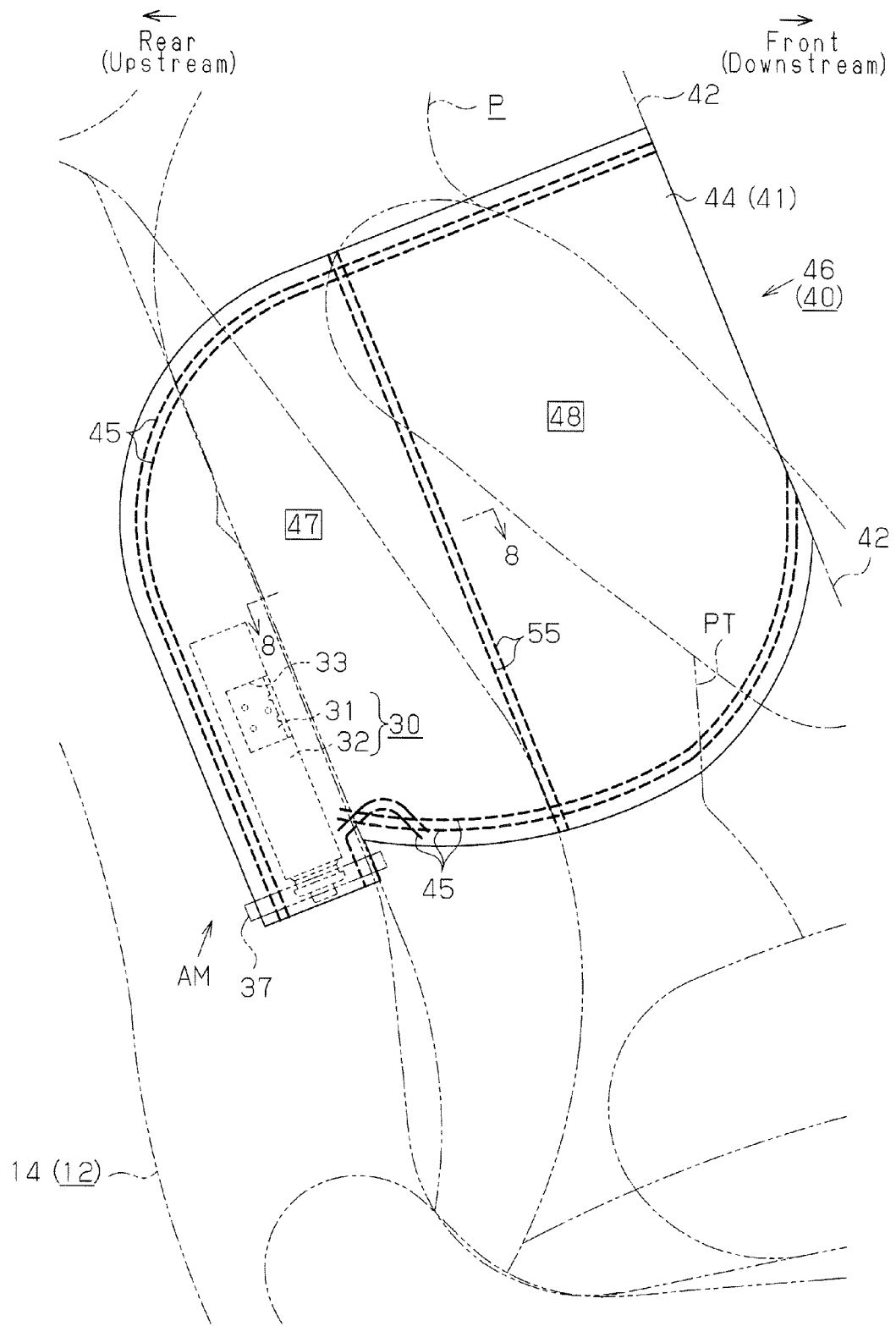
FIG. 5 is a partial side view showing the airbag module having an airbag in an uninflated and deployed state according to the first embodiment, along with the vehicle seat and the occupant.

As shown in FIG. 4 and FIG. 5, the inflator assembly 30 includes an inflator 31 as a gas generator and a retainer 32 attached to the outer side of the inflator 31. In the first embodiment, a pyrotechnic inflator is adopted as the inflator 31. The inflator 31 is substantially cylindrical and stores a gas generating agent (not shown) for generating inflation gas. A harness (not shown) as a wire for passing a control signal to the inflator 31 is connected to one end (lower end in the first embodiment) of the inflator 31 in the longitudinal direction.

As the inflator 31, a hybrid-type inflator that breaks a partition of a high-pressure gas cylinder filled with a high-pressure gas therein by explosives, thereby ejecting the gas may be adopted in place of the above-described pyrotechnic inflator using the gas generating agent.

The retainer 32 acts as a diffuser and also has a function of fastening the inflator 31 along with the airbag 40 to the side frame portion 15. Most of the retainer 32 is made substantially cylindrical, for example, by bending a plate material such as a metal plate. A window 33 is formed on the retainer 32 and most of the inflation gas ejected from the inflator 31 bursts out to the outside of the retainer 32 through the window 33.

A plurality of bolts 34 are fixed to the retainer 32 as locking members for attaching the retainer 32 to the side frame portion 15. In other words, the plurality of bolts 34 are indirectly fixed to the inflator 31 through the retainer 32.

In the inflator assembly 30, the inflator 31 and the retainer 32 may be integrated into each other.

<Airbag 40>

As shown in FIGS. 1 to 3, the airbag 40 receives inflation gas G from the inflator 31 when side impact due to collision is applied to the body side portion 11 while the vehicle 10 is running. When receiving the inflation gas G, the airbag 40 bursts out of the storage portion 18 substantially frontward, with a part (rear part) being left in the storage portion 18 and is inflated and deployed between an upper half of the body of the occupant P seated in the vehicle seat 12 and the body side portion 11, thereby protecting the upper half of the body of the occupant P against the side impact due to collision.

Figure 6:
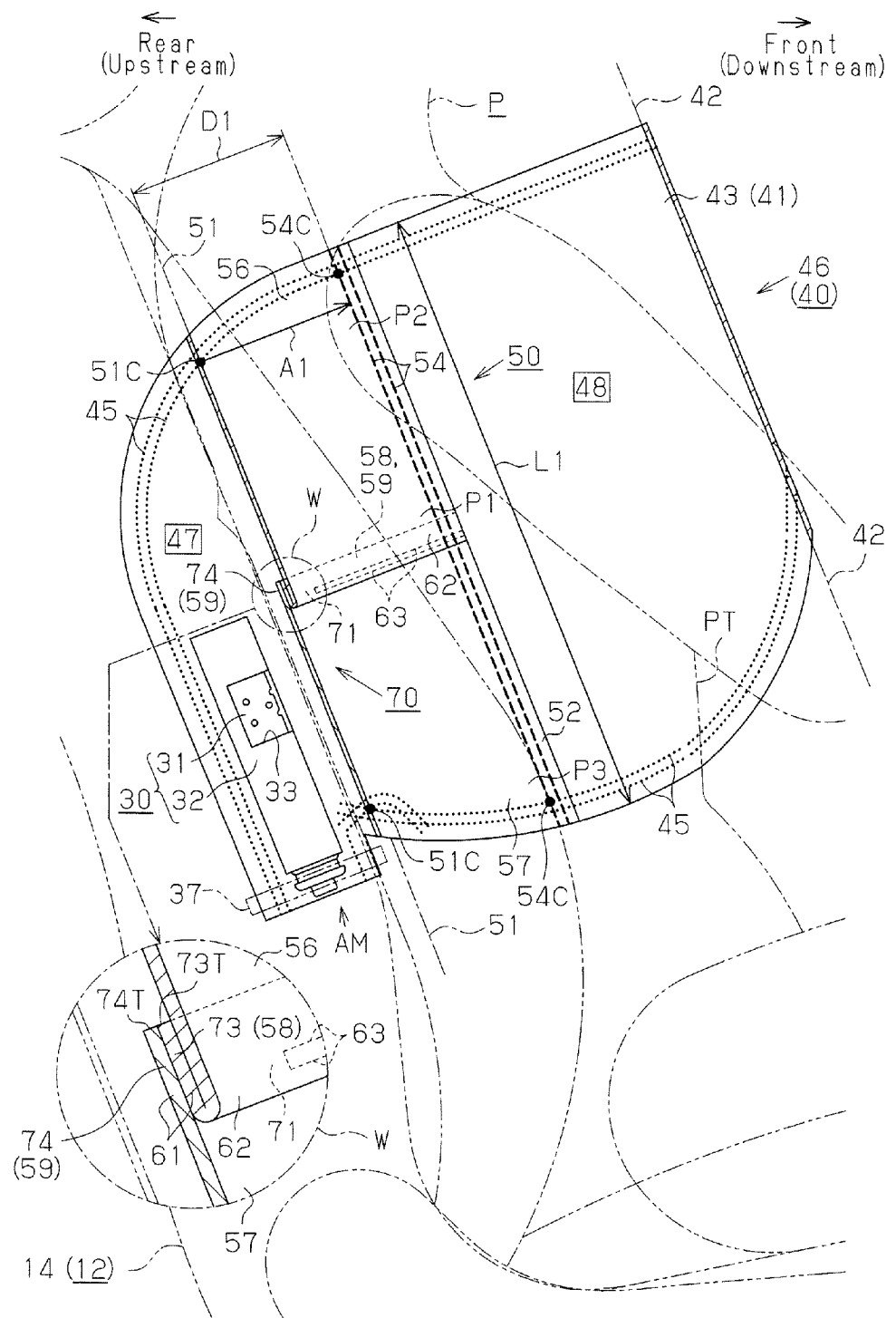
FIG. 6 is a partial side sectional view showing the airbag module having the airbag in the uninflated and deployed state in FIG. 5, which is cut at the center in the vehicle widthwise direction, along with the vehicle seat and the occupant, according to the first embodiment.

FIG. 5 shows the airbag module AM having the airbag 40 deployed to be planar without being filled with the inflation gas G (hereinafter referred to as "uninflated and deployed state"), along with the occupant P and the vehicle seat 12. FIG. 6 shows the airbag module AM having the airbag 40 in the uninflated and deployed state in FIG. 5, which is cut along the center in the vehicle widthwise direction, to show internal configuration of the airbag module AM, along with the vehicle seat 12 and the occupant P. In FIG. 6, an area surrounded by a large circle W expressed by a chain line represents an enlargement of an area surrounded by a small circle W.

As shown in FIGS. 5 and 6, the airbag 40 is formed by folding a piece of fabric 41 (also called as base fabric or panel fabric, etc.) in half along a bend line 42 set in the center of the fabric to be overlapped in the vehicle widthwise direction and joining the overlapped portions with each other in the form of a bag. Here, to distinguish the two overlapped portions of the airbag 40, one located on the inner side of the vehicle is referred to as a fabric portion 43 (refer to FIG. 6) and the other located on the outer side of the vehicle is referred to as a fabric portion 44 (refer to FIG. 5).

Although the fabric 41 is folded in half such that the bend line 42 is located at a front end of the airbag 40 in the first embodiment, the fabric 41 may be folded in half such that the bend line 42 is located at the other end such as a rear end. Also, the airbag 40 may be formed of two pieces of fabric divided along the bend line 42. In this case, the airbag 40 is formed into a bag by overlapping the two pieces of fabric in the vehicle widthwise direction and joining the pieces of fabric with each other on their fringes. Alternatively, the airbag 40 may be formed of three or more pieces of fabric.

As described above, the airbag 40 when planar in the uninflated and deployed state is also referred to as a "planar bag".

In the airbag 40, the external shape of the two fabric portions 43, 44 is line-symmetric about the bend line 42 as a symmetry axis. The shape and size of each of the fabric portions 43, 44 are set such that, when being inflated and deployed between the vehicle seat 12 and the body side portion 11, the airbag 40 can occupy a region corresponding to the upper half of the body of the occupant P seated in the vehicle seat 12.

Examples of suitable materials for the fabric portions 43, 44 include materials that have a high strength and flexibility and are easily foldable, such as woven fabric using polyester yarn, polyamide yarn or the like.

The fabric portions 43, 44 are joined with each other via a fringe joint portion 45 provided on the fringes of the fabric portions 43, 44. In the first embodiment, the fringe joint portion 45 is formed by sewing the fringes except for lower rear ends and front ends (regions near the bend line 42) of the fabric portions 43, 44 together via needlework, that is, stitching with yarn.

FIGS. 5 to 7, FIG. 9, FIG. 10, FIG. 14, FIG. 16, FIG. 18, FIG. 19, FIG. 21, FIG. 23, FIG. 25, FIG. 27, FIG. 28, FIG. 41A, FIG. 41B, FIG. 47 and FIG. 48 show the sewn portion by using two types of lines. One type of line is a line expressed by intermittently drawing thick lines of a certain length (a type of broken line) and shows the state of the sewing yarn outside of the fabric portions to be sewn (not between the fabric portions) (refer to FIG. 5). The other type of line is a line expressed by drawing points at regular intervals (a type of broken line) and shows the state of the sewing yarn inside of the fabric portions to be sewn (between the fabric portions) (refer to FIG. 6 and the like). In other words, the figures including the latter sewing mode show sectional configuration along a cross section passing the sewn portion.

As shown in FIGS. 5 and 6, a space between the fabric portions 43, 44, which is surrounded by the fringe joint portion 45 (space on the inner side of the fringe joint portion 45), is inflated in the vicinity of the outer side of the upper half of the body of the occupant P by the inflation gas G (refer to FIG. 1 and the like) to become an inflation portion 46.

The fringe joint portion 45 may be formed by means other than sewing with the sewing yarn, such as bonding with an adhesive. This also applies to outer joint portions 54, 55 and an inner joint portion 63, which will be described below.

The inflator assembly 30 is disposed in the lower portion of the rear end of the airbag 40 so as to be declined toward the front. The bolts 34 of the retainer 32 are inserted into the fabric portion 43 on the inner side of the vehicle (refer to FIG. 4). Such insertion allows the inflator assembly 30 to be positioned and locked against the airbag 40. The lower end in the rear portion of the airbag 40 is hermetically fastened to the lower end of the inflator assembly 30 by use of an annular fastener 37.

With a partition member 50, the inflation portion 46 of the airbag 40 is partitioned into an upstream inflation portion 47 that first receives the inflation gas G from the inflator 31 and a downstream inflation portion 48 that receives the inflation gas G passing through the upstream inflation portion 47. The partition member 50 has the same configuration as a tether and is made of the same material as that for the fabric portions 43, 44 of the airbag 40.

Figure 7:
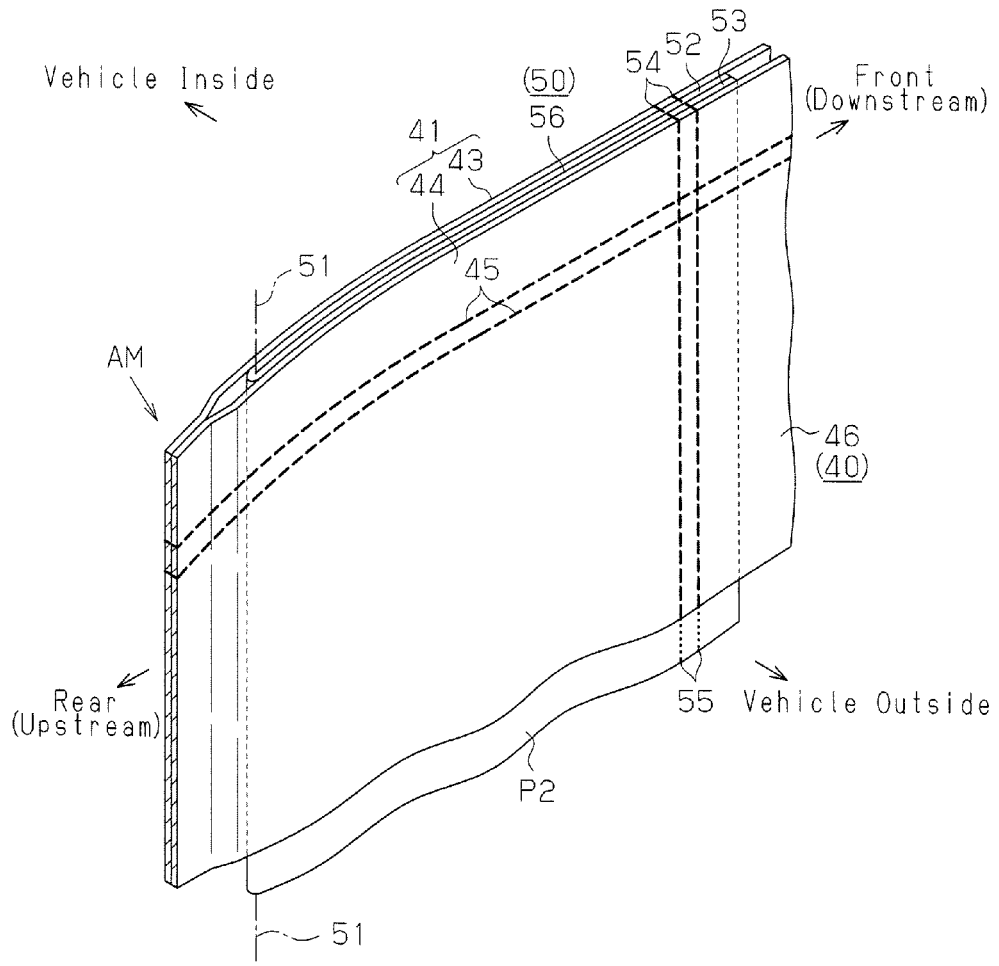
FIG. 7 is a partial perspective view showing an upper portion of the airbag module having the airbag in the uninflated and deployed state according to the first embodiment when viewed from diagonally upward and backward.
Figure 8:
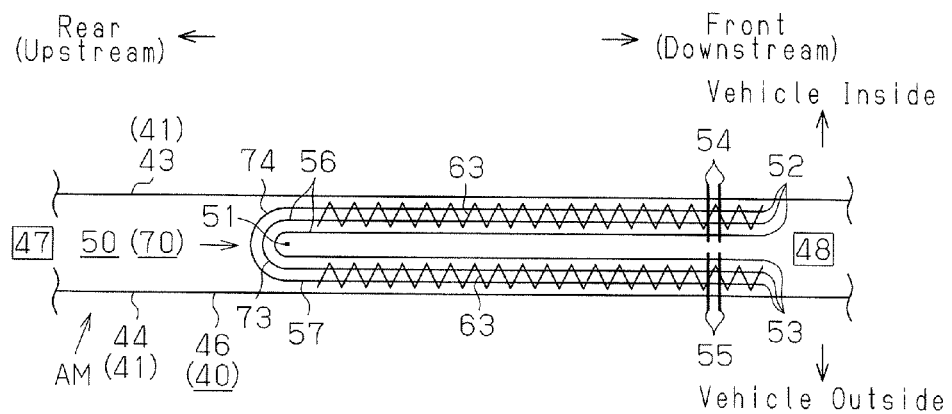
FIG. 8 is a partial sectional view showing a sectional configuration of a partition member and the like, taken along line 8-8 in FIG. 5.
Figure 9:
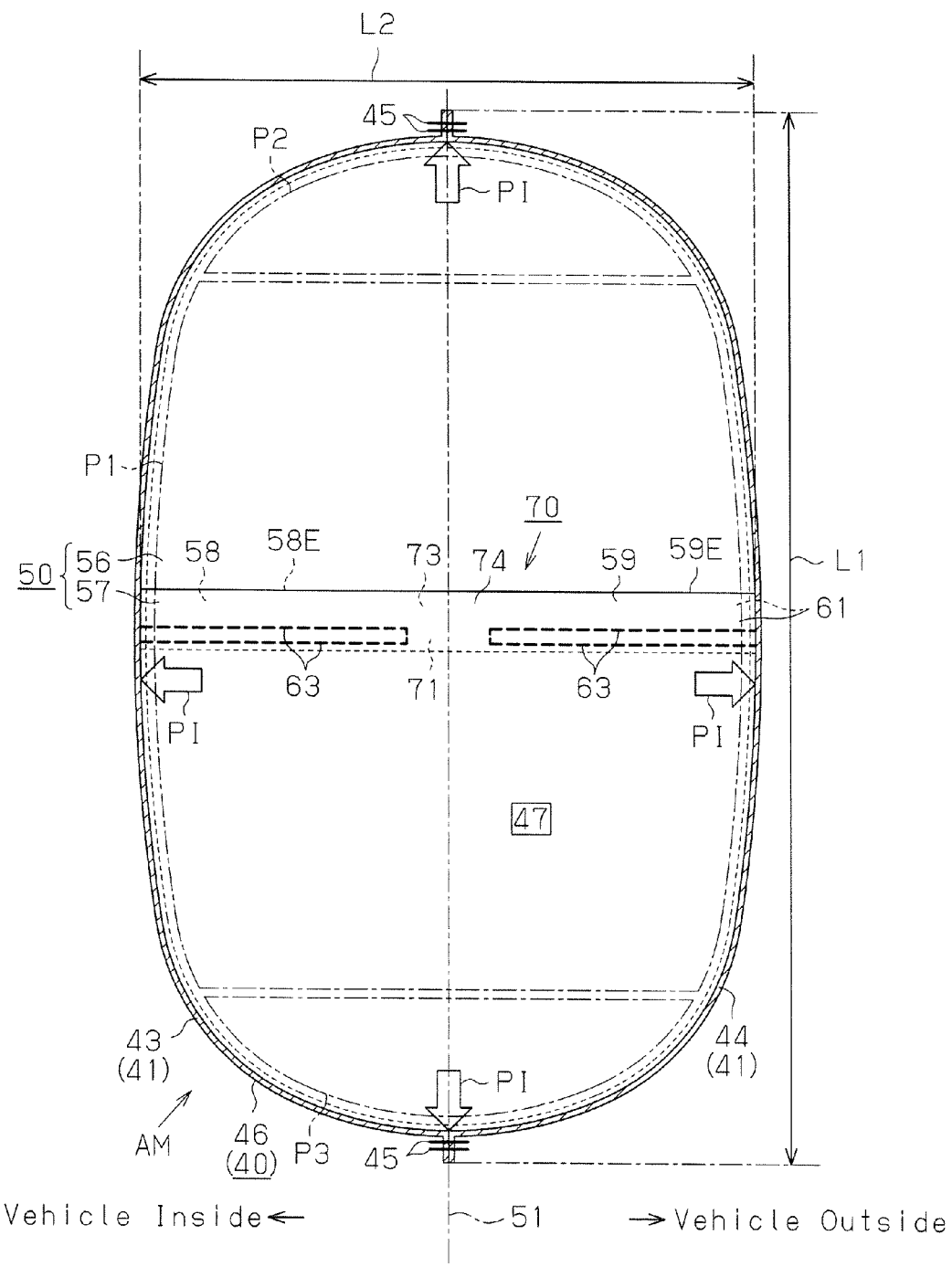
FIG. 9 is a vertical sectional view showing an internal configuration of the airbag module having the inflated airbag and the partition member tensioned to be planar according to the first embodiment.
Figure 10A:
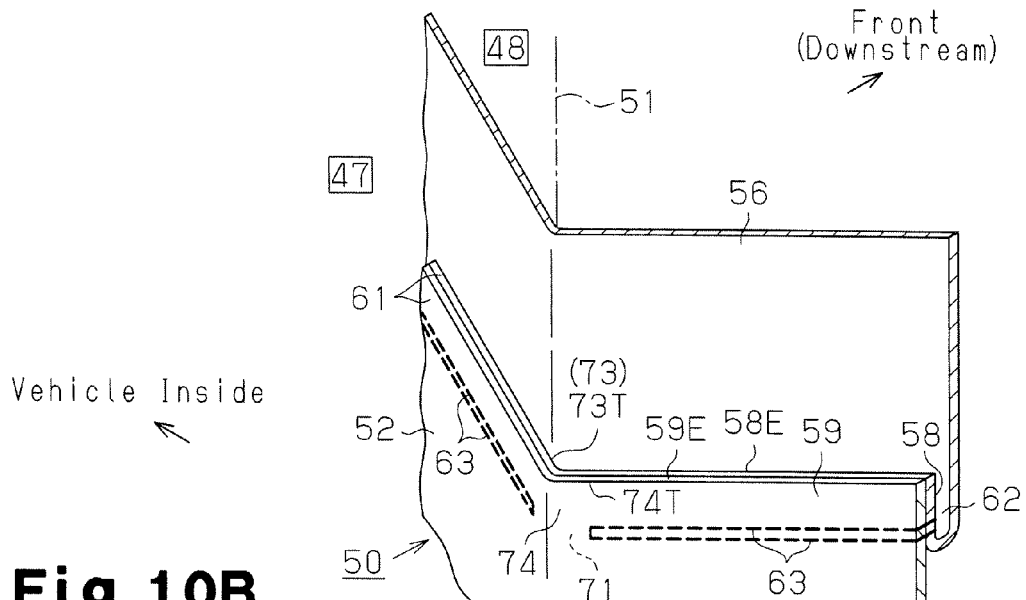
FIG. 10A is a partial perspective view showing a neighboring portion of a pressure regulating valve in the bent partition member according to the first embodiment.
Figure 10B:
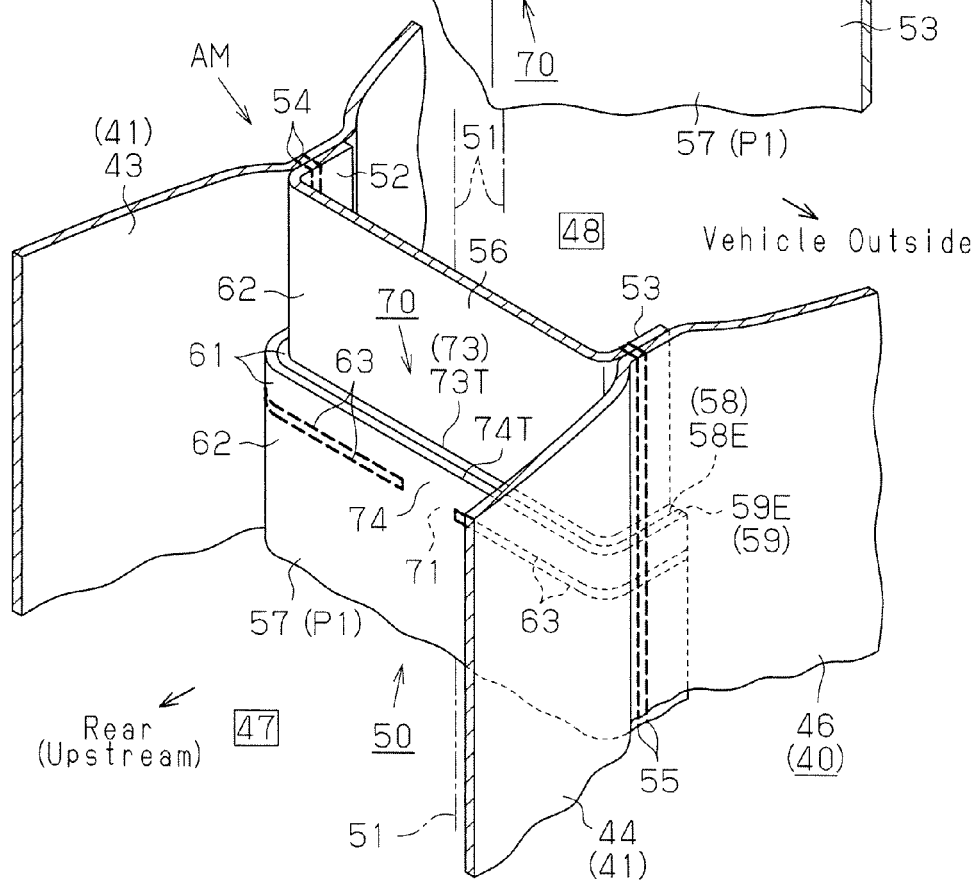
FIG. 10B is a partial perspective view showing a neighboring portion of the pressure regulating valve in the partition member tensioned to be planar according to the first embodiment.

FIG. 7 shows a part of the upper portion of the airbag module AM having the airbag 40 in the uninflated and deployed state when viewed from diagonally upward and backward and FIG. 8 shows a sectional configuration along line 8-8 in FIG. 5. In FIG. 8, each member is shown without thickness and the inner joint portion 63 is drawn in a zigzag pattern. This also applies to FIGS. 15, 20 and 24, which are described below. FIG. 9 shows internal configuration of the airbag module AM having the inflated airbag 40 and the partition member 50 tensioned to be planar. FIG. 10A shows a part of the bent partition member 50 and FIG. 10B shows an intermediate part P1 tensioned in the planar manner and its neighboring portion. As shown in FIG. 7 to FIG. 10A and FIG. 10B, the partition member 50 is folded in half along a bend line 51 extending in the substantially vertical direction such that opposing ends 52, 53 facing each other are located close to each other. The partition member 50 folded in half is disposed in the inflation portion 46 in the uninflated and deployed state such that the bend line 51 is located upstream of the opposing ends 52, 53 (refer to FIG. 8).

When the partition member 50 is tensioned to be planar upon inflation of the inflation portion 46, a length L1 of the partition member 50 in a direction along the bend line 51 (hereinafter referred to as a "longitudinal direction") is larger than a length L2 of the partition member 50 in a direction perpendicular to the bend line 51 (hereinafter referred to as a "transverse direction") (refer to FIG. 6, FIG. 9).

The opposing ends 52, 53 of the partition member 50 folded in half are joined with the fabric portions 43, 44 of the airbag 40, respectively, via the outer joint portions 54, 55 extending in the substantially vertical direction (longitudinal direction). The outer joint portions 54, 55 are located lateral to an intermediate portion of the upper half of the body of the occupant P in the front-back direction when the inflation portion 46 is inflated, and joins the opposing ends 52, 53 of the partition member 50 with the fabric portions 43, 44, respectively (refer to FIG. 3).

In this manner, the partition member 50 is stretched between the fabric portion 43 on the inner side of the vehicle and the fabric portion 44 on the outer side of the vehicle in the airbag 40. While the inflation portion 46 is not inflated, the partition member 50 is folded in half (refer to FIGS. 7 and 8). While the inflation portion 46 is inflated, the partition member 50 becomes tensioned in a planar manner in the vehicle widthwise direction (refer to FIG. 9 and FIG. 10B) and restricts the thickness of the inflation portion 46 in the vehicle widthwise direction.

In the partition member 50 folded in half, both ends in the direction along the bend line 51 (longitudinal direction) are joined with the airbag 40. In other words, the upper end and the lower end of the partition member 50 folded in half are joined with the upper end and the lower end of the fabric portions 43, 44 of the airbag 40, respectively, via the fringe joint portion 45 (refer to FIGS. 6, 7 and 9), that is, are sewn together.

As shown in FIGS. 5 and 6, the partition member 50 partitions the inflation portion 46 into the rear upstream inflation portion 47 that constitutes the rear half of the inflation portion 46 and has the inflator assembly 30 therein and the front downstream inflation portion 48 that constitutes the front half of the inflation portion 46 and has no inflator assembly 30 therein.

In the first embodiment, as shown in FIG. 10A and FIG. 10B, the partition member 50 is formed of two members 56, 57 aligned in a substantially vertical direction (longitudinal direction) as the direction along the bend line 51. In the upper and lower members 56, 57, their ends 58, 59 are overlapped in the shape of a band in the state where edges 58E, 59E of the ends 58, 59 match with each other. The upper and lower members 56, 57 are joined with each other via the inner joint portion 63 extending in a direction substantially perpendicular to the bend line 51 (transverse direction) in a boundary between a pair of band-like overlapping portions 61 and other areas (hereinafter referred to as "non-overlapping portion 62"). This boundary is away from the edges 58E, 59E by a certain distance.

A pressure regulating valve 70 is provided substantially at the center of the partition member 50. The pressure regulating valve 70 is closed at an early stage of a supply period of the inflation gas G to the inflation portion 46 to restrict passage of the inflation gas G from the upstream inflation portion 47 to the downstream inflation portion 48 and is opened by an external force applied upon restraint of the occupant from the middle of the supply period to cancel the restriction.

Next, the configuration of the pressure regulating valve 70 will be described. Joint of a part of the inner joint portion 63 (a part across the bend line 51 in the first embodiment) is undone. In other words, in the boundary between the overlapping portions 61 and the non-overlapping portion 62, the inner joint portion 63 for joining the upper and lower members 56, 57 is not provided in the part across the bend line 51. The region where no inner joint portion 63 is provided and joint is undone extends in the transverse direction to constitute a slit-like inner opening 71 for communicating the upstream inflation portion 47 to the downstream inflation portion 48.

Sections of the overlapping portions 61, which correspond to the inner opening 71 (neighboring portions), constitute pair of valve body portions 73, 74. More precisely, a section between the inner opening 71 and the edge 58E constitutes the valve body portion 73 and a section between the inner opening 71 and the edge 59E constitutes the valve body portion 74. When at least a part of the valve body portions 73, 74, for example, front ends 73T, 74T contact each other, passage of the inflation gas G between the valve body portions 73, 74 is restricted (refer to FIG. 11B). On the other hand, when the whole of the valve body portion 73 is separated from the whole of the valve body portion 74, passage of the inflation gas G between the valve body portions 73, 74 is enabled (refer to FIG. 11C).

As described above, before inflation of the inflation portion 46, the overlapping portions 61 having the valve body portions 73, 74 are disposed in the upstream inflation portion 47.

In the boundary between the overlapping portions 61 and the non-overlapping portion 62, the overlapping portions 61 are bent upwards or downwards (upwards in the first embodiment) and laid on the non-overlapping portion 62. Further, at both ends in the direction along the inner joint portion 63 (transverse direction), the bent band-like overlapping portions 61 are joined with the corresponding fabric portions 43, 44 of the airbag 40 and the partition member 50 (non-overlapping portion 62) via the above-described outer joint portions 54, 55, that is, are sewn together (refer to FIG. 6 and FIG. 8).

As shown in FIG. 4, the airbag module AM having the airbag 40 and the inflator assembly 30 as main constituents takes a compact form (hereinafter referred to as "storage form") by folding the airbag 40 in the uninflated and deployed state (refer to FIG. 5). Thus, the airbag module AM can suitably be stored in the storage portion 18 of limited size in the seat back 14.

The airbag module AM in the storage form is disposed in the storage portion 18 of the seat back 14 in the state where the inflator assembly 30 is located in the rear side and most of the airbag 40 is located in the front side. Then, as described above, the bolts 34 that extend from the retainer 32 and are inserted into the airbag 40 (the fabric portion 43) are inserted into the side frame portion 15 and fastened by use of nuts 36. This fastening enables the inflator assembly 30 along with the airbag 40 to be fixed to the side frame portion 15.

The inflator assembly 30 may be fixed to the vehicle 10 (the side frame portion 15) by means other than the above-described bolts 34 and nuts 36.

As shown in FIG. 1, the side airbag apparatus includes an impact sensor 75 and a control device 76 in addition to the airbag module AM. The impact sensor 75 is, for example, an acceleration sensor, and is provided in the body side portion 11 of the vehicle 10 (refer to FIGS. 2 and 3) to detect impact applied to the body side portion 11 from the side. The control device 76 controls operation of the inflator 31 according to a detection signal from the impact sensor 75.

Figure 12:
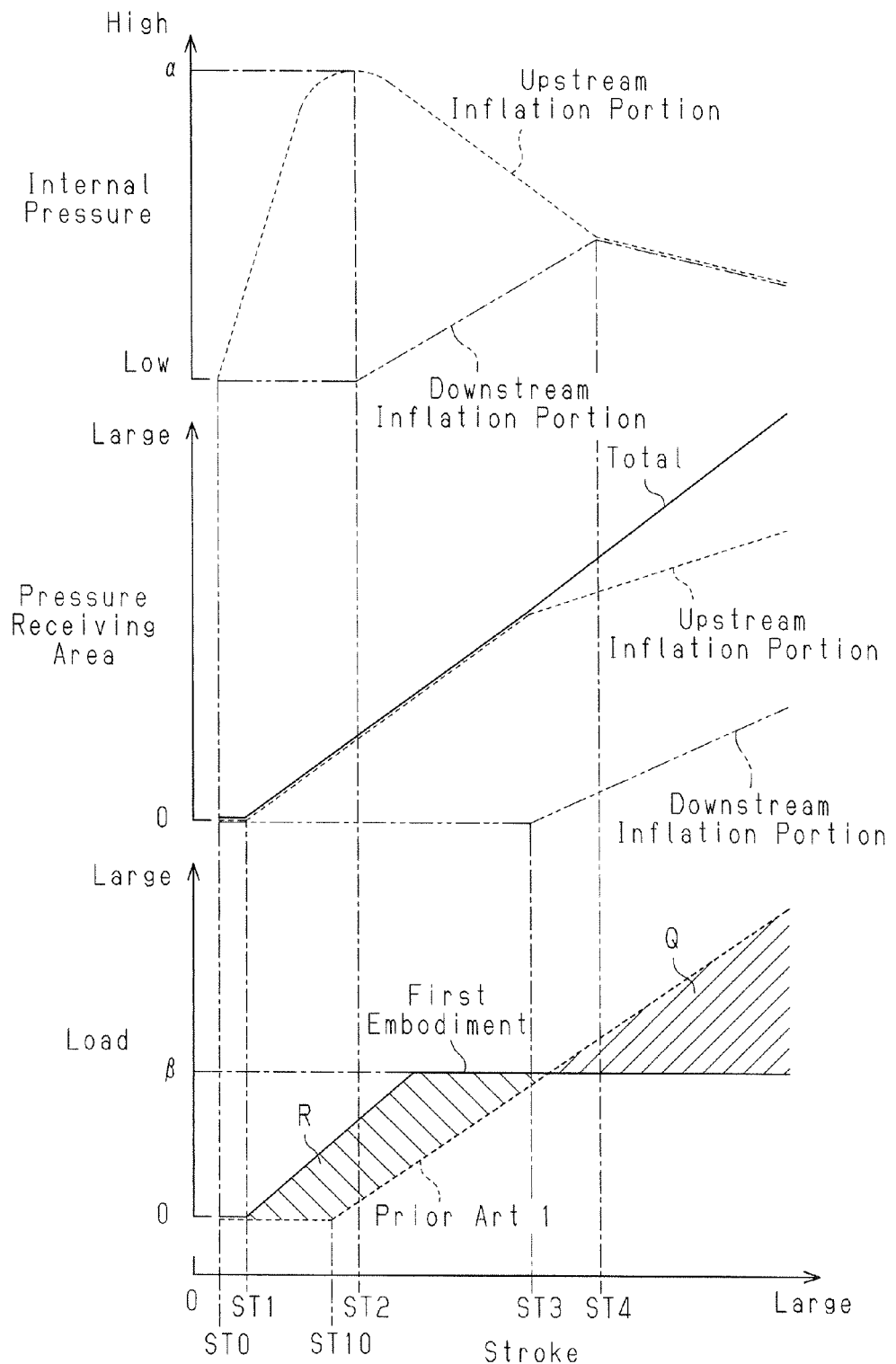
FIG. 12 is a characteristic view showing variation of internal pressure, pressure-receiving area and load in a case where the airbag is pressed onto the occupant by the body side portion entering toward the inside of the vehicle according to the first embodiment.

The side airbag apparatus according to the first embodiment is configured as described above. Next, a typical operational mode of the side airbag apparatus will be described with reference to FIGS. 11A to 11C. FIGS. 11A to 11C schematically show the state of the shape of the pressure regulating valve 70, which varies with time after supply of the inflation gas G, and details thereof are omitted and simplified. FIG. 12 shows how the pressure (internal pressure) of the inflation gas G in the upstream and downstream inflation portions 47, 48, the pressure-receiving area of the occupant P on the side of each of the inflation portions 47, 48 and the load applied from the airbag 40 to the occupant P vary depending on the entry amount of the body side portion 11 into the inside of the vehicle due to impact. The load is expressed by a product of the internal pressure and the pressure-receiving area.

In this side airbag apparatus, when no impact is applied to the vehicle 10 from the side, an operating signal for operating the inflator 31 is not output from the control device 76 to the inflator 31, and the inflation gas G is not supplied from the inflator 31 to the inflation portion 46 (upstream inflation portion 47). The airbag 40 in the storage form along with the inflator assembly 30 remains stored in the storage portion 18 (refer to FIG. 4). At this time, in the airbag 40, the fabric portions 43, 44 are close to each other. The partition member 50 is folded in half along the bend line 51 located upstream of the opposing ends 52, 53. The valve body portions 73, 74 overlap with each other in the upstream inflation portion 47. The entry amount (stroke) of the body side portion 11 is "0". The internal pressure of the inflation portions 47, 48 is low (substantially atmospheric pressure), and both the pressure-receiving area and the load are "0".

On the contrary, when impact having a predetermined value or more is applied to the body side portion 11 due to side collision during driving of the vehicle 10 and the impact is detected via the impact sensor 75, the operating signal for operating the inflator 31 is output from the control device 76 to the inflator 31 according to a detection signal. It is assumed that the entry amount of the body side portion 11 at this time is ST0. In response to the operating signal, a gas generating agent in the inflator 31 generates the high-temperature and high-pressure inflation gas G. This inflation gas G is first supplied to the upstream inflation portion 47, such that the upstream inflation portion 47 begins to inflate.

The partition member 50 folded in half is disposed in the inflation portion 46 such that the bend line 51 is located upstream of the opposing ends 52, 53. Further, the opposing ends 52, 53 of the partition member 50 are joined with the corresponding fabric portions 43, 44 of the airbag 40, respectively, via the outer joint portions 54, 55 (refer to FIGS. 7 and 8). The partition member 50 is also joined with the fabric portions 43, 44 at both ends (upper end and lower end) along the bend line 51 via the fringe joint portion 45 (refer to FIGS. 6 and 7). For this reason, as described above, when the upstream inflation portion 47 begins to inflate, the partition member 50 folded in half is pulled. A tension is applied to the partition member 50 in the direction along the bend line 51 (longitudinal direction) or in the direction perpendicular to the bend line 51 (transverse direction), resulting in that the partition member 50 attempts to become planar (refer to FIG. 9).

However, the whole of the partition member 50 does not necessarily have to be tensioned uniformly. Based on the mode of joining the partition member 50 with the fabric portions 43, 44, the vertical cross section of the upstream inflation portion 47 when inflated is substantially shaped like a long ellipse having a large curvature in the vicinity of upper and lower ends and a small curvature in the other regions, as shown in FIG. 9. Due to such oddly shaped (noncircular) cross section, an upper part P2 and a lower part P3 of the partition member 50 are harder to subject to tension than a part therebetween (the intermediate part P1). For this reason, even if the intermediate part P1 becomes substantially planar in the tensioned state, the upper part P2 and the lower part P3 of the partition member 50 are in the bent state (however, opened more than the folded state) such that the bend line 51 is located upstream of the opposing ends 52, 53 (refer to FIG. 11A).

An internal pressure PI is applied to the valve body portions 73, 74 located in the upstream inflation portion 47 from both sides in the overlapping direction (thickness direction). The internal pressure PI is not higher than that obtained at restraint of the occupant P by the inflation portion 46. The whole surfaces of the valve body portions 73, 74 are in close contact with each other due to the internal pressure PI, and are brought into a self-sealing state for restricting passage of the inflation gas G between the valve body portions 73, 74. Further, the overlapping portions 61 that are bent and laid on the non-overlapping portion 62 of the partition member 50 are pressed onto the non-overlapping portion 62 with the internal pressure PI (refer to FIG. 11A). Thus, the valve body portions 73, 74 can be closed more easily.

Here, as shown in FIG. 9, the partition member 50 is formed to be longer in the longitudinal direction (substantially vertical direction) than in the transverse direction (L1>L2). Thus, in the intermediate part P1 of the partition member 50, tension tends to be applied along the transverse direction more strongly than along the longitudinal direction. In the first embodiment, since the inner opening 71 extends in the transverse direction that is easily subjected to strong tension, the inner opening 71 is easy to be closed.

However, even with the above-described relation of tension intensity, since tension is also applied in the longitudinal direction so as to open the inner opening 71, the inner opening 71 does not necessarily have to be closed completely and may be opened. However, even in this case, the valve body portions 73, 74 are closed at their front ends 73T, 74T. The reason is that, even if tension of the intermediate part P1 acts as a force of pulling and opening the inner opening 71, the force is the largest at the inner opening 71, becomes smaller as the distance from the inner opening 71 increases, and becomes the smallest at the front ends 73T, 74T of the valve body portions 73, 74.

Further, in the first embodiment, the overlapping portions 61 bent toward the non-overlapping portion 62 are joined with the fabric portions 43, 44 along with the opposing ends 52, 53 at both ends in the direction along the inner joint portion 63 (transverse direction), via the outer joint portions 54, 55 (refer to FIG. 10B). For this reason, when the upstream inflation portion 47 is inflated, a strong tension is applied to the intermediate part P1 of the partition member 50 in the transverse direction as well as to the overlapping portions 61 in the same direction.

When at least a part of the valve body portions 73, 74 contact each other, the pressure regulating valve 70 is closed and the inflation gas G in the upstream inflation portion 47 is restricted from flowing to the downstream inflation portion 48 through between the valve body portions 73, 74 and the inner opening 71.

Due to the above-described restriction, the inflation gas G is accumulated in the upstream inflation portion 47 and after the entry amount ST0, only the internal pressure of the upstream inflation portion 47 starts to increase.

In the first embodiment, since the partition member 50 partitions the inflation portion 46 into the upstream inflation portion 47 and the downstream inflation portion 48, the capacity of the upstream inflation portion 47 is smaller than the capacity in the case where the inflation portion 46 is not partitioned (as in Prior Art 1). For this reason, the internal pressure of the upstream inflation portion 47 starts to increase earlier and becomes higher as compared to the case where the inflation portion 46 is not partitioned. In particular, the inflation gas G in the upstream inflation portion 47 is allowed to flow only between the valve body portions 73, 74, and does not flow to the downstream inflation portion 48 without passing between the valve body portions 73, 74. Accordingly, the passage of the inflation gas G never decreases the rising speed of the internal pressure of the upstream inflation portion 47.

At this time, the airbag 40 (inflation portion 46) does not contact the occupant P and thus, both the pressure-receiving area and the load still remain "0".

Figure 13:
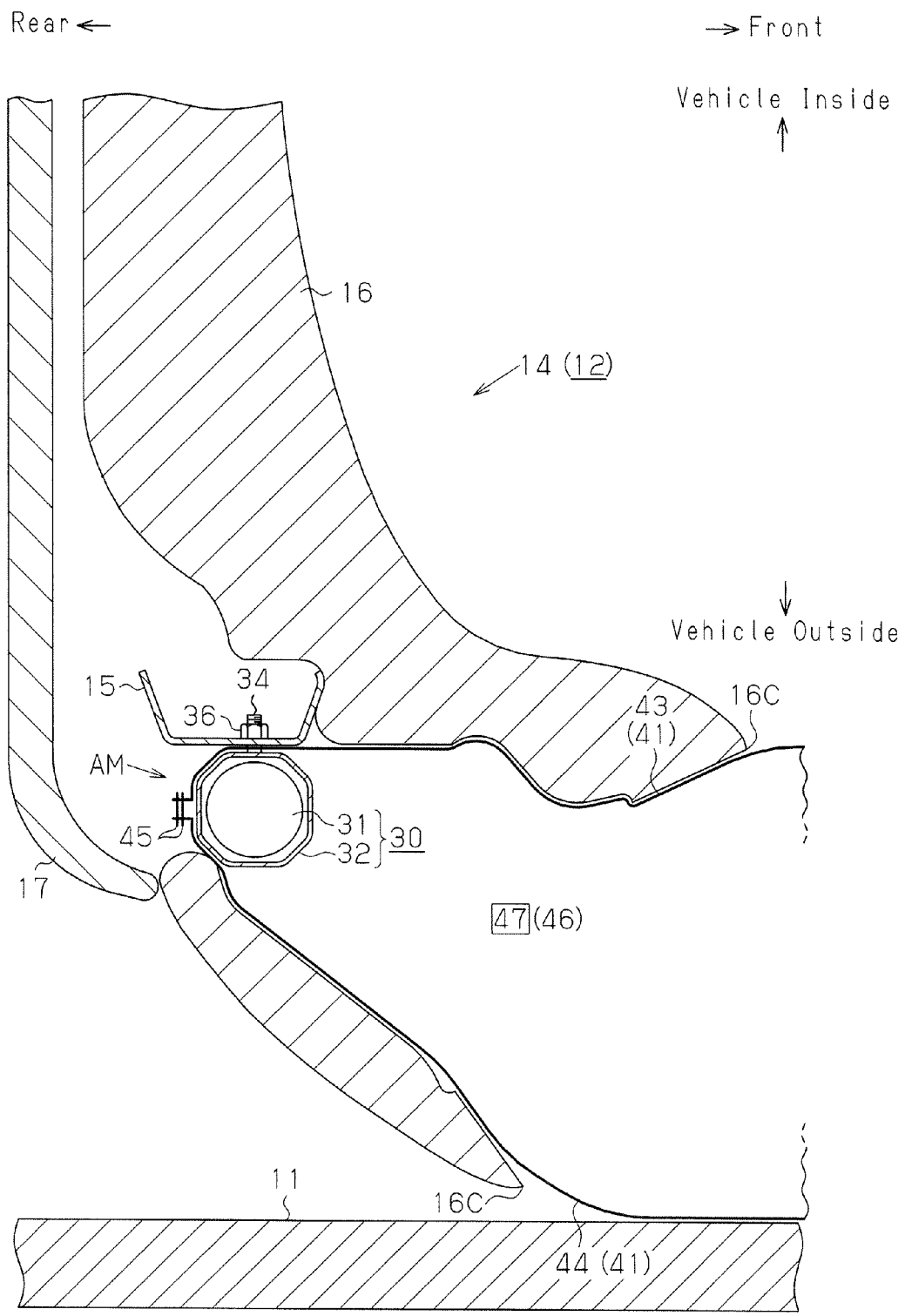
FIG. 13 is a partial sectional plan view showing a state where the airbag shown in FIG. 4 bursts out of the vehicle seat and is inflated and deployed with a part being left in the seat back.

Then, through the inflation, the upstream inflation portion 47 attempts to cancel the folded state in the reverse order to the folding order. When the upstream inflation portion 47 is inflated while undoing the folded state (being deployed), the seat pad 16 of the seat back 14 is pressed by the airbag 40, thereby breaking the breakable portion 21 (refer to FIG. 4). As shown in FIG. 13, the airbag 40 bursts out of the seat back 14 through the breakable portion with a part (part neighboring the inflator assembly 30) being left in the seat back 14.

Then, as shown in FIGS. 2 and 3, while receiving the inflation gas G, the upstream inflation portion 47 continues to be deployed forward between the body side portion 11 and the rear half of the upper half of the body of the occupant P seated in the vehicle seat 12 while undoing its folded state.

When the entry amount of the body side portion 11 reaches ST1, the inflation portion 46 starts to be pressed onto the upper half of the body of the occupant P by the body side portion 11. Since only the upstream inflation portion 47 is inflated in the inflation portion 46, the occupant P contacts only the upstream inflation portion 47 under the pressure of the inflation portion 46. For this reason, the area where the occupant P receives the pressure of the inflation portion 46 (the pressure-receiving area on the side of the inflation portion 46) is as small as the area where the occupant P receives the pressure of the upstream inflation portion 47 (the pressure-receiving area on the side of the upstream inflation portion 47). However, the pressure-receiving area on the side of the upstream inflation portion 47 increases as the body side portion 11 enters toward the inside of the vehicle according to the impact due to side collision, that is, the entry amount increases.

The load of impact received by the occupant P through the inflation portion 46 also increases with increases in the pressure-receiving area and the internal pressure. As described above, since the internal pressure of the upstream inflation portion 47 starts to increase earlier, in the case where the inflation portion 46 is not partitioned (Prior Art 1), the entry amount ST1 is smaller than an entry amount ST10 at which the load starts to increase. In other words, the load starts to increase at an earlier timing as compared to the case where the inflation portion 46 is not partitioned (Prior Art 1) and accordingly reaches a predetermined value $\beta$ for protecting the upper half of the body of the occupant P against impact earlier (refer to FIG. 12).

The inflation gas G is continuously supplied into the upstream inflation portion 47 in the state where the whole surfaces of the valve body portions 73, 74 are in close contact with each other (closed). On the other hand, when the entry amount of the body side portion 11 becomes ST2 and the internal pressure of the upstream inflation portion 47 rises up to a value $\alpha$ by the external force applied from the body side portion 11, the pressure regulating valve 70 starts to be opened.

Specifically, from the middle of the supply period of the inflation gas G to the inflation portion 46, the external force applied upon restraint of the occupant is added, thereby pressing and deforming the inflation portion 46, resulting in variation of the tension applied to the partition member 50. Further, through this deformation of the inflation portion 46, the internal pressure of the upstream inflation portion 47 further increases, thereby pressing the intermediate part P1 of the partition member 50 toward the downstream inflation portion 48 (refer to FIG. 11B), resulting in variation of the tension applied to the intermediate part P1. Then, receiving the increased internal pressure, the upper part P2 and the lower part P3 of the partition member 50 are deformed so as to inflate toward the downstream inflation portion 48. As described above, before restraint of the occupant, the upper part P2 and the lower part P3 are bent such that the bend line 51 is located upstream of the opposing ends 52, 53 (refer to FIG. 11A). At restraint of the occupant, the upper part P2 and the lower part P3 are deformed so as to be inverted from the shape before restraint of the occupant (refer to chain double-dashed lines in FIG. 11B). The shape change (inversion) of the upper part P2 and the lower part P3 can easily vary the tension applied to the intermediate part P1. This variation of the tension allows deformation of the inner opening 71 located in the intermediate part P1 as well as operation of the valve body portions 73, 74 located in the intermediate part P1.

At this time, the region of the partition member 50, which is subjected to tension, spreads in the vertical direction due to inversion of the upper part P2 and the lower part P3. Upward tension applied to the upper member 56 of the partition member 50 and downward tension applied to the lower member 57 of the partition member 50 increase. According to the variation of the tension, the slit-like inner opening 71 is pulled in the vertical direction and becomes easy to open.

The overlapping portions 61 are laid on the non-overlapping portion 62 and at both ends in the direction along the inner joint portion 63, are joined with the fabric portions 43, 44 of the airbag 40, respectively, via the joint portions 54, 55. For this reason, a strong force to maintain the overlapped state is exerted on the part near the outer joint portions 54, 55 in the overlapping portions 61. However, this force decreases as it is away from the outer joint portions 54, 55 and becomes minimum at the center in the direction along the inner joint portion 63, that is, at the valve body portions 73, 74. For this reason, the overlapping portions 61 pulled in the vertical direction are deformed in the vertical direction only at the valve body portions 73, 74 and their neighboring portions.

When the inner opening 71 is opened to some extent in the vertical direction, the overlapping portions 61 are pushed (inverted) to the downstream inflation portion 48 through the inner opening 71 only at the valve body portions 73, 74 receiving the high internal pressure PI of the upstream inflation portion 47. When a width W1 of the inner opening 71 in the vertical direction is small, the front ends 73T, 74T contact each other and the valve body portions 73, 74 are closed at the front ends 73T, 74T (refer to FIG. 11B). This state is maintained during a period when the width W1 of the inner opening 71 is smaller than a sum of widths W2 (=2·W2) of the valve body portions 73, 74 (refer to FIG. 11C).

When the width W1 of the inner opening 71 becomes larger than the sum (=2·W2), the front ends 73T, 74T are separated from each other (refer to FIG. 11C). The pressure regulating valve 70 is opened, thereby cancelling the above-described restriction. Due to the cancellation of restriction, the inflation gas G in the upstream inflation portion 47 can flow to the downstream inflation portion 48 through the inner opening 71 and between the valve body portions 73, 74.

Due to the passage of the inflation gas G, the internal pressure of the upstream inflation portion 47 is switched from increase to decrease. However, since the body side portion 11 is entering toward the inside of the vehicle and the inflation portion 46 is pressed onto the occupant P at the upstream inflation portion 47, the pressure-receiving area of the occupant P against the upstream inflation portion 47 continues to increase.

At an entry amount ST2 and thereafter, the downstream inflation portion 48 starts to be inflated by the inflation gas G and accordingly, the internal pressure of the downstream inflation portion 48 starts to increase. When the entry amount reaches ST3 with a slight delay from the increase in the internal pressure, by the body side portion 11 entering toward the inside of the vehicle, the upstream inflation portion 47 as well as the downstream inflation portion 48 contact the occupant P under pressure, resulting in that the area where the occupant P receives the pressure of the downstream inflation portion 48 (the pressure-receiving area on the side of the downstream inflation portion 48) starts to increase.

At an entry amount (stroke) ST4 and thereafter, the internal pressure of the upstream inflation portion 47 becomes equal to the internal pressure of the downstream inflation portion 48.

As described above, after opening of the pressure regulating valve 70 (entry amount ST2), the internal pressure of the upstream inflation portion 47 decreases and the internal pressure of the downstream inflation portion 48 increases. Further, the pressure-receiving area on the side of the upstream inflation portion 47 and the pressure-receiving area on the side of the downstream inflation portion 48 of the occupant P increase with a time difference. Thus, at the entry amount ST2 and thereafter, the load received by the occupant P from the whole of the inflation portion 46, that is, a sum of the load from the upstream inflation portion 47 and the load from the downstream inflation portion 48, is lower than a maximum value in the case where the airbag is constituted of only one inflation portion and the pressure regulating valve is not provided (Prior Art 1), and becomes a substantially constant value (predetermined value β).

In addition, at an early stage of the supply period of the inflation gas G, the load received by the occupant P from the inflation portion 46 increases earlier and after that, is kept to the predetermined low value β. For this reason, an energy absorption amount of the inflation portion 46 becomes equivalent to that in the case where the airbag is constituted of only one inflation portion and the pressure regulating valve is not provided (Prior Art 1). In the stroke-load characteristic in the first embodiment, a region having a high load in the latter half of the supply period of the inflation gas to the inflation portion (a region Q represented by upward sloping lines) according to Prior Art 1 shifts to a region having a low load in the former half of the supply period (a region R represented by downward sloping lines). Although the region Q and the region R are different from each other in shape, they are substantially the same as each other in area.

The inflation of the downstream inflation portion 48 attempts to cancel the folded state in the order reverse to the order of folding the downstream inflation portion 48. The downstream inflation portion 48 undoes its folded state (is deployed) forward between the body side portion 11 and the front half (thorax PT) of the upper half of the body of the occupant P.

In this manner, the airbag 40 is interposed between the upper half of the body of the occupant P and the body side portion 11 entering toward the inside of the vehicle. The airbag 40 presses the upper half of the body toward the inside in the vehicle widthwise direction and restrains the upper half. The side impact transmitted to the upper half of the body through the body side portion 11 is reduced by the airbag 40, which protects the upper half of the body.

Here, concerning the impact resistance at the time when the side impact is applied to the upper half of the body of the occupant P, the rear half is superior to the front half. This is due to the fact that the rear half has a backbone and a rear part of a rib is connected to the backbone, while a front part of the rib is not connected to any framework having a certain strength such as the backbone. For this reason, it is desired that the internal pressure of the inflation portion 46, which is exerted on the upper half of the body of the occupant P from the side with inflation and deployment of the airbag 40 is smaller in the front half than in the rear half.

In this connection, in the first embodiment, the inflation portion 46 is inflated in the front-back direction such that the partition member 50 is located in the vicinity of the boundary between the front half and the rear half of the upper half of the body. In the state where the inflation portion 46 of the airbag 40 is inflated and deployed, the upstream inflation portion 47 is located near the side of the rear half of the upper half of the body and the downstream inflation portion 48 is located near the side of the front half of the upper half of the body (refer to FIG. 3). Accordingly, at an early stage of the restraint of the occupant P by the airbag 40, the rear half having a higher impact resistance than the front half in the upper half of the body of the occupant P is pressed by the upstream inflation portion 47, the internal pressure of which earlier increases. In addition, at an early stage of the restraint, the front half having a lower impact resistance in the upper half of the body of the occupant P is pressed by the downstream inflation portion 48 having a smaller internal pressure than the upstream inflation portion 47.

The first embodiment described above in detail has the following advantages.

(1) The elongated partition member 50 having the length L1 in the longitudinal direction longer than the length L2 in the transverse direction when being tensioned to be planar upon inflation of the inflation portion 46 is employed (FIG. 9). The slit-like inner opening 71 that is provided on the partition member 50 and extends in the transverse direction and the pair of valve body portions 73, 74 that are provided around the inner opening 71 and are close to or separated from each other constitute the pressure regulating valve 70 (FIG. 10).

Thus, during inflation of the upstream inflation portion 47, in the partition member 50, the pressure regulating valve 70 is opened with strong tension applied to the transverse direction rather than the longitudinal direction, thereby restraining the inflation gas G in the upstream inflation portion 47 from passing to the downstream inflation portion 48.

Further, when the external force generated upon restraint of the occupant is applied to the inflation portion 46, the increasing internal pressure of the upstream inflation portion 47 can deform the partition member 50 to vary the tension. Further, the airbag 40 can be squeezed between the occupant P and the body side portion 11 (door trim) and deformed, thereby varying the tension applied to the partition member 50. Variation of the tension applied to the partition member 50 can allow deformation of the inner opening 71 and operation of the valve body portions 73, 74. By opening the inner opening 71, pushing the valve body portions 73, 74 to the downstream inflation portion 48 through the inner opening 71 with the internal pressure of the upstream inflation portion 47 to be inverted and separating the front ends 73T, 74T, the restriction can be cancelled and the inflation gas G can be passed from the upstream inflation portion 47 to the downstream inflation portion 48.

As described above, in the first embodiment, with the simple and inexpensive configuration using the inner opening 71 and the pair of valve body portions 73, 74, it is possible to realize a pressure regulating valve 70 that is closed at an early stage of the supply period of the inflation gas G to the inflation portion 46 and is opened from the middle of the supply period. Through this operation of the pressure regulating valve 70, the load received by the upper half of the body of the occupant P through the airbag 40 can reach the predetermined value β within a short time and then, be kept to the predetermined value β, which is suitable for properly restraining and protecting the occupant P.

(2) Before inflation of inflation portion 46, the valve body portions 73, 74 are disposed in the upstream inflation portion 47 (FIG. 8).

For this reason, during inflation of the upstream inflation portion 47 and before restraint of the occupant, the valve body portions 73, 74 can be brought into close contact with each other and put into the self-sealing state with the internal pressure PI of the upstream inflation portion 47 (FIG. 11A).

During restraint of the occupant by the airbag 40, the overlapping portions 61 can be inverted only at the valve body portions 73, 74 and pushed out to the downstream inflation portion 48 through the inner opening 71 (FIG. 11B), thereby opening the pressure regulating valve 70 (FIG. 11C).

(3) The partition member 50 is folded along the bend line 51 in half such that the opposing ends 52, 53 facing each other are located close to each other. The partition member 50 folded in half is disposed in the inflation portion 46 in the uninflated and deployed state in the state where the bend line 51 is located upstream of the opposing ends 52, 53. The partition member 50 are joined with the corresponding fabric portions 43, 44 of the airbag 40 at the opposing ends 52, 53 via the outer joint portions 54, 55, and joined with the corresponding fabric portions 43, 44 at both ends in the longitudinal direction (substantially vertical direction) via the fringe joint portion 45, that is, are sewn together (FIGS. 6 and 10).

For this reason, during inflation of the upstream inflation portion 47, the upper part P2 and the lower part P3 of the partition member 50 are bent such that the bend line 51 is located upstream of the opposing ends 52, 53 (FIG. 11A). When the external force generated upon restraint of the occupant is applied to the inflation portion 46, due to the increasing internal pressure PI of the upstream inflation portion 47, the shape of the upper part P2 and the lower part P3 is changed (inverted) such that the bend line 51 is located downstream of the opposing ends 52, 53, that is, to the reverse shape (before restraint of the occupant (FIG. 11B). This change of shape can easily cause the change in the tension applied to the partition member 50 (intermediate part P1) so as to allow deformation of the inner opening 71 and operation of the valve body portions 73, 74.

At this time, through inversion of the upper part P2 and the lower part P3, the region where the partition member 50 is tensioned can be extended in the longitudinal direction (vertical direction), and the inner opening 71 and the valve body portions 73, 74 can be pulled in the same direction to open (i.e. the pressure regulating valve 70 can be opened).

In particular, in the first embodiment, in connection with the above-described (2) self-sealing function, both of the sealing property during closing of the pressure regulating valve 70 and the flowing property during opening of the pressure regulating valve 70 can be simultaneously improved.

(4) In the state the edges 58E, 59E of the two members 56, 57 match with each other, the ends 58, 59 of the members 56, 57 are overlapped in a band shape. Further, the partition member 50 is formed by joining the members 56, 57 with each other via the inner joint portion 63 provided in the boundary between the overlapping portions 61 and the non-overlapping portion 62. The inner opening 71 is formed by undoing the joint of the members 56, 57 in a part of the inner joint portion 63. Parts (neighboring portions) corresponding to the inner opening 71 in the overlapping portions 61 are set as the valve body portions 73, 74 (FIG. 10).

Thus, by joining the two members 56, 57 with each other with a part of the boundary between the non-overlapping portion 62 and the overlapping portions 61 being left, the partition member 50, the inner opening 71 and the valve body portions 73, 74 can be formed at one time. There is no need to perform a special operation for forming the inner opening 71 and the valve body portions 73, 74.

Specifically, the valve body portions 73, 74 are integrated into the partition member 50. More precisely, one valve body portion 73 is integrated into the member 56 and the other valve body portion 74 is integrated into the member 57. For this reason, as compared to the case where the valve body portions 73, 74 are formed of parts that are different from parts for the partition member 50 (members 56, 57), the number of parts can be reduced. Furthermore, there is no need to perform an operation of joining these parts with the partition member 50 (members 56, 57).

(Second Embodiment)

Next, a second embodiment embodying the present invention will be described with reference to FIGS. 14 to 17.

Figure 14:
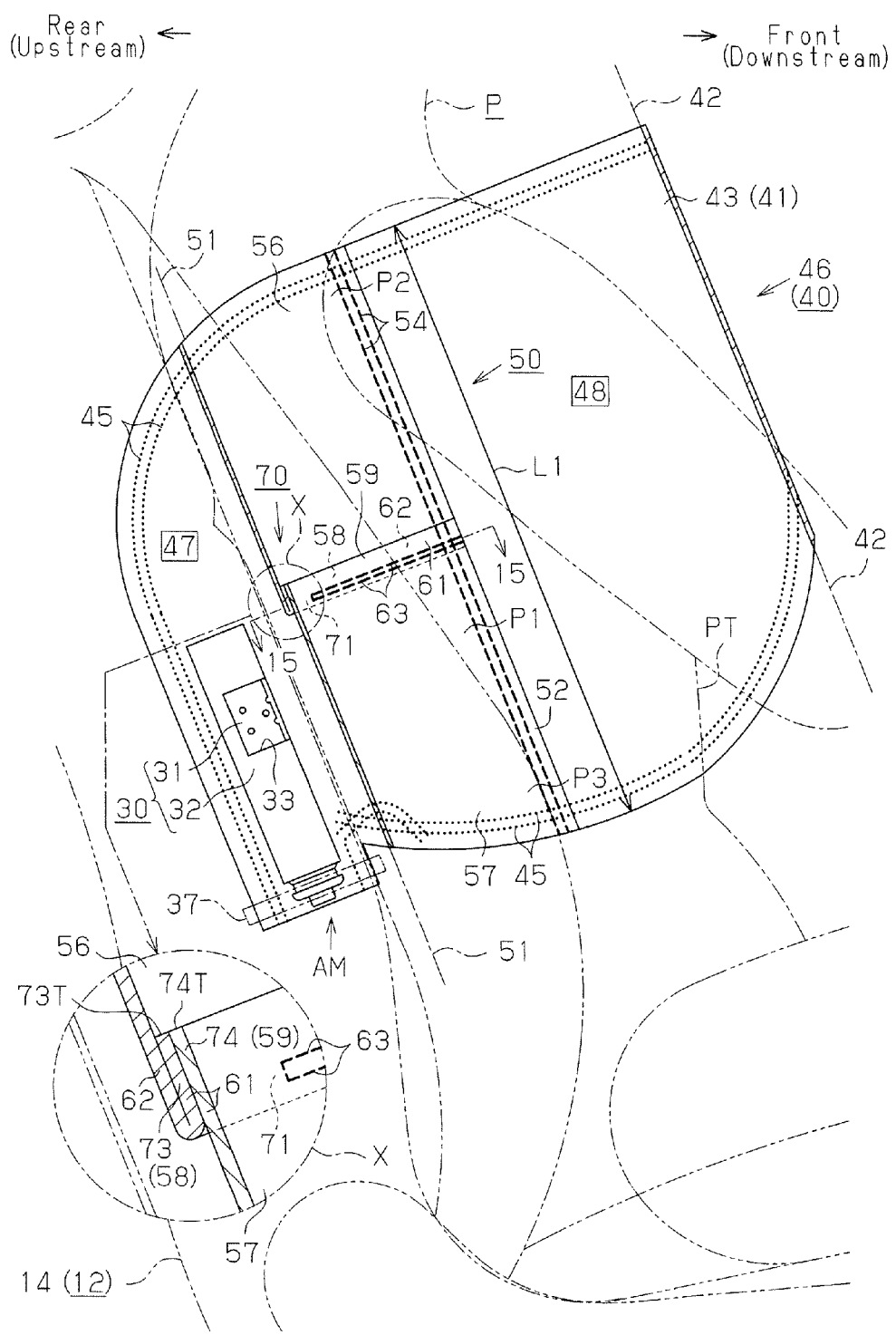
FIG. 14 is a view showing a second embodiment embodying the present invention and is a partial side sectional view showing the airbag module having the airbag in the uninflated and deployed state, which is cut at the center in the vehicle widthwise direction, along with the vehicle seat and the occupant.
Figure 15:
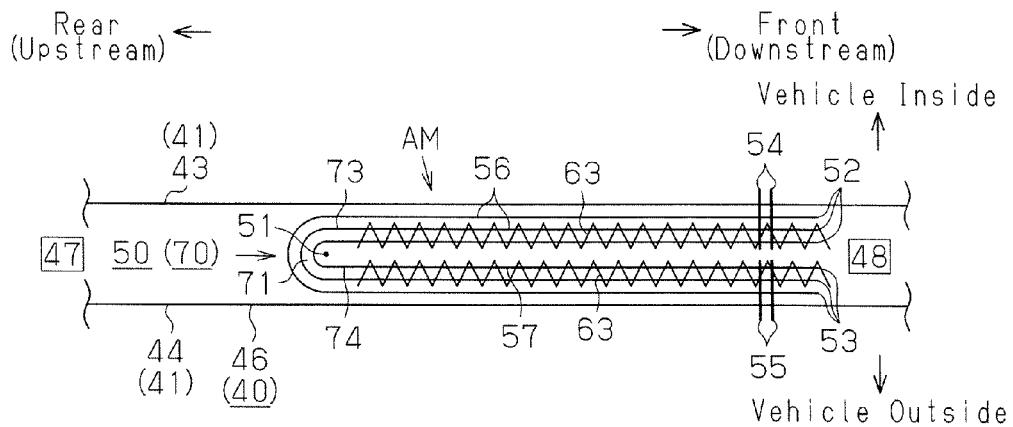
FIG. 15 is a partial sectional view showing a sectional configuration of the partition member and the like taken along line 15-15 in FIG. 14.
Figure 16:
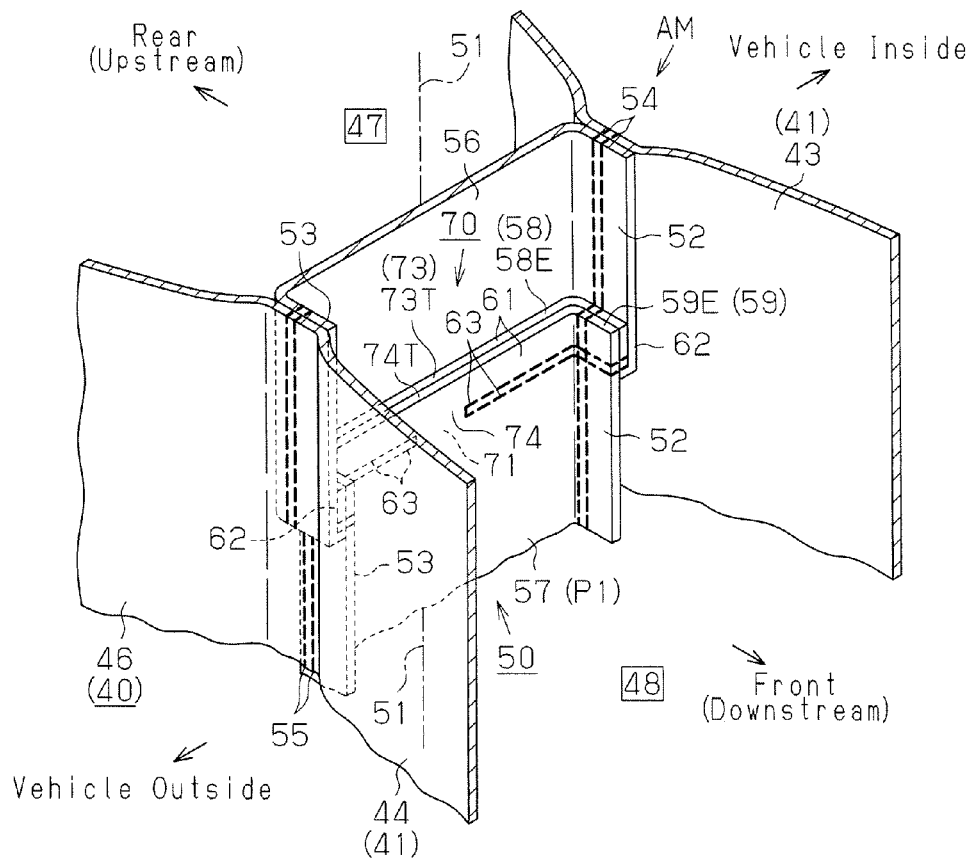
FIG. 16 is a partial perspective view showing the neighboring portion of the pressure regulating valve in the partition member tensioned to be planar according to the second embodiment.
Figure 17:
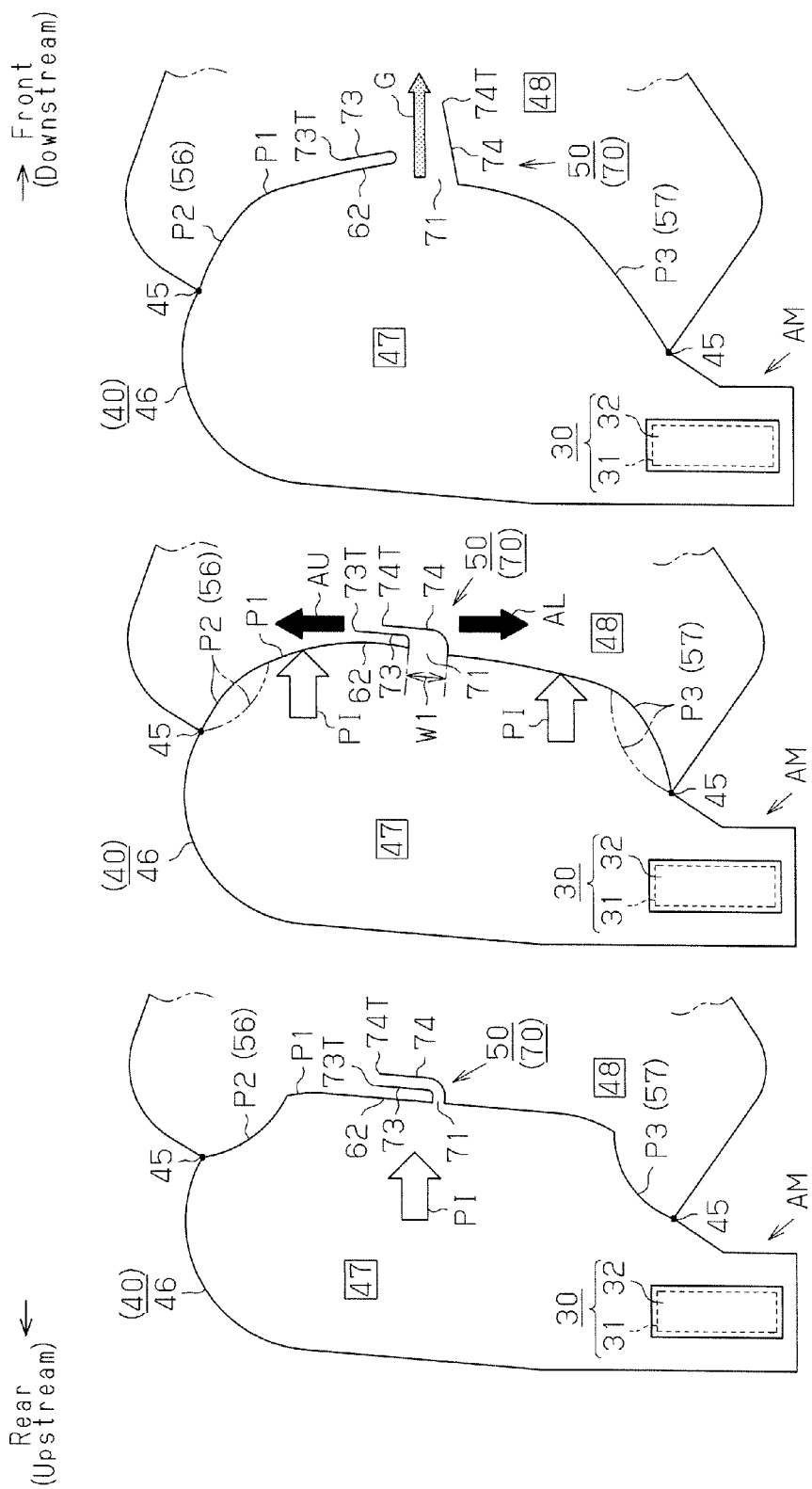
FIG. 17A is an explanatory view showing operation of the pressure regulating valve according to the second embodiment.
FIG. 17B is an explanatory view showing operation of the pressure regulating valve according to the second embodiment.
FIG. 17C is an explanatory view showing operation of the pressure regulating valve according to the second embodiment.

The second embodiment is different from the first embodiment in that, as shown in FIGS. 14 to 16, the pair of overlapping portions 61 including the valve body portions 73, 74 are disposed in the downstream inflation portion 48 before inflation of the inflation portion 46. Thus, similar points and members to those in the first embodiment are given the same reference numerals and detailed description thereof is omitted. In FIG. 14, an area surrounded by a large circle X expressed by a chain line represents an enlargement of an area surrounded by a small circle X.

In this case, the overlapping portions 61 including the valve body portions 73, 74 behave differently as compared to the first embodiment.

Before supply of the inflation gas G to the inflation portion 46, the partition member 50 is folded in half such that the bend line 51 is disposed upstream of the opposing ends 52, 53 (refer to FIGS. 14 and 15).

When the upstream inflation portion 47 starts to be inflated by supply of the inflation gas G to the inflation portion 46, as shown in FIG. 16 and FIG. 17A, the partition member 50 folded in half is pulled, thereby applying tension to the partition member 50 in the longitudinal direction or the transverse direction. Due to this tension, in the partition member 50, the intermediate part P1 becomes tensioned in a substantially planar manner, while the upper part P2 and the lower part P3 are bent such that the bend line 51 is located upstream of the opposing ends 52, 53.

Here, in the partition member 50 that satisfies the relation L1>L2, stronger tension tends to be applied in the transverse direction (the direction perpendicular to the bend line 51) than in the longitudinal direction (the direction along the bend line 51). For this reason, the inner opening 71 extending in the transverse direction is easily closed according to the relation of tension intensity.

Further, when the upstream inflation portion 47 is inflated, stronger tension is applied to the partition member 50 in the transverse direction than in the longitudinal direction, and stronger tension is also applied to the overlapping portions 61 including the valve body portions 73, 74 in the transverse direction than in the longitudinal direction. Due to this tension, the whole surfaces of the valve body portions 73, 74 are in close contact with each other and sealed so as to suppress leakage of the inflation gas G. Accordingly, the inflation gas G in the upstream inflation portion 47 is hard to pass to the downstream inflation portion 48 through the inner opening 71 and between the valve body portions 73, 74.

In the second embodiment, the valve body portions 73, 74 are disposed in the downstream inflation portion 48 even before inflation of the inflation portion 46. For this reason, unlike the first embodiment, since the internal pressure of the upstream inflation portion 47 is not applied to the valve body portions 73, 74 from both sides in the overlapping direction (thickness direction), the valve body portions 73, 74 will not be self-sealed. Further, there is no possibility that the overlapping portions 61 including the valve body portions 73, 74 will be pressed onto the non-overlapping portion 62 of the partition member 50 by the internal pressure.

When the inflation gas G continues to be supplied into the upstream inflation portion 47 through the opened pressure regulating valve 70, and as shown in FIG. 17B, the inflation portion 46 is pressed and deformed by the external force generated upon restraint of the occupant, the tension applied to the partition member 50 varies. With the deformation of the inflation portion 46, the internal pressure PI of the upstream inflation portion 47 further increases. The intermediate part P1 of the partition member 50 is pressed, thereby varying the tension applied to the intermediate part P1.

Further, the upper part P2 and the lower part P3 of the partition member 50 are pressed at the increased the internal pressure PI so as to be inflated toward the downstream inflation portion 48 (refer to a solid line in FIG. 17B). In other words, the upper part P2 and the lower part P3 are deformed so as to be inverted from the bent state before restraint of the occupant (refer to a chain double-dashed line in FIG. 17B) and tension applied to the intermediate part P1 easily varies, allowing deformation of the inner opening 71 and operation of the valve body portions 73, 74.

However, at deformation of the intermediate part P1, the overlapping portions 61 fixed at their both ends are also pressed and deformed at areas other than both ends so as to be inflated toward the downstream inflation portion 48. Since the deforming direction is the same as the thickness direction of the valve body portions 73, 74, the valve body portions 73, 74 are harder to move in the thickness direction than in the direction of separating from each other. For this reason, when the external force applied with restraint of the occupant is relatively small, the valve body portions 73, 74 are in close to each other and exert a high sealing property.

As the external force applied with restraint of the occupant increases, due to inversion of the upper part P2 and the lower part P3, the area where the partition member 50 is tensioned spreads in both directions with respect to the longitudinal direction (vertical direction). Upward tension applied to the upper member 56 of the partition member 50 and downward tension applied to the lower member 57 of the partition member 50 increase. According to the change of the tension, the slit-like inner opening 71 is pulled in the upward and downward directions and becomes easy to open.

As the width W1 of the inner opening 71 in the vertical direction increases, the upper valve body portion 73 is pulled upward as expressed by arrow AU and the lower valve body portion 74 is pulled downward as expressed by arrow AL. A strong force to maintain the overlapped state is exerted on areas of the overlapping portions 61 in the vicinity of the outer joint portions 54, 55. However, this force becomes smaller as the distance from the outer joint portions 54, 55 increases, and becomes minimum at the center in the direction along the inner joint portion 63, that is, at the valve body portions 73, 74. For this reason, the overlapping portions 61 pulled in the vertical direction are deformed at the valve body portions 73, 74 and their neighboring portions in the vertical direction as the direction of separating the overlapping portions 61 from each other, resulting in that the overlapped portion of the valve body portions 73, 74 gradually decreases.

Then, as shown in FIG. 17C, at least either of the valve body portions (for example, the lower valve body portion 74) is inclined (bent) forward, thereby opening the pressure regulating valve 70. As represented by an arrow in FIG. 17C, the inflation gas G in the upstream inflation portion 47 flows forward to the downstream inflation portion 48 through the inner opening 71 and between the valve body portions 73, 74.

Therefore, the second embodiment can achieve the following advantage in addition to the above-described advantages (1), (3) and (4).

(5) The partition member 50 is provided with the pair of overlapping portions 61 that each extend in the form of a band in the transverse direction and is located in the downstream inflation portion 48 before inflation of the inflation portion 46, and areas corresponding to the inner opening 71 are set as the valve body portions 73, 74 in the overlapping portions 61. Both overlapping portions 61 are bent along the boundary between the overlapping portions 61 and the non-overlapping portion 62 of the partition member 50, and are joined with the corresponding fabric portions 43, 44 of the airbag 40 at their both ends in the transverse direction (FIG. 16).

Thus, at inflation of the upstream inflation portion 47, stronger tension is applied to the partition member 50 as well as the overlapping portions 61 in the transverse direction than in the longitudinal direction, thereby bringing the whole surfaces of the valve body portions 73, 74 into close contact with each other and sealing the valve body portions 73, 74. At restraint of the occupant P by the inflation portion 46, the valve body portions 73, 74 can be kept in close contact with each other until a large external force is applied with the restraint, thereby achieving a high sealing property.

Therefore, the side airbag apparatus according to the second embodiment is especially effective in the case where it is required to open the pressure regulating valve 70 during a relatively long period from an initial time at restraint of the occupant to keep a high sealing property.

(Third Embodiment)

Next, a third embodiment embodying the present invention will be described with reference to FIGS. 18 to 22.

Figure 18:
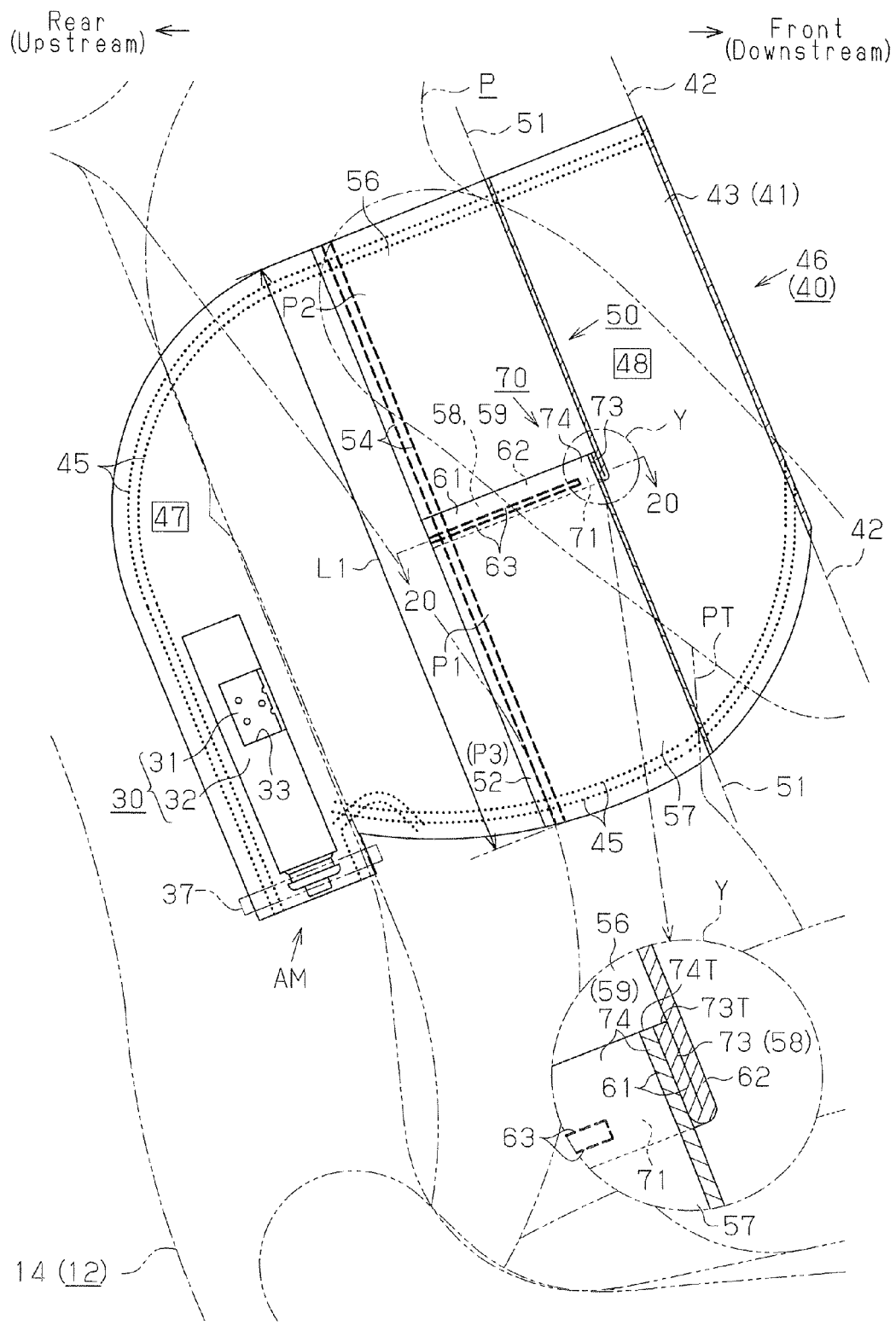
FIG. 18 is a view showing a third embodiment embodying the present invention and is a partial side sectional view showing the airbag module having the airbag in the uninflated and deployed state, which is cut at the center in the vehicle widthwise direction, along with the vehicle seat and the occupant.
Figure 19:
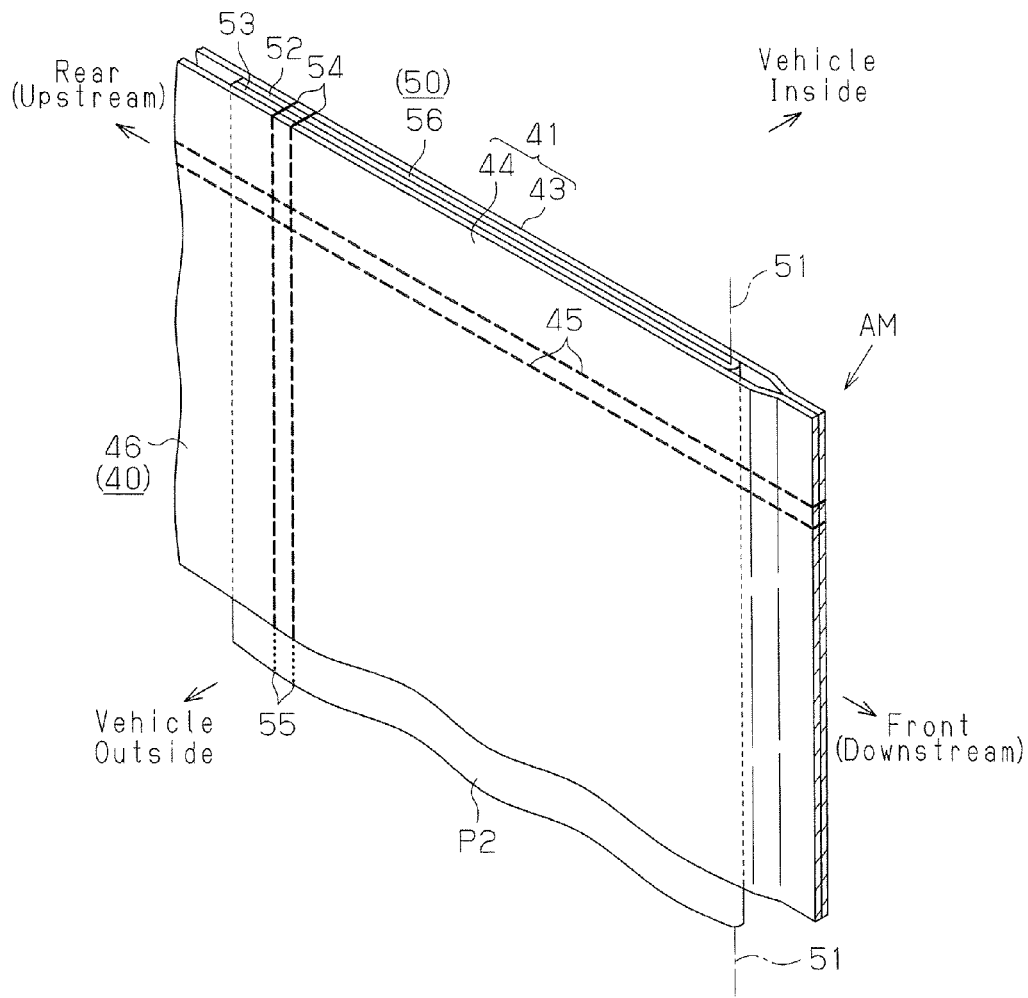
FIG. 19 is a partial perspective view showing an upper part of the airbag module having the airbag in the uninflated and deployed state according to the third embodiment when viewed from diagonally upward and forward.
Figure 20:
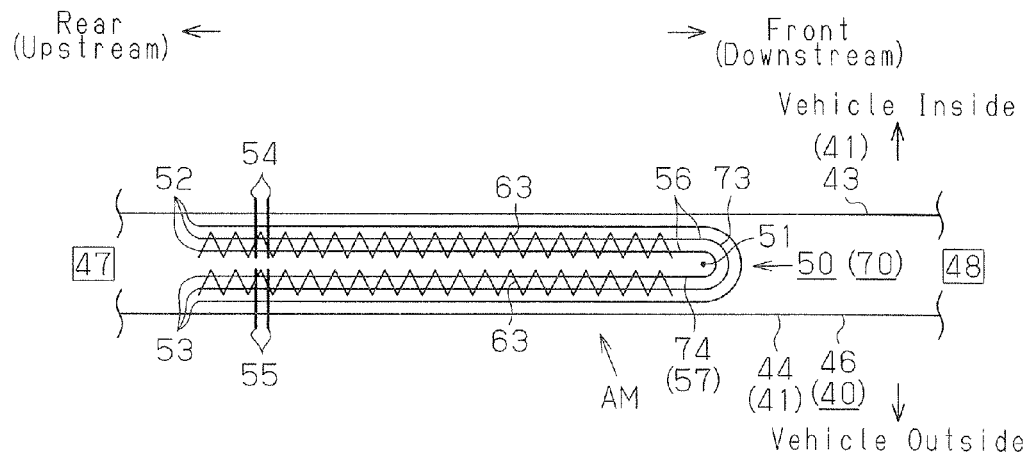
FIG. 20 is a partial sectional view showing a sectional configuration of the partition member and the like taken along line 20-20 in FIG. 18.

In the third embodiment, as shown in FIGS. 18 to 20, the partition member 50 is folded in half along the bend line 51 extending in the longitudinal direction such that the opposing ends 52, 53 facing each other are close to each other. The partition member 50 is disposed in the inflation portion 46 in the uninflated and deployed state such that the bend line 51 is located downstream of the opposing ends 52, 53.

This other configuration is similar to that in the first embodiment. Thus, similar points and members to those in the first embodiment are given the same reference numerals and detailed description thereof is omitted. In FIG. 18, an area surrounded by a large circle Y expressed by a chain line represents an enlargement of an area surrounded by a small circle Y.

In this case, before supply of the inflation gas to the inflation portion 46, the partition member 50 is folded in half such that the bend line 51 is located downstream of the opposing ends 52, 53 (refer to FIGS. 18 to 20).

Figure 21:
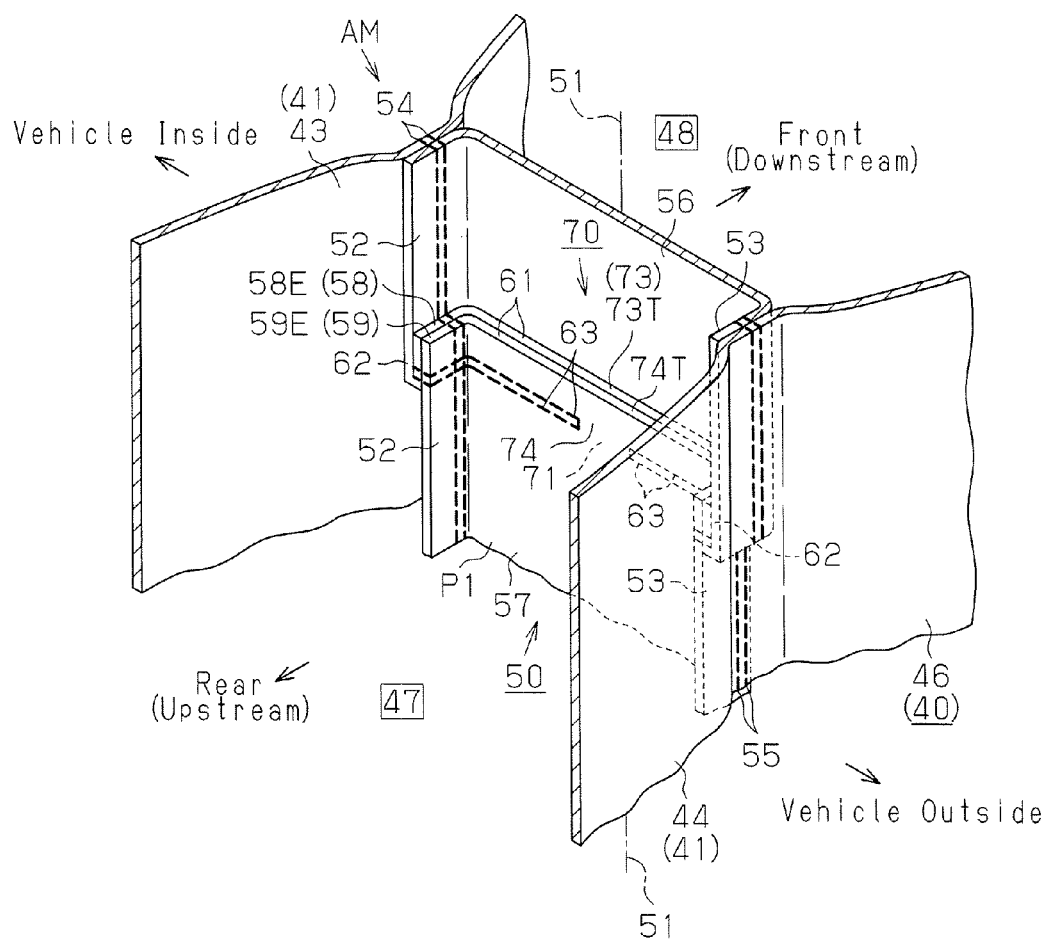
FIG. 21 is a partial perspective view showing the neighboring portion of the pressure regulating valve in the partition member tensioned to be planar according to the third embodiment.
Figure 22:
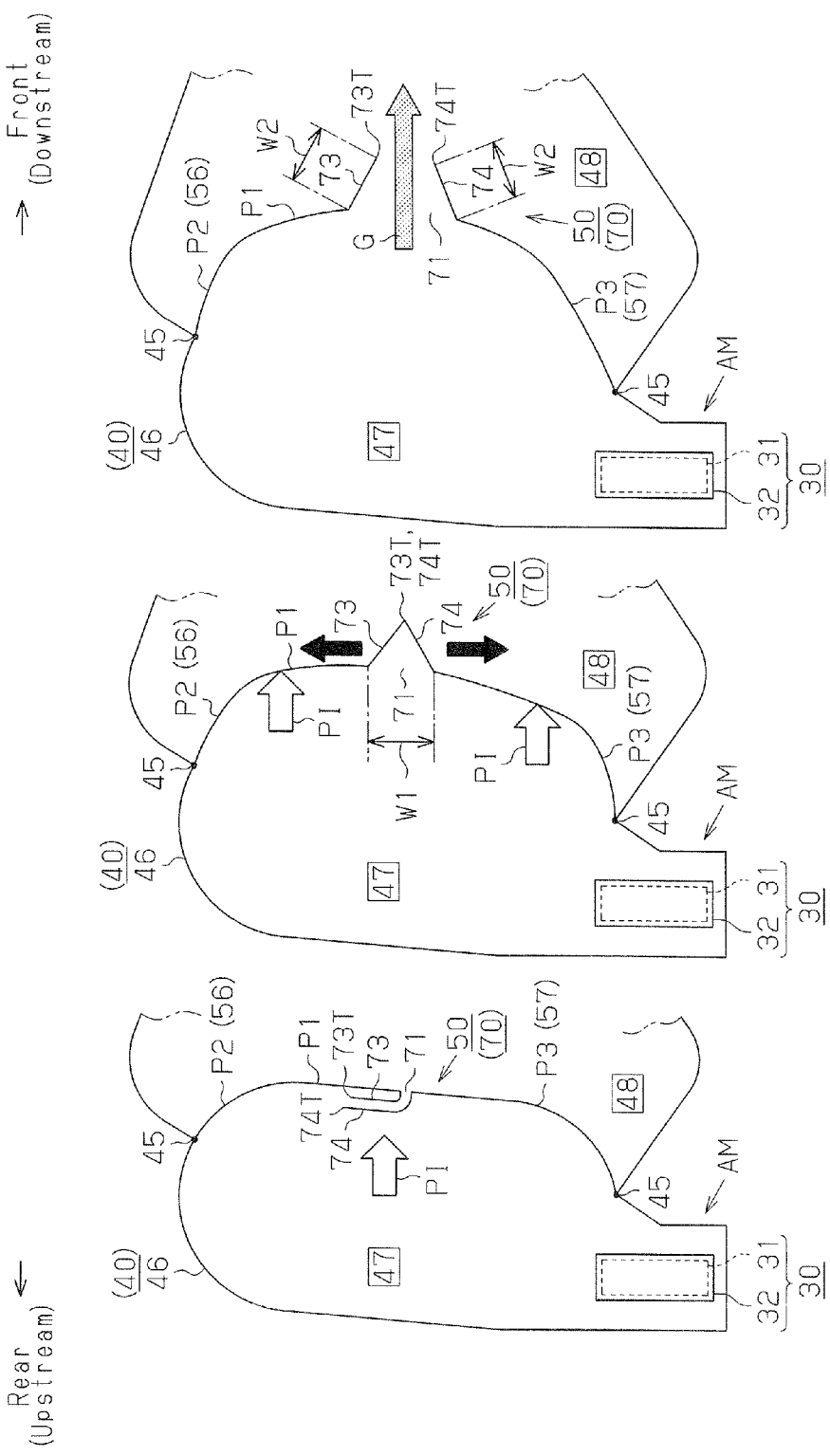
FIG. 22A is an explanatory view showing operation of the pressure regulating valve according to the third embodiment.
FIG. 22B is an explanatory view showing operation of the pressure regulating valve according to the third embodiment.
FIG. 22C is an explanatory view showing operation of the pressure regulating valve according to the third embodiment.

As shown in FIG. 21 and FIG. 22A, when the upstream inflation portion 47 starts to be inflated by supply of the inflation gas G to the inflation portion 46, the partition member 50 folded in half is pulled, thereby applying tension to the partition member 50 in the longitudinal direction or the transverse direction. Due to this tension, in the partition member 50, the intermediate part P1 becomes tensioned in a substantially planar manner, while the upper part P2 and the lower part P3 are bent such that the bend line 51 is located downstream of the opposing ends 52, 53.

The internal pressure PI is applied to the valve body portions 73, 74 located in the upstream inflation portion 47 from both sides in the overlapping direction (the thickness direction). This internal pressure PI is lower than that at restraint of the occupant P by the inflation portion 46. The whole surfaces of the valve body portions 73, 74 are in close contact with each other at the internal pressure PI and are self-sealed, thereby preventing passage of the inflation gas G between the valve body portions 73, 74. Further, the overlapping portions 61 that are bent and laid on the non-overlapping portion 62 of the partition member 50 are pressed onto the non-overlapping portion 62 at the internal pressure PI (refer to FIG. 22A), and thus, the valve body portions 73, 74 are easier to be closed.

Also in the third embodiment, like the first embodiment, in the elongated partition member 50 that satisfies the relation of L1>L2, the inner opening 71 extends in the transverse direction (refer to FIG. 21). In the partition member 50, stronger tension tends to be applied in the transverse direction than in the longitudinal direction. For this reason, the inner opening 71 extending in the transverse direction is easily closed according to the relation of tension intensity.

When the upstream inflation portion 47 is inflated, stronger tension is applied to the overlapping portions 61 including the valve body portions 73, 74 in the transverse direction than in the longitudinal direction. Due to this tension, the whole surfaces of the valve body portions 73, 74 are in close contact with each other and self-sealed to prevent leakage of the inflation gas G. For this reason, the inflation gas G in the upstream inflation portion 47 is hard to pass to the downstream inflation portion 48 through the inner opening 71 and between the valve body portions 73, 74.

When the inflation gas G continues to be supplied into the upstream inflation portion 47 through the opened pressure regulating valve 70 and the inflation portion 46 is pressed and deformed by the external force generated upon restraint of the occupant, the tension applied to the partition member 50 varies. With the deformation of the inflation portion 46, the internal pressure PI of the upstream inflation portion 47 further increases. The intermediate part P1 of the partition member 50 is pressed, thereby varying the tension applied to the intermediate part P1.

On the other hand, the upper part P2 and the lower part P3 of the partition member 50 are pressed at the increased internal pressure PI so as to be inflated toward the downstream inflation portion 48. As described above, before restraint of the occupant, the upper part P2 and the lower part P3 are bent such that the bend line 51 is located downstream of the opposing ends 52, 53. The shape of the upper part P2 and the lower part P3 during restraint of the occupant is similar to that before restraint of the occupant. Accordingly, as compared to the first embodiment, variation of tension applied to the intermediate part P1 due to shape change in the partition member 50 is smaller. For this reason, it is hard to allow deformation of the inner opening 71 and operation of the valve body portions 73, 74.

At this time, unlike the first embodiment, the upper part P2 and the lower part P3 are not inverted. Thus, there is a small possibility that the region where the partition member 50 is tensioned spreads in the longitudinal direction (the vertical direction) and tension in both directions relative to the longitudinal direction (the vertical direction) increases. For this reason, the inner opening 71 and the valve body portions 73, 74 are easily kept in the closed state, thereby maintaining the sealing property.

The following process is similar to that in the first embodiment. Specifically, as the upper member 56 of the partition member 50 is deformed toward the downstream inflation portion 48, upward tension increases. As the lower member 57 is deformed toward the downstream inflation portion 48, downward tension increases. Due to such variation of tension, the slit-like inner opening 71 is pulled in the vertical direction and opened (refer to FIG. 22B).

When the inner opening 71 is opened to some extent in the vertical direction, in the overlapping portions 61, only the valve body portions 73, 74 that receive the high internal pressure PI of the upstream inflation portion 47 are pressed toward the downstream inflation portion 48 through the inner opening 71 to be inverted (refer to FIG. 22B).

Then, when the width W1 of the inner opening 71 becomes larger than 2·W2, the front ends 73T, 74T are separated from each other (refer to FIG. 22C). As a result, the pressure regulating valve 70 is opened, and the inflation gas G in the upstream inflation portion 47 can pass to the downstream inflation portion 48 through the inner opening 71 and the valve body portions 73, 74 in this order.

Therefore, the third embodiment can achieve the following advantage in addition to above-described advantages (1), (2) and (4).

(6) The partition member 50 is folded in half along the bend line 51 extending in the longitudinal direction such that the opposing ends 52, 53 facing each other are located close to each other. The partition member 50 folded in half is disposed in the inflation portion 46 in the uninflated and deployed state such that the bend line 51 is located downstream of the opposing ends 52, 53. Further, the partition member 50 is joined with the corresponding fabric portions 43, 44 of the airbag 40 at the opposing ends 52, 53 via the outer joint portions 54, 55, and are joined with the fabric portions 43, 44 at both ends in the longitudinal direction (the substantially vertical direction) via the fringe joint portion 45 (FIG. 18, FIG. 21).

For this reason, during inflation of the inflation portion 46, the upper part P2 and the lower part P3 of the partition member 50 are bent such that the bend line 51 is located downstream of the opposing ends 52, 53 (FIG. 22A). When the external force generated upon restraint of the occupant is applied to the inflation portion 46, due to the increased internal pressure of the upstream inflation portion 47, the upper part P2 and the lower part P3 are shaped such that the bend line 51 is located downstream of the opposing ends 52, 53, that is, are shaped in the same way as before restraint of the occupant. As compared to the first and second embodiments, variation of tension applied to the intermediate part P1 due to shape change in the upper part P2 and the lower part P3 can be reduced, thereby limiting deformation of the inner opening 71 and operation of the valve body portions 73, 74 although allowing them. The inner opening 71 and the valve body portions 73, 74 can be kept in the closed state to maintain the sealing property. Accordingly, it is easy to keep the internal pressure of the upstream inflation portion 47 high and then, pass the inflation gas G to the downstream inflation portion 48.

(Fourth Embodiment)

Next, a fourth embodiment embodying the present invention will be described with reference to FIG. 23 to FIG. 26C.

Figure 23:
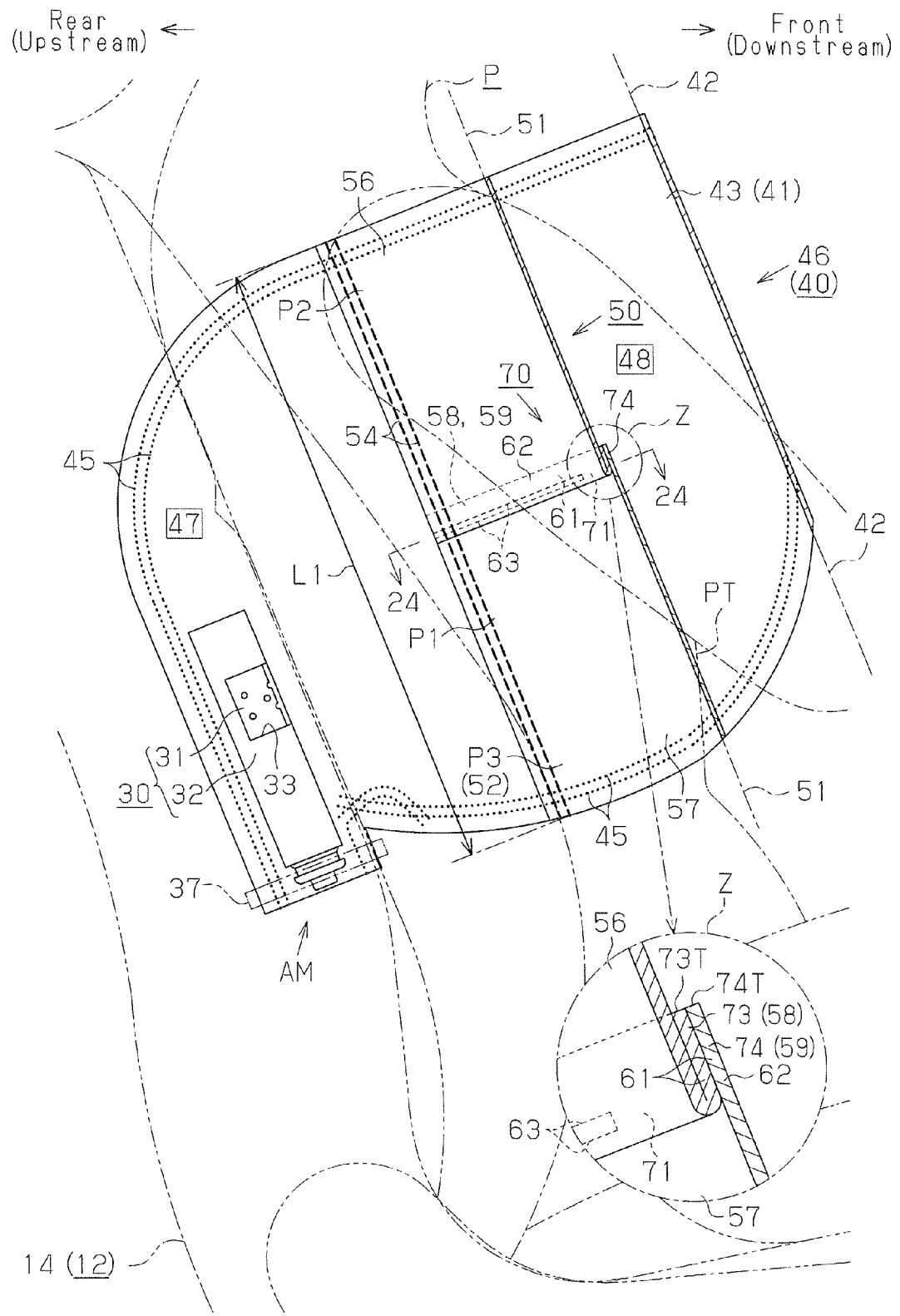
FIG. 23 is a view showing a fourth embodiment embodying the present invention and is a partial side sectional view showing the airbag module having the airbag in the uninflated and deployed state, which is cut at the center in the vehicle widthwise direction, along with the vehicle seat and the occupant.
Figure 24:
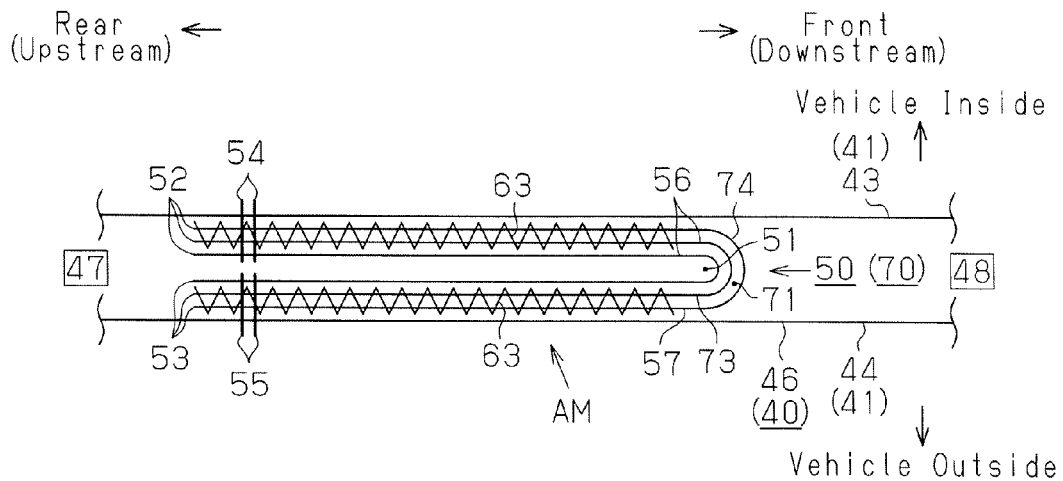
FIG. 24 is a partial sectional view showing a sectional configuration of the partition member and the like taken along line 24-24 in FIG. 23.
Figure 25:
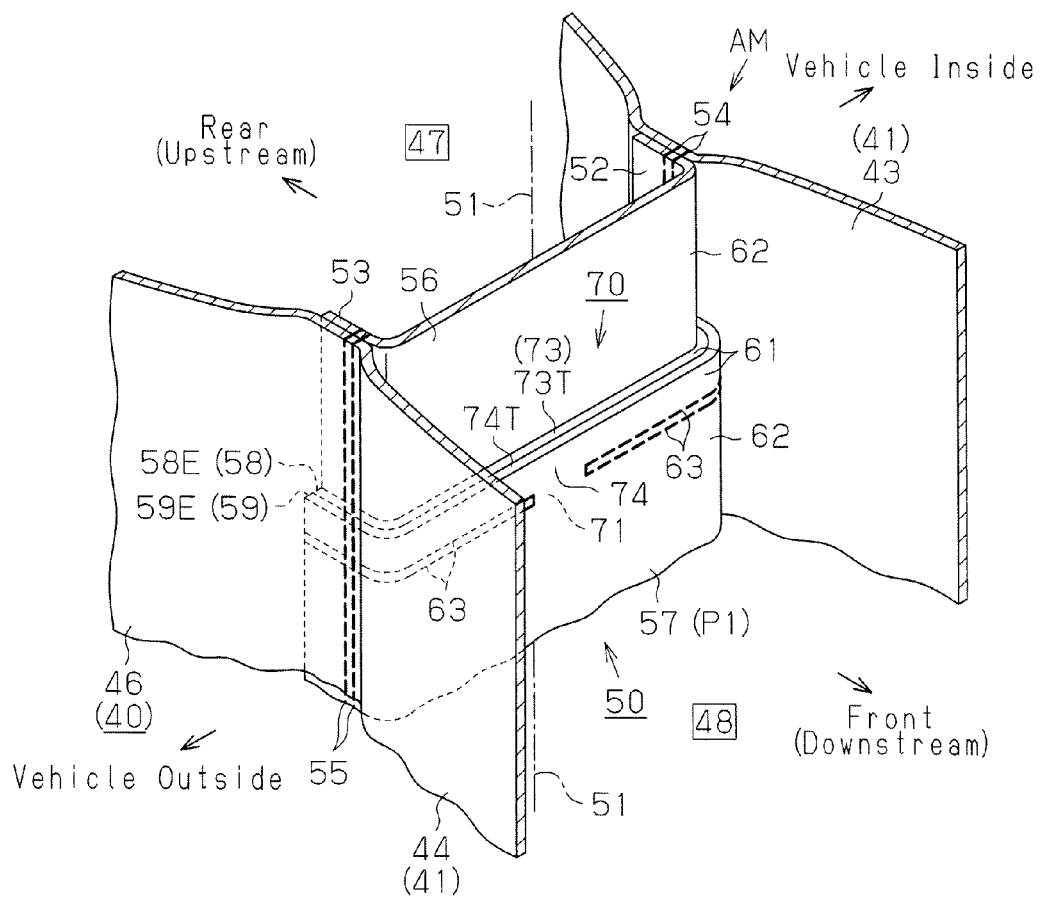
FIG. 25 is a partial perspective view showing the neighboring portion of the pressure regulating valve in the partition member tensioned to be planar according to the fourth embodiment.

The fourth embodiment is different from the third embodiment in that, as shown in FIGS. 23 and 24, the overlapping portions 61 including the valve body portions 73, 74 are disposed in the downstream inflation portion 48 before inflation of the inflation portion 46. Thus, points and members similar to those in the third embodiment are given the same reference numerals and detailed description thereof is omitted. In FIG. 23, an area surrounded by a large circle Z expressed by a chain line represents an enlargement of an area surrounded by a small circle Z.

In this case, before supply of the inflation gas G to the inflation portion 46, the partition member 50 is folded in half such that the bend line 51 is located downstream of the opposing ends 52, 53 (refer to FIG. 23 and FIG. 24A to FIG. 24C).

When the upstream inflation portion 47 starts to be inflated by supply of the inflation gas G to the inflation portion 46, the partition member 50 folded in half is pulled, thereby applying a tension to the partition member 50 in the longitudinal direction or the transverse direction. Due to this tension, in the partition member 50, the intermediate part P1 becomes tensioned in a substantially planar manner (refer to FIG. 25), while the upper part P2 and the lower part P3 are bent such that the bend line 51 is located downstream of the opposing ends 52, 53 (refer to FIG. 26A).

Here, in the fourth embodiment, the valve body portions 73, 74 are located in the downstream inflation portion 48 even before inflation of the inflation portion 46. For this reason, unlike the third embodiment, there is no possibility that the internal pressure of the upstream inflation portion 47 is applied to both sides of the valve body portions 73, 74 in the overlapping direction (the thickness direction) and the valve body portions 73, 74 are self-sealed. Also, there is no possibility that the overlapping portions 61 including the valve body portions 73, 74 are pressed onto the non-overlapping portion 62 of the partition member 50 by the internal pressure.

However, in the elongated partition member 50 that satisfies the relation of L1>L2, since the inner opening 71 extends in the transverse direction, stronger tension tends to be applied in the transverse direction than in the longitudinal direction, the inner opening 71 is easily closed.

In addition, stronger tension is also applied to the overlapping portions 61 including the valve body portions 73, 74 in the transverse direction than in the longitudinal direction. Due to this tension, the whole surfaces of the valve body portions 73, 74 are in close contact with each other and sealed so as to prevent leakage of the inflation gas G. Accordingly, the inflation gas G in the upstream inflation portion 47 is hard to pass to the downstream inflation portion 48 through the inner opening 71 and between the valve body portions 73, 74.

On the other hand, when the inflation portion 46 is pressed and deformed by the external force generated upon restraint of the occupant, the tension applied to the partition member 50 varies. Through the deformation of the inflation portion 46, the internal pressure PI of the upstream inflation portion 47 further increases. The intermediate part P1 of the partition member 50 is pressed, thereby varying the tension applied to the intermediate part P1.

Figure 26A:
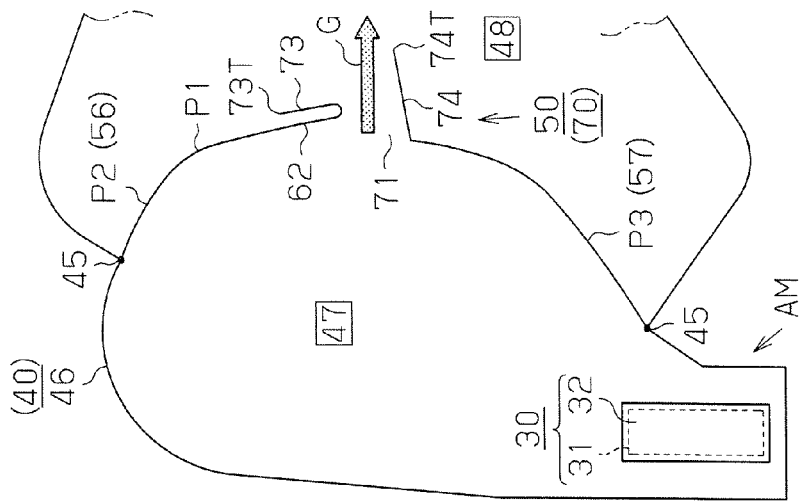
FIG. 26A is an explanatory view showing operation of the pressure regulating valve according to the fourth embodiment.
Figure 26B:
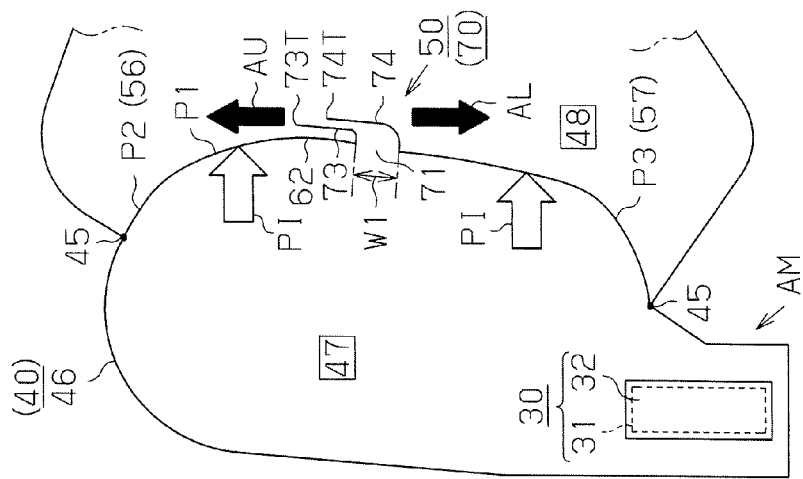
FIG. 26B is an explanatory view showing operation of the pressure regulating valve according to the fourth embodiment.

Further, the upper part P2 and the lower part P3 of the partition member 50 are pressed and deformed so as to be inflated toward the downstream inflation portion 48 (refer to FIG. 26B). As described above, before restraint of the occupant, the upper part P2 and the lower part P3 are bent such that the bend line 51 is located downstream of the opposing ends 52, 53 (refer to FIG. 26A). The shape of the upper part P2 and the lower part P3 during restraint of the occupant is similar to that before restraint of the occupant. Accordingly, as compared to the second embodiment, variation of tension applied to the intermediate part P1 due to shape change in the upper part P2 and the lower part P3 is reduced. Thus, it is hard to allow deformation of the inner opening 71 and operation of the valve body portions 73, 74.

At this time, since the upper part P2 and the lower part P3 are not inverted, there is a small possibility that the region where the partition member 50 is tensioned spreads in the longitudinal direction (the vertical direction), thereby increasing tension applied in both directions relative to the longitudinal direction (the vertical direction). For this reason, the inner opening 71 and the valve body portions 73, 74 are easily kept in the closed state, thereby maintaining the sealing property.

In addition, upon inflation of the intermediate part P1, the overlapping portions 61 fixed at their both ends are pressed and deformed at positions other than both ends so as to inflate toward the downstream inflation portion 48. Since the deformation direction is the same as the thickness direction of the valve body portions 73, 74, the valve body portions 73, 74 are harder to move in the thickness direction than in the direction of being separated from each other relative to the plane direction. For this reason, when the external force generated upon restraint of the occupant is relatively small, the valve body portions 73, 74 are in close contact with each other, exerting a high sealing property.

The subsequent process is the same as that in the second embodiment. Specifically, as the external force generated upon restraint of the occupant increases, upward tension applied to the upper member 56 of the partition member 50 and downward tension applied to the lower member 57 of the partition member 50 increase. For this reason, the slit-like inner opening 71 is pulled in the vertical direction and is opened (refer to FIG. 26B).

As the width W1 of the inner opening 71 in the vertical direction increases, the upper valve body portion 73 is pulled upward and the lower valve body portion 74 is pulled downward. The overlapping portions 61 are deformed at the valve body portions 73, 74 and neighboring portions in the vertical direction and the overlapped portion of the valve body portions 73, 74 gradually decrease.

Figure 26C:
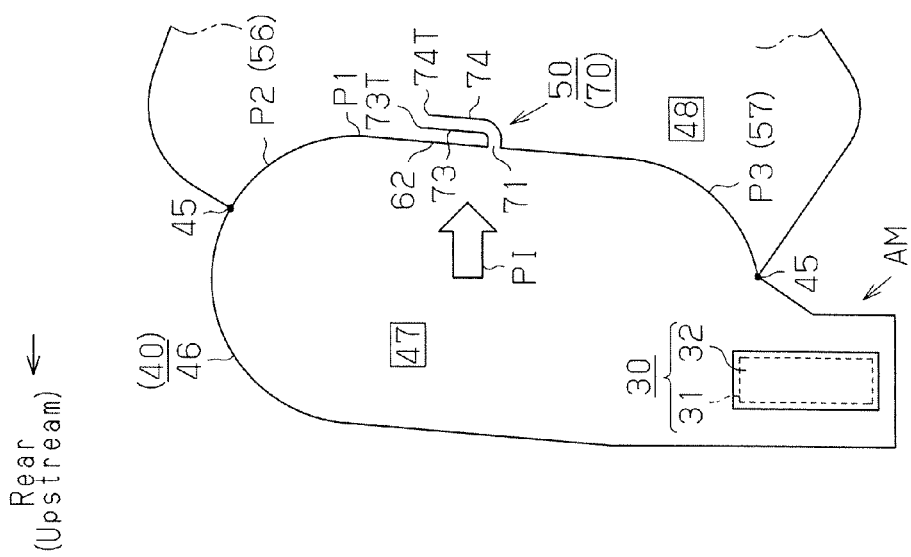
FIG. 26C is an explanatory view showing operation of the pressure regulating valve according to the fourth embodiment.

Then, when the inflation portion 46 is largely deformed by the large external force generated upon restraint of the occupant, as shown in FIG. 26C, at least either of the valve body portions (for example, the lower valve body portion 74) is inclined (bent) forward, thereby opening the pressure regulating valve 70. As shown by an arrow in FIG. 26C, the inflation gas G in the upstream inflation portion 47 flows forward to the downstream inflation portion 48 through the inner opening 71 and between the valve body portions 73, 74.

Therefore, the fourth embodiment can achieve similar advantages to the above-described advantages (1) and (4) to (6). In particular, since the valve body portions 73, 74 are harder to move in the fourth embodiment than in the third embodiment, it is easy to keep the internal pressure of the upstream inflation portion 47 higher than that in the third embodiment and then, pass the inflation gas G in the upstream inflation portion 47 to the downstream inflation portion 48.

When the fabric portions 43, 44 of the airbag 40 are compared with the sewing yarn used for the fringe joint portion 45, the former is superior in heat resistance. The high-temperature inflation gas G is ejected from the inflator 31. For this reason, in terms of heat resistance, it is more preferable to fold a single piece of fabric in half in the vicinity of the inflator 31 than to sew one or two pieces of fabric of the airbag 40 in the vicinity of the inflator 31.

However, in this case, it is difficult to employ configuration in the first and third embodiments among the first to fourth embodiments in terms of production. Since the airbag 40 is formed of a single piece of fabric, the joint portions must be provided in the order of the outer joint portions 54, 55, the inner joint portion 63 and the fringe joint portion 45. In performing operation in this order, it is very difficult to provide the outer joint portions 54, 55 and the inner joint portion 63 such that the overlapping portions 61 are located in the upstream inflation portion 47. After all, it is needed to employ the configuration in the second and fourth embodiments in which the overlapping portions 61 are located in the downstream inflation portion 48. Accordingly, the second and fourth embodiments are superior to the first and third embodiments in which the overlapping portions 61 are located in the upstream inflation portion 47 in terms of easiness of production.

(Fifth Embodiment)

Next, a fifth embodiment embodying the present invention will be described with reference to FIG. 6, FIG. 27 and FIG. 28.

As described above, the airbag 40 is formed into a bag by joining the pair of fabric portions 43, 44 with each other via the fringe joint portion 45 provided along the fringes of the fabric portions 43, 44. Further, as described above, before supply of the inflation gas G, the partition member 50 is folded in half along the bend line 51 extending in the longitudinal direction such that the opposing ends 52, 53 facing each other are located close to each other, and are disposed between the fabric portions 43, 44 of the airbag 40. Furthermore, as described above, the partition member 50 is joined with the fabric portions 43, 44 at the opposing ends 52, 53 via the outer joint portions 54, 55, and is joined with the fabric portions 43, 44 at their both ends in the longitudinal direction via the fringe joint portion 45. It should be noted that although only members of the airbag 40, which are located on the inner side of the vehicle than the center in the vehicle widthwise direction, will be described below, the same description also applies to members on the outer side of the vehicle.

Here, when the outer joint portion 54 for joining the opposing end 52 of the partition member 50 with the fabric portion 43 of the airbag 40 extends in parallel to the bend line 51 (refer to FIG. 6 and the like), a distance D1 between the outer joint portion 54 and the bend line 51 become uniform at any position in the longitudinal direction including an intersecting portion 51C of the bend line 51 and the fringe joint portions 45.

On the other hand, upon inflation of the inflation portion 46, the partition member 50 is tensioned to be planar so as to be perpendicular to the inflating direction (forward (substantially to the right in FIG. 6)). The opposing end 52 of the partition member 50 is joined with the fabric portion 43 of the airbag 40 via the outer joint portion 54, while the folded portion of the partition member 50 is joined with the fabric portion 43 at its both ends in the longitudinal direction via the fringe joint portion 45. For this reason, when the partition member 50 is tensioned to be planar as described above, the folded portion of the partition member 50 along the bend line 51 is pulled and moved toward the outer joint portion 54 in the direction of inflation of the inflation portion 46. As expressed by arrow A1 in FIG. 6, a joined part between the folded portion and the fabric portion 43, that is, the intersecting portion 51C of the bend line 51 and the fringe joint portion 45 is, like the other positions of the folded portion, pulled and moved toward the outer joint portion 54. The positions other than the folded portion are not directly joined with the fabric portion 43 and thus, is not restricted to move. However, at the joined part between the folded portion and the fabric portion 43 (the intersecting portion 51C of the bend line 51 and the fringe joint portion 45), the fringe joint portion 45 prevents movement of the intersecting portion 51C. Accordingly, the intersecting portion 51C, unlike the other positions of the folded portion, is forcibly pulled and subjected to a large load.

At this time, the outer joint portion 54 is parallel to the bend line 51 and as shown in FIG. 6, the distance D1 between the bend line 51 and the outer joint portion 54 is large. Thus, the movement (pulling distance) of the intersecting portion 51C largely separated from the outer joint portion 54 rearward is large, resulting in that a pulling force that acts on the intersecting portion 51C becomes large. As a result, a stress concentrates on the intersecting portion 51C, thereby possibly causing a large load. Although this can be addressed by reinforcing the intersecting portion 51C, for example, by adding reinforcing fabric, the reinforcing fabric and an operation of joining the reinforcing fabric with the airbag 40 are required, leading to an increase in costs.

Then, in the fifth embodiment, this is addressed by devising the shape of the outer joint portion 54 for joining the opposing end 52 with the fabric portion 43.

The outer joint portion 54 is provided such that the distance D1 between the outer joint portion 54 and the bend line 51 is smaller than the intermediate part in the longitudinal direction at an intersecting portion 54C of the outer joint portion 54 and the fringe joint portion 45.

Figure 27:
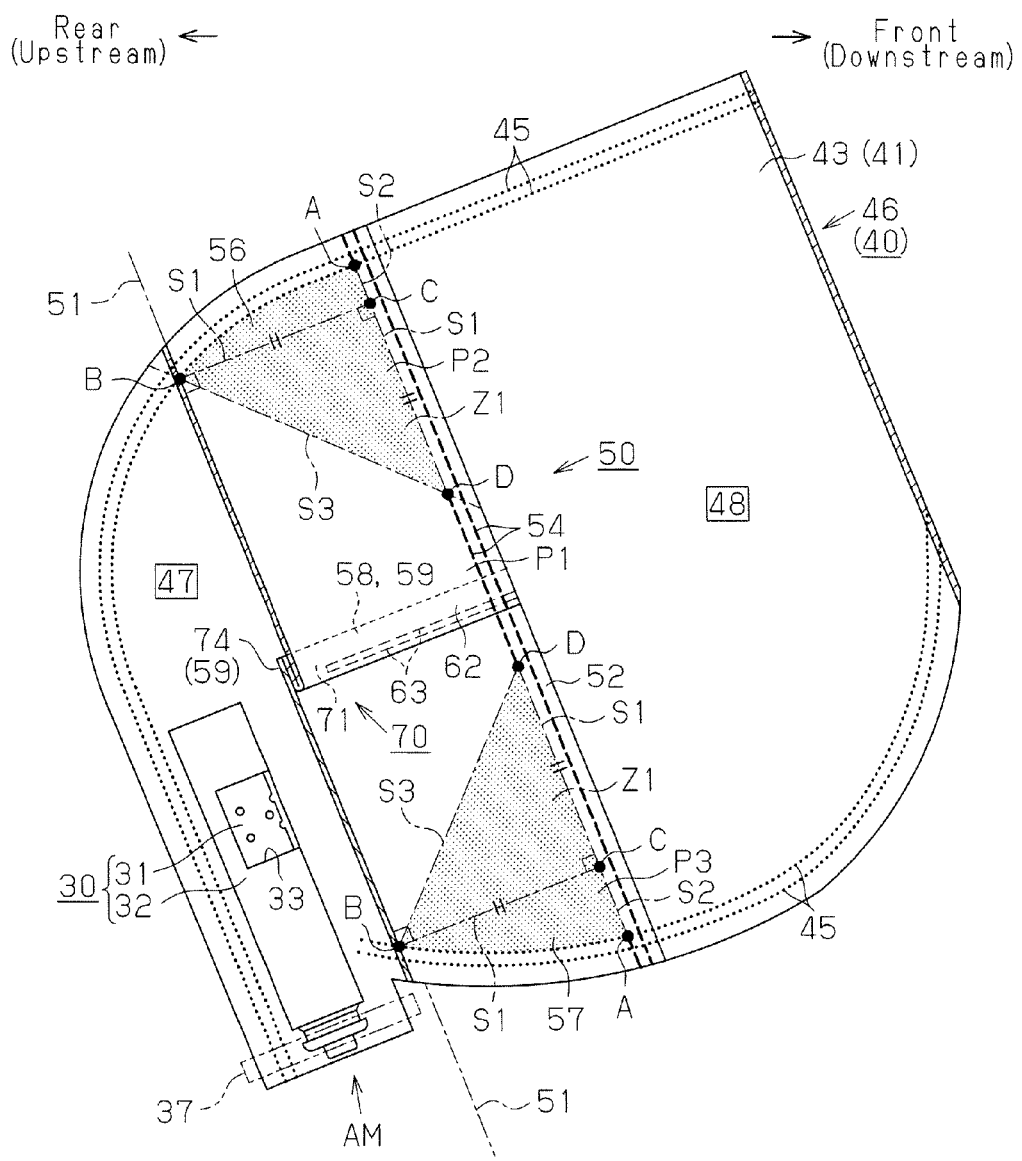
FIG. 27 is a view for explaining conditions when setting an outer joint portion of the partition member according to a fifth embodiment embodying the present invention and is a partial side sectional view showing the airbag module having the airbag in the uninflated and deployed state, which is cut at the center in the vehicle widthwise direction.

Describing in more detail, as shown in FIG. 27, in the virtual airbag apparatus in which the outer joint portion 54 extends in parallel to the bend line 51, point A to point D are defined as follows.

Point A: a point where the outer joint portion 54 intersects the fringe joint portion 45

Point B: a point where the bend line 51 intersects the fringe joint portion 45

Point C: a point where a line segment S1 that passes point B and is perpendicular to the bend line 51 intersects the outer joint portion 54

Point D: a point that is on the outer joint portion 54 and located closer to the pressure regulating valve 70 than point C by the same length as the line segment S1

Since the fringe joint portion 45 is provided in upper and lower regions of the fabric portion 43, there are two sets of point A to point D in upper and lower sides. The sets of point A to point D are substantially line-symmetrical about the inner joint portion 63 of the pressure regulating valve 70 as a symmetry axis. For this reason, the terms point A to point D are commonly used in both sets.

In each set, a part of the outer joint portion 54, which connects the fringe joint portion 45 to point D (54S: refer to FIG. 28), is located on a place that satisfies the following condition.

Condition: Of a region Z1 (a hatched region in FIG. 27) surrounded by a line segment S2 connecting point A to point D, a line segment S3 connecting point B to point D and the fringe joint portion 45, a location closer to the line segment S3 than to the line segment S2

Figure 28:
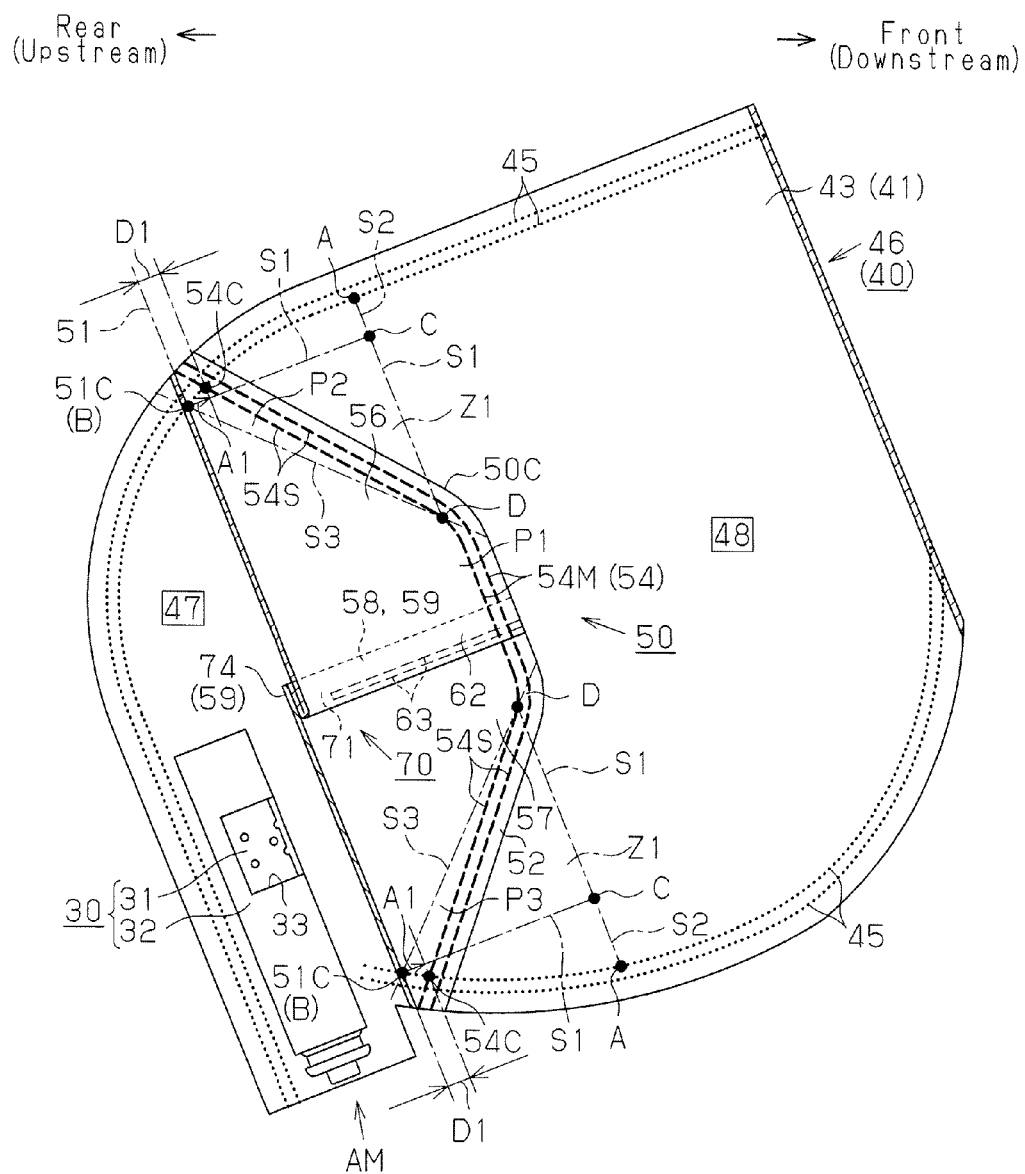
FIG. 28 is a partial side sectional view showing the airbag module having the airbag in the uninflated and deployed state, which is cut at the center in the vehicle widthwise direction, according to the fifth embodiment.
Figure 29:
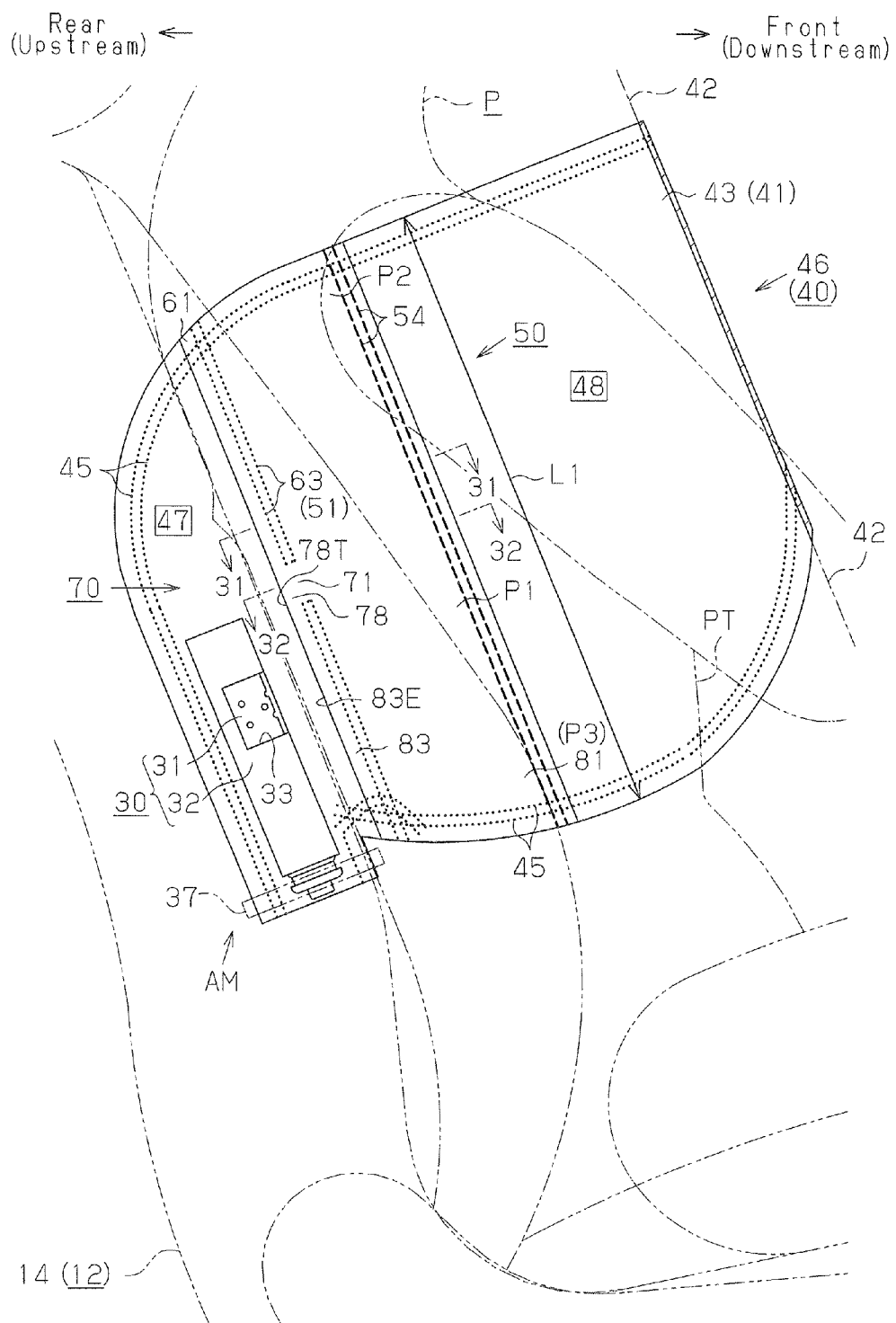
FIG. 29 is a view showing a sixth embodiment embodying the present invention and is a partial side sectional view showing the airbag module having the airbag in the uninflated and deployed state, which is cut at the center in the vehicle widthwise direction, along with the vehicle seat and the occupant.
Figure 30:
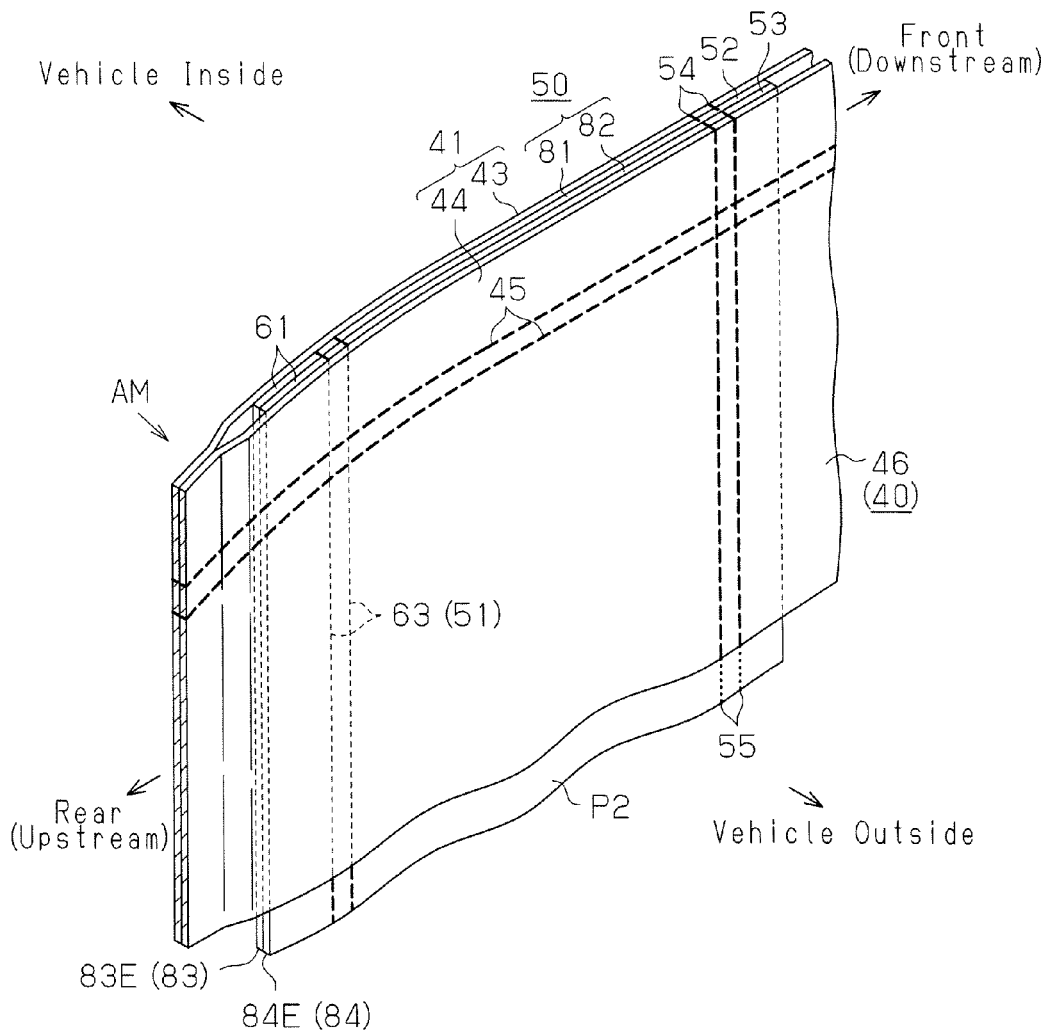
FIG. 30 is a partial perspective view showing the upper part of the airbag module having the airbag in the uninflated and deployed state according to the sixth embodiment when viewed from diagonally upward and forward.
Figure 31:
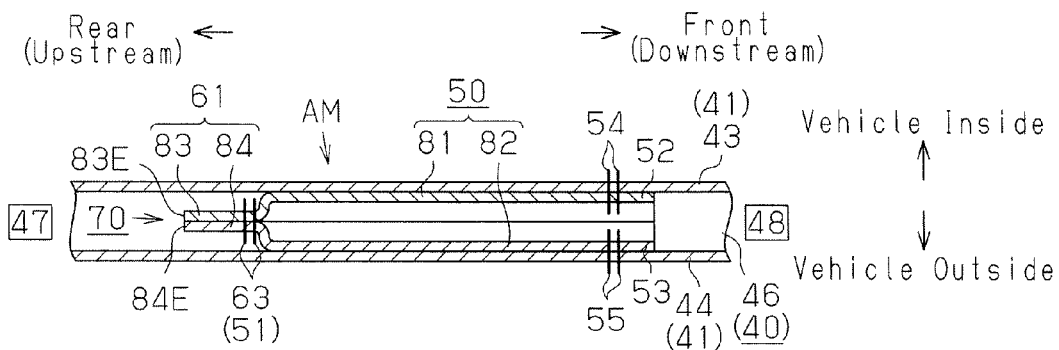
FIG. 31 is a partial sectional view showing a sectional configuration of the partition member and the like taken along line 31-31 in FIG. 29.
Figure 32:
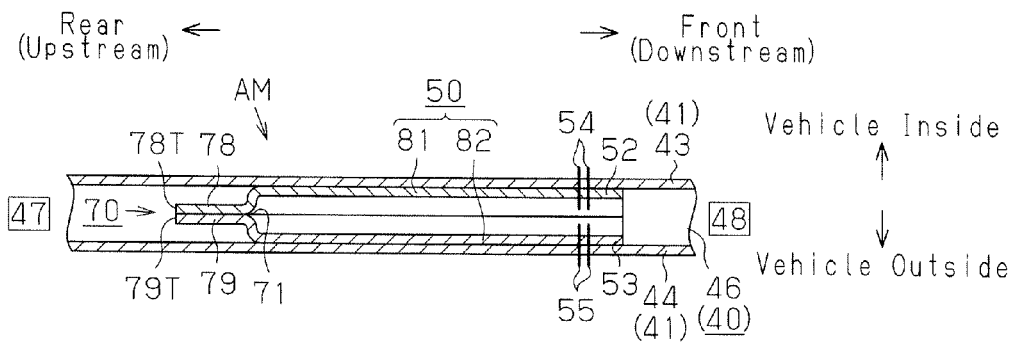
FIG. 32 is a partial sectional view showing a sectional configuration of the partition member and the like taken along line 32-32 in FIG. 29.
Figure 33:
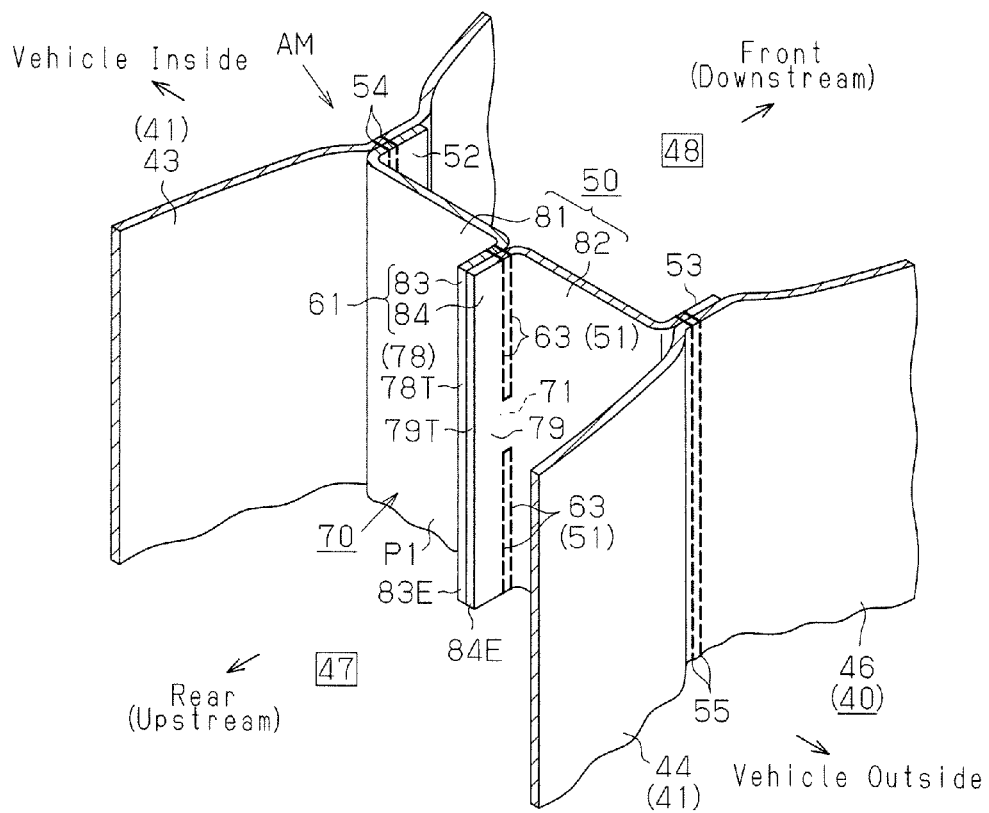
FIG. 33 is a partial perspective view showing the neighboring portion of the pressure regulating valve in the partition member tensioned to be planar according to the sixth embodiment.

To satisfy the above-described condition, as shown in FIG. 28, in the fifth embodiment, the part 54S of the outer joint portion 54 is linear along the line segment S3. Accordingly, the part 54S of the outer joint portion 54 diagonally intersects the bend line 51.

In the fifth embodiment, a part 54M of the outer joint portion 54, which connects point D in the upper set to point D in the lower set, is linear in parallel to the bend line 51.

With the shape change of the outer joint portion 54, the shape of an edge 50C of the partition member 50 is changed. The edge 50C of the partition member 50 is located away from the outer joint portion 54 by a certain distance. In the edge 50C, a part corresponding to the part 54S of the outer joint portion 54 diagonally intersects the bend line 51, and a part corresponding to the part 54M is parallel to the bend line 51.

This other configuration is the same as that in the first embodiment. For this reason, similar points and members to those in the first embodiment are given the same reference numerals and detailed description thereof is omitted.

In the fifth embodiment, since the shape of the outer joint portion 54 is changed from that in the first to fourth embodiments, the distance D1 between the outer joint portion 54 and the bend line 51 is smaller than the intermediate part in the longitudinal direction at the intersecting portion 54C of the outer joint portion 54 and the fringe joint portion 45. As compared to the case where the outer joint portion 54 is parallel to the bend line 51 (refer to FIG. 6), the distance D1 between the intersecting portion 51C and the intersecting portion 54C is smaller.

For this reason, when the partition member 50 is tensioned to be planar so as to be perpendicular to the inflating direction by inflation of the inflation portion 46, the movement of the intersecting portion 51C pulled toward the outer joint portion 54 becomes smaller as represented by arrow A1. As a result, the pulling force that acts on the intersecting portion 51C also becomes smaller, thereby reducing concentration of the stress exerted on the intersecting portion 51C. Thus, there is less possibility that a large load is applied to the intersecting portion 51C.

In particular, in the fifth embodiment, the part 54S of the outer joint portion 54 is linear along the line segment S3 and the distance D1 between the intersecting portion 54C and the bend line 51 gets close to a minimum value in a possible range. For this reason, the movement of the intersecting portion 51C pulled toward the outer joint portion 54, in turn, the pulling force that acts on the intersecting portion 51C gets close to a minimum value, thereby achieving the great effect of reducing concentration of the stress exerted on the intersecting portion 51C. As a result, since it is hard to transmit a large load to the intersecting portion 51C, any measure for reinforcing the intersecting portion 51C is not required.

Therefore, the fifth embodiment can achieve the following advantage in addition to the above-described advantages (1) to (4).

(7) In the region Z1 surrounded by the line segment S2 connecting point A to point D, the line segment S3 connecting point B to point D and the fringe joint portion 45, the part 54S connecting the fringe joint portion 45 to point D in the outer joint portion 54 is provided closer to the line segment S3 than the line segment S2. With such configuration, the distance D1 between the outer joint portion 54 and the bend line 51 is set to be smaller than the intermediate part (the part 54M and the like) in the longitudinal direction of the partition member 50 at the intersecting portion 54C of the outer joint portion 54 and the fringe joint portion 45 (FIG. 28).

For this reason, as compared to the case where the whole of the outer joint portion 54 is parallel to the bend line 51 (FIG. 6 and the like), the movement of the intersecting portion 51C of the bend line 51 and the fringe joint portion 45, which is pulled toward the outer joint portion 54, in turn, the pulling force that acts on the intersecting portion 51C can be made smaller, thereby achieving the effect of reducing concentration of the stress exerted on the intersecting portion 51C.

(8) By forming, in the outer joint portion 54, the part 54S, which connects the intersecting portion 54C of the outer joint portion 54 and the fringe joint portion 45 to point D, to be linear along the line segment S3 connecting point B to point D, the distance D1 between the intersecting portion 54C of the outer joint portion 54 and the fringe joint portion 45, and the bend line 51 is made close to the minimum value in the possible range (FIG. 28).

For this reason, the movement of the intersecting portion 51C of the bend line 51 with the fringe joint portion 45, which is pulled toward the outer joint portion 54, further, the pulling force that acts on the intersecting portion 51C can be made approximate to the minimum value, thereby achieving the great effect of reducing concentration of the stress exerted on the intersecting portion 51C.

As a result, there is no need to reduce any additional measure for reinforcing the intersecting portion 51C, for example, by using the reinforcing fabric or performing the measure according to circumstances. In the latter case, it is not needed to prepare the reinforcing fabric and join the reinforcing fabric to the airbag 40, thereby preventing an increase in costs.

(Sixth Embodiment)

Next, a sixth embodiment embodying the present invention will be described with reference to FIGS. 29 to 37.

Figure 34:
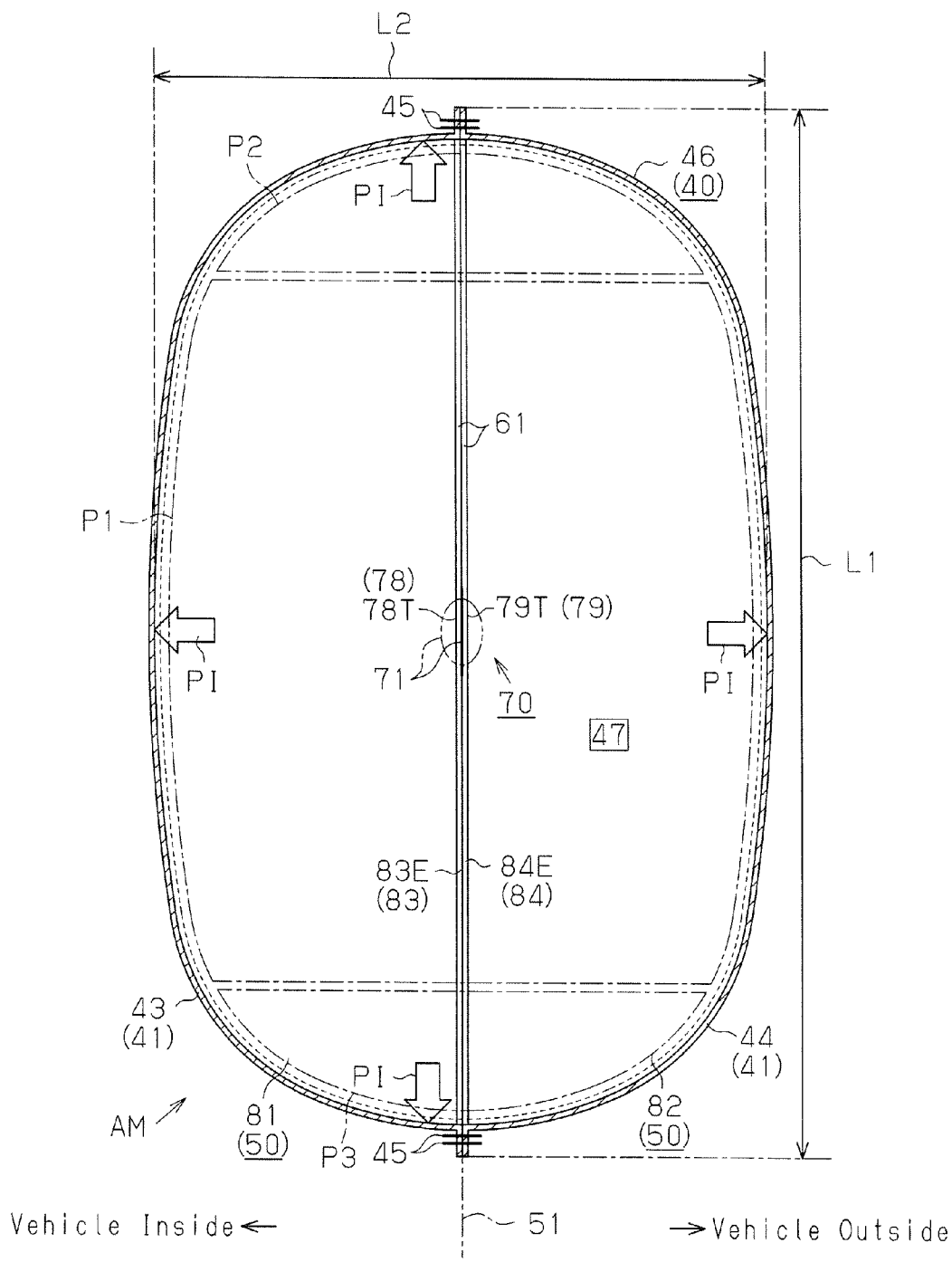
FIG. 34 is a vertical sectional view showing an internal configuration of the airbag module having the inflated airbag and the partition member tensioned to be planar according to the sixth embodiment.

As shown in FIG. 34, the partition member 50 in the planar state has the length L1 along the bend line 51 that is longer than the length L2 perpendicular to the bend line 51. In the sixth embodiment, the partition member 50 is formed of two members 81, 82 aligned in the vehicle widthwise direction. As shown in FIGS. 29 to 33, ends 83, 84 of the members 81, 82 are overlapped each other in the form of a long and thin band in the vertical direction such that edges 83E, 84E of the ends 83, 84 match with each other. Both members 81, 82 are joined with each other at a boundary between the band-like overlapping portions 61 and other portions (the non-overlapping portions) via the inner joint portion 63 linearly extending in the vertical direction. The inner joint portion 63 is separated from the edges 83E, 84E of the members 81, 82 by a certain distance and is also used as the bend line 51. Accordingly, the inner joint portion 63 is provided on the bend line 51.

The partition member 50 is provided with the pressure regulating valve 70. Describing in more detail, joint of a portion of the inner joint portion 63 (a portion at the center in the vertical direction in the sixth embodiment) is undone. The inner joint portion 63 for joining the members 81, 82 with each other is not formed at the center in the vertical direction. The portion where joint is undone constitutes the slit-like inner opening 71 for communicating the upstream inflation portion 47 to the downstream inflation portion 48.

Parts of the overlapping portions 61, which correspond to the inner opening 71 (neighboring portions, more precisely, parts between the inner opening 71 and the edges 83E, 84E) constitute a pair of valve body portions 78, 79. The overlapping portions 61 including the pair of valve body portions 78, 79 are disposed in the upstream inflation portion 47 before inflation of the inflation portion 46. The inner opening 71 and both valve body portions 78, 79 are located in the intermediate part P1 of the partition member 50.

Like the partition member 50 folded in half, the band-like overlapping portions 61 are laid on the fabric portions 43, 44 of the airbag 40 at their both ends in the direction along the inner joint portion 63, that is, the upper end and the lower end, via the above-described fringe joint portion 45, and joined with the fabric portions 43, 44, that is, sewn together. Unlike the first and second embodiments, the overlapping portions 61 are not bent toward the non-overlapping portions.

This other configuration is the same as that in the first embodiment. For this reason, similar points and members to those in the first embodiment are given the same reference numerals and detailed description thereof is omitted.

In the side airbag apparatus in the sixth embodiment, when the vehicle is subjected to impact due to side collision and the inflation gas G is supplied from the inflator 31, the upstream inflation portion 47 starts to inflate.

In the inflation portion 46, the partition member 50 folded in half is disposed such that the bend line 51 (the inner joint portion 63) is located upstream of the opposing ends 52, 53. In addition, the partition member 50 is joined with the corresponding fabric portions 43, 44 of the airbag 40 at the opposing ends 52, 53 via the outer joint portions 54, 55. Further, the partition member 50 is joined with the fabric portions 43, 44 at its both ends (the upper end and the lower end) in the direction along the bend line 51 (the inner joint portion 63) via the fringe joint portion 45 (refer to FIGS. 30 and 31). For this reason, as described above, when the upstream inflation portion 47 starts to be inflated, the partition member 50 folded in half is pulled. Tension is applied to the partition member 50 in the direction along the bend line 51 (the inner joint portion 63) and in the direction perpendicular to the bend line 51 (the inner joint portion 63) (refer to FIG. 34).

Due to this tension, in the partition member 50, the intermediate part P1 becomes tensioned in a substantially planar manner (refer to FIG. 33), while the upper part P2 and the lower part P3 are bent such that the bend line 51 (inner joint portion 63) is located upstream of the opposing ends 52, 53.

Here, in the sixth embodiment, in the partition member 50 that satisfies the relation of L1>L2, the inner opening 71 is provided along the bend line 51 (the inner joint portion 63) (refer to FIG. 34). In the partition member 50, it is likely that a stronger tension is applied in the transverse direction (the direction perpendicular to the bend line 51) than in the longitudinal direction (the direction along the bend line 51). For this reason, the inner opening 71 extending in the transverse direction may be opened according to the relation of tension intensity.

Figure 35:
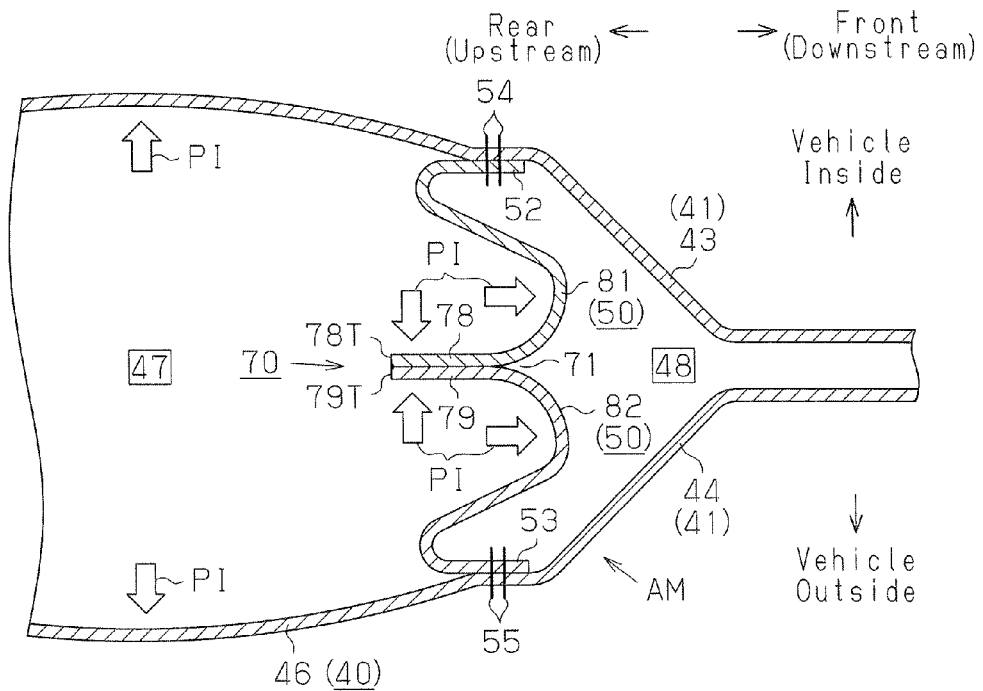
FIG. 35 is a sectional plan view schematically showing the state where the pressure regulating valve is opened in the upstream inflation portion being inflated according to the sixth embodiment.

However, as shown in FIG. 35, the internal pressure PI of the upstream inflation portion 47, which increases with supply of the inflation gas G, is applied to the overlapping portions 61 including both valve body portions 78, 79 in the upstream inflation portion 47 from both sides in the overlapped direction of the overlapping portions 61 (both sides in the vehicle widthwise direction). Both valve body portions 78, 79 are in close contact with each other and self-sealed. The partition member 50 completely partitions the inflation portion 46 into the upstream inflation portion 47 and the downstream inflation portion 48 at the part except for the pressure regulating valve 70. For this reason, the inflation gas G in the upstream inflation portion 47 is prevented from flowing to the downstream inflation portion 48 through between the valve body portions 78, 79, the inner opening 71 and other parts.

Figure 36:
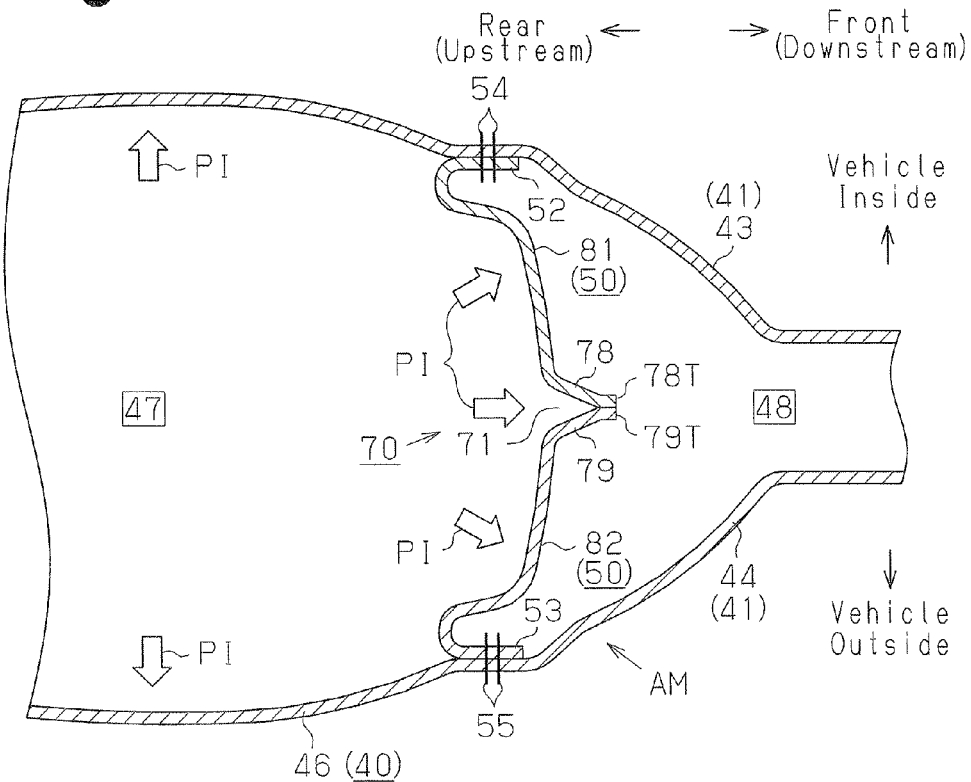
FIG. 36 is a sectional plan view schematically showing the state where both valve body portions are inverted and the pressure regulating valve is opened in the downstream inflation portion according to the sixth embodiment.

When inflation of the upstream inflation portion 47 proceeds with supply of the inflation gas G, as shown in FIG. 36, the overlapping portions 61 are pushed out toward the downstream inflation portion 48 through the inner opening 71 only at the valve body portions 78, 79 by the increased internal pressure PI of the upstream inflation portion 47. In other words, the valve body portions 78, 79 are inverted. At this time, even if the partition member 50 is tensioned to be planar and thus, the inner opening 71 is pulled and spreads in the vehicle widthwise direction, both valve body portions 78, 79 contact each other at their front ends 78T, 79T and attempt to maintain the closed state. In other words, due to tension of the partition member 50, a force to open the inner opening 71 and both valve body portions 78, 79 is applied thereto. This force is the largest at the inner opening 71, becomes smaller as the distance from the inner opening 71 increases, and becomes the smallest at the front ends 78T, 79T of the valve body portions 78, 79. As a result, the pressure regulating valve 70 is kept in the closed state and therefore, the inflation gas G in the upstream inflation portion 47 is still prevented from flowing to the downstream inflation portion 48 through the inner opening 71 and between the valve body portions 78, 79.

Figure 37:
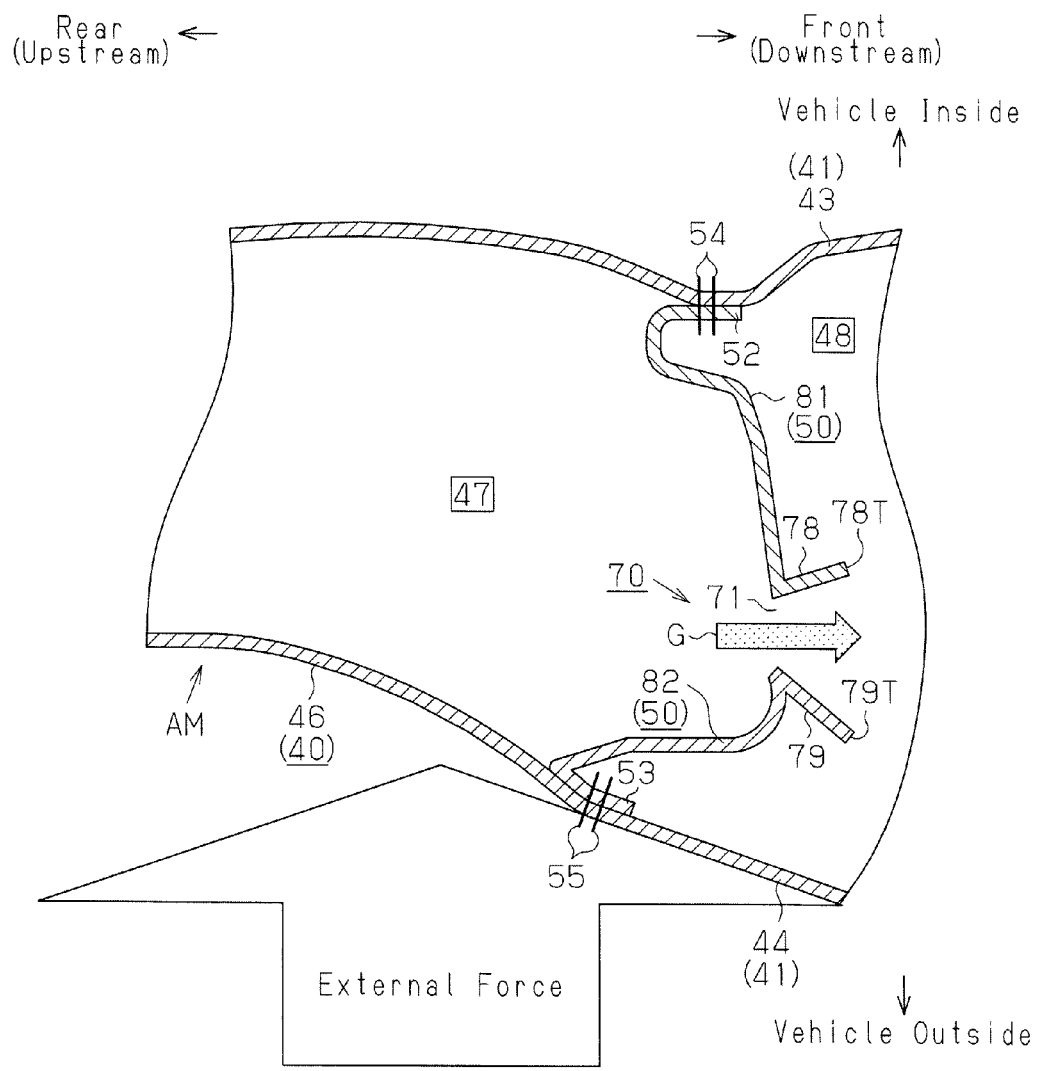
FIG. 37 is a sectional plan view schematically showing the state where the pressure regulating valve is opened in the downstream inflation portion by an external force generated upon restraint of the occupant according to the sixth embodiment.

Further, as shown in FIG. 37, during restraint of the occupant P, when the inflation portion 46 is pressed (squeezed) from the outer side of the vehicle and deformed by the external force generated from the entering body side portion 11, the tension applied to the partition member 50 lowers. This reduction lowers the tension applied to the inner opening 71. Deformation of the inflation portion 46 further increases the internal pressure of the upstream inflation portion 47. As a result, the intermediate part P1 of the partition member 50 is pressed toward the downstream inflation portion 48, thereby varying the tension applied to the intermediate part P1. In addition, the upper part P2 and the lower part P3 of the partition member 50 are pressed by the increased internal pressure and are deformed so as to inflate toward the downstream inflation portion 48. Specifically, the upper part P2 and the lower part P3 are deformed so as to be inverted from the bent state before restraint of the occupant and thus, tension applied to the intermediate part P1 easily varies. Since the inner opening 71 is easy to be deformed, the valve body portions 78, 79 can operate easily.

Under such a situation, the internal pressure of the upstream inflation portion 47 increases to open the inner opening 71. The valve body portion 79 and the valve body portion 78 are displaced in the direction of being separated from each other (toward the outer side and the inner side of the vehicle). When this displacement causes the front ends 79T, 78T to be separated from each other and the pressure regulating valve 70 to open, as represented by an arrow in FIG. 37, the inflation gas G in the upstream inflation portion 47 passes to the downstream inflation portion 48 through the inner opening 71 and between the valve body portions 79, 78.

The way the pressure of the inflation gas G in each of the inflation portions 47, 48 (internal pressure), the pressure-receiving area of the occupant P on each of the sides of the inflation portions 47, 48, and the load received by the occupant P from the airbag 40 vary depending on the entry amount of the body side portion 11 entering toward the inner side of the vehicle by impact is substantially the same as that in the first embodiment (refer to FIG. 12).

Therefore, the sixth embodiment can achieve similar advantages to those in the first embodiment.

In the sixth embodiment, since the inner opening 71 is provided along the bend line 51 (the inner joint portion 63) in the partition member 50 that satisfies the relation of L1>L2, it cannot be expected that strong tension is applied in the direction along the inner opening 71 as in the first embodiment, in which the inner opening 71 is provided in the direction substantially perpendicular to the bend line 51 (the inner joint portion 63).

However, the sixth embodiment is the same as the first embodiment in that the overlapping portions 61 including both valve body portions 78, 79 are disposed in the upstream inflation portion 47 before inflation of the inflation portion 46. Accordingly, the internal pressure PI of the upstream inflation portion 47 can be applied from both ends in the overlapping direction of the overlapping portions 61. As a result, both valve body portions 78, 79 can be brought into close contact with each other and self-sealed to restrict passage of the inflation gas G between the valve body portions 78, 79, thereby preventing the inflation gas G in the upstream inflation portion 47 from flowing to the downstream inflation portion 48.

(Seventh Embodiment)

Next, a seventh embodiment embodying the present invention will be described with reference to FIGS. 38 to 40.

The seventh embodiment is different from the sixth embodiment only in that the overlapping portions 61 including both valve body portions 78, 79 are disposed in the downstream inflation portion 48 before inflation of the inflation portion 46. Thus, similar points and members to those in the sixth embodiment are given the same reference numerals and detailed description thereof is omitted.

In this case, the overlapping portions 61 including both valve body portions 78, 79 behave slightly differently from the sixth embodiment.

Figure 38:
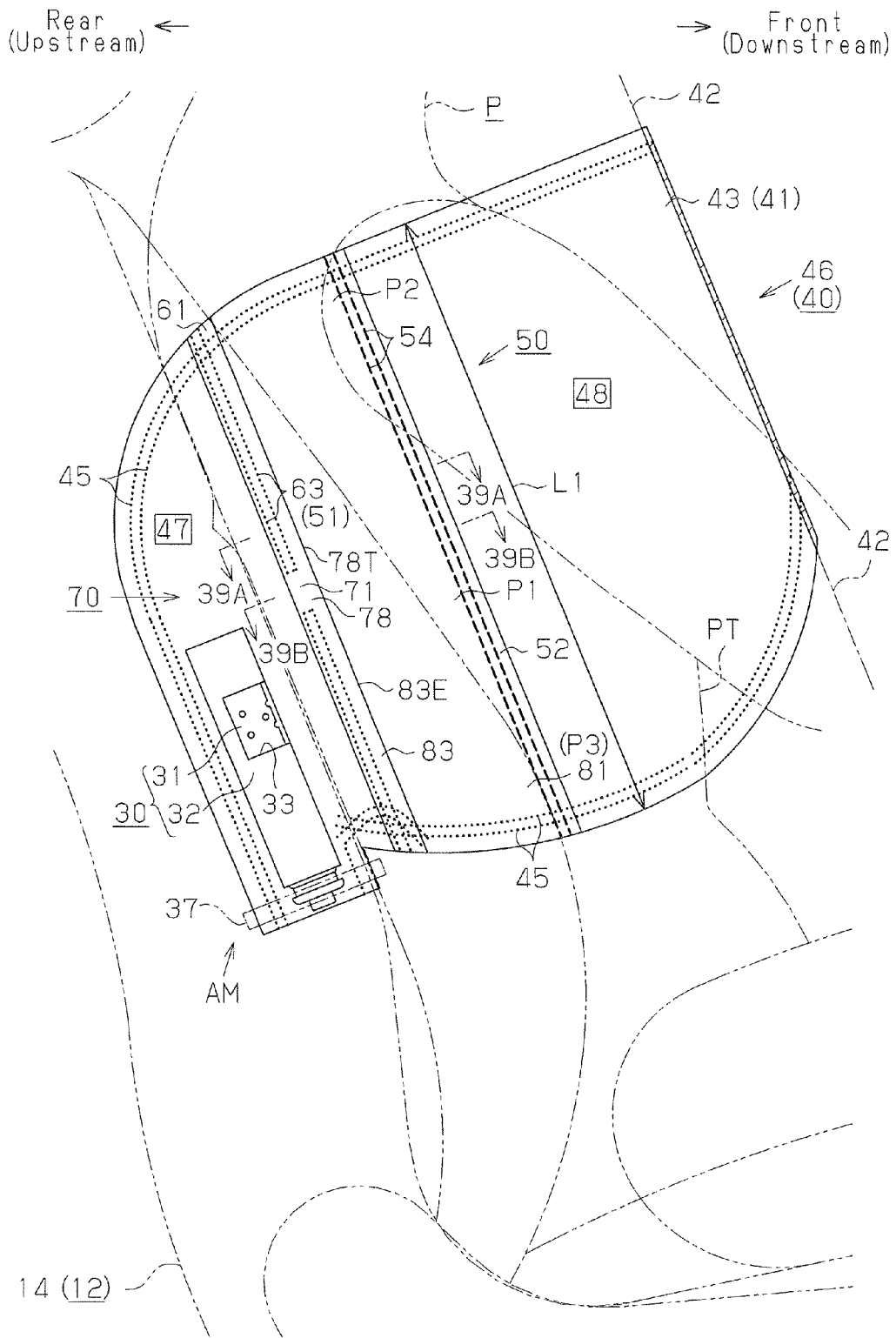
FIG. 38 is a view showing a seventh embodiment embodying the present invention and is a partial side sectional view showing the airbag module having the airbag in the uninflated and deployed state, which is cut at the center in the vehicle widthwise direction, along with the vehicle seat and the occupant.
Figure 39A:
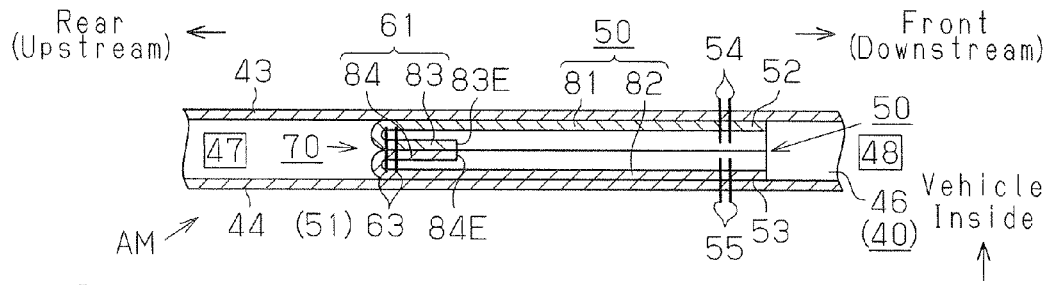
FIG. 39A is a partial sectional view showing a sectional configuration of the partition member and the like taken along line 39A-39A in FIG. 38.
Figure 39B:
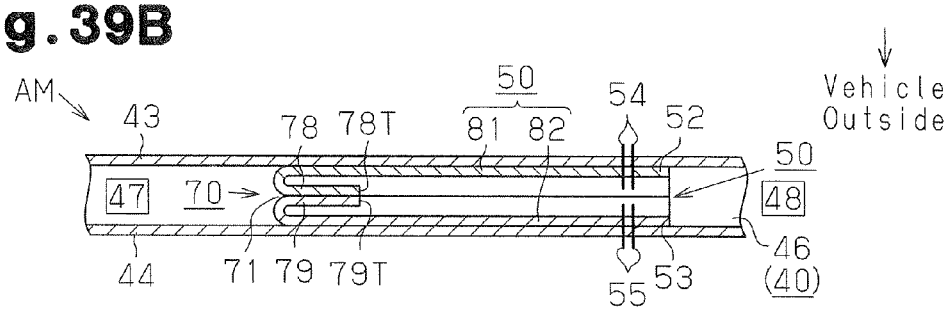
FIG. 39B is a partial sectional view showing a sectional configuration of the partition member and the like taken along line 39B-39B in FIG. 38.
Figure 40:
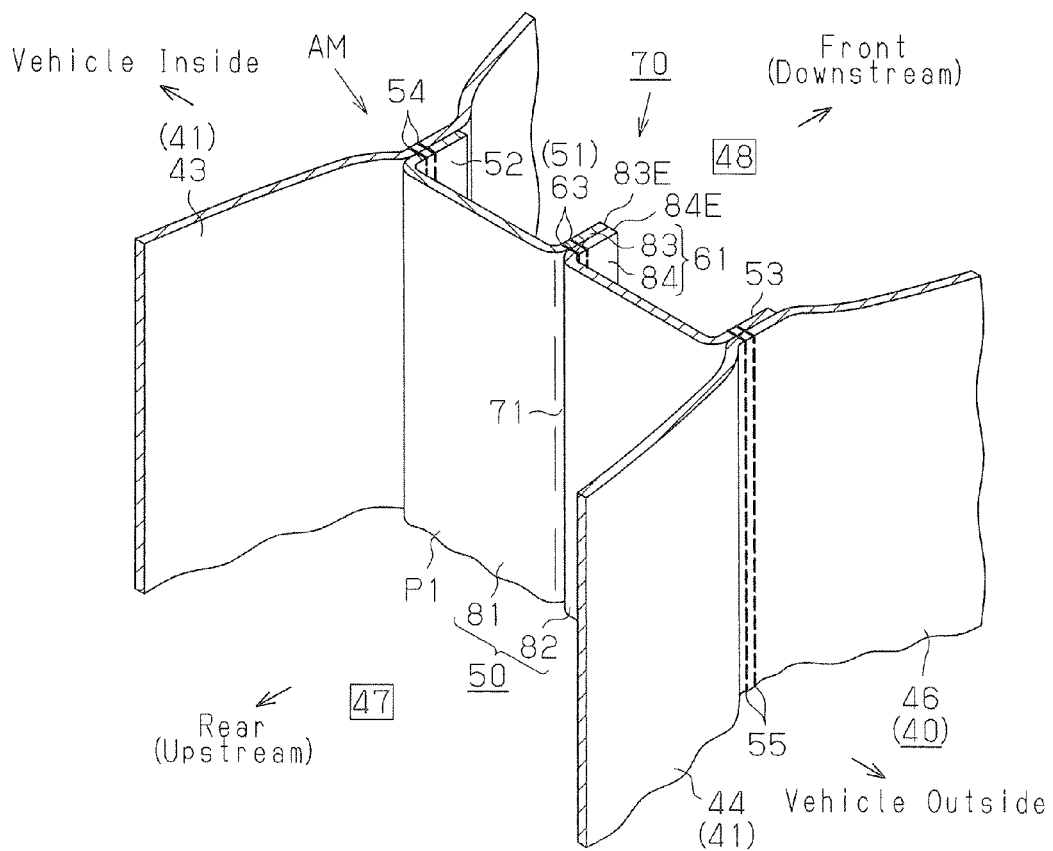
FIG. 40 is a partial perspective view showing the neighboring portion of the pressure regulating valve in the partition member tensioned to be planar according to the seventh embodiment.

Before supply of the inflation gas G to the inflation portion 46, the partition member 50 is folded in half such that the bend line 51 (the inner joint portion 63) is located upstream of the opposing ends 52, 53 (refer to FIG. 38, FIG. 39A and FIG. 39B).

When the upstream inflation portion 47 starts to be inflated by supply of the inflation gas G to the inflation portion 46, tension is applied to the partition member 50 folded in half in the direction along the bend line 51 (inner joint portion 63) and the direction perpendicular to the bend line 51. Due to this tension, in the partition member 50 (refer to FIG. 40), the intermediate part P1 becomes tensioned in a substantially planar manner, while the upper part P2 and the lower part P3 are bent such that the bend line 51 (inner joint portion 63) is located downstream of the opposing ends 52, 53.

Here, in the partition member 50 that satisfies the relation of L1>L2, stronger tension tends to be applied in the transverse direction (the direction perpendicular to the bend line 51) than in the longitudinal direction (the direction along the bend line 51). For this reason, the inner opening 71 extending along the bend line 51 (the inner joint portion 63) may be opened according to the relation of tension intensity.

However, at least the front ends 78T, 79T of the valve body portions 78, 79 contact each other and become closed. This is due to that, even if the partition member 50 is tensioned to be planar, thereby pulling the inner opening 71 to exert a force to open the inner opening 71, this force is the largest at the inner opening 71, becomes smaller as the distance from the inner opening 71 increases, and becomes the smallest at the front ends 78T, 79T. As a result, the inflation gas G in the upstream inflation portion 47 is prevented from passing to the downstream inflation portion 48 through the inner opening 71 and between the valve body portions 78, 79.

Since both valve body portions 78, 79 are located in the downstream inflation portion 48, there is no possibility that the pressure of the inflation gas G in the upstream inflation portion 47 is applied to both sides of the valve body portions 78, 79, thereby self-sealing the valve body portions 78, 79.

When the inflation gas G continues to be supplied into the upstream inflation portion 47 in the state where both valve body portions 78, 79 are closed at least the front ends 78T, 79T, and the inflation portion 46 is pressed and deformed by the external force generated upon restraint of the occupant, the tension applied to the partition member 50 varies. With the deformation of the inflation portion 46, the internal pressure PI of the upstream inflation portion 47 further increases. The intermediate part P1 of the partition member 50 is pressed toward the downstream inflation portion 48, thereby varying the tension applied to the intermediate part P1. At the same time, the upper part P2 and the lower part P3 of the partition member 50 are pressed and deformed so as to be inflated toward the downstream inflation portion 48. In other words, the upper part P2 and the lower part P3 are deformed so as to be inverted from the bent state before restraint of the occupant (refer to FIG. 38) and tension applied to the intermediate part P1 easily varies. Deformation of the inner opening 71 and operation of the valve body portions 78, 79 are allowed.

In such situation, when the inner opening 71 as well as both valve body portions 78, 79 are opened, the restriction is cancelled. Due to the cancellation, the inflation gas G flows from the upstream inflation portion 47 to the downstream inflation portion 48.

Therefore, in the seventh embodiment, the same advantages as those in the first embodiment can be obtained. However, as compared to the sixth embodiment, in the seventh embodiment, in which the overlapping portions 61 are disposed in the downstream inflation portion 48, tension is harder to be applied to the overlapping portions 61, and therefore, the sealing property is slightly declined.

The sixth and seventh embodiments, in which the inner joint portion 63 is provided along the bend line 51, are superior to the first and second embodiments, in which the inner joint portion 63 is provided substantially perpendicular to the bend line 51, in terms of production costs. This is due to that the inner joint portion 63 does not act as the bend line 51 in the first and second embodiments, while the inner joint portion 63 acts as the bend line 51 in the sixth and seventh embodiments.

Specifically, in the first and second embodiments, in order to obtain the partition member 50 folded in half, the ends 58, 59 are overlapped each other in the form of a band such that edges 58E, 59E of the two members 56, 57 match with each other. The partition member 50 is formed by joining the members 56, 57 with each other in the boundary between the non-overlapping portion 62 and the overlapping portions 61 (that is, providing the inner joint portion 63). After that, it is needed to fold the partition member 50 in half along the bend line 51. However, in the sixth and seventh embodiments, by joining members 81, 82 on the inner side and the outer side of the vehicle with each other (i.e. providing the inner joint portion 63), the partition member 50 folded in half along the inner joint portion 63 (bend line 51) is formed. Since the operation of folding the partition member 50 in half becomes unnecessary, the number of steps for producing the side airbag apparatus can be reduced, thereby preventing an increase in production costs.

When the fabric portions 43, 44 of the airbag 40 are compared with the sewing yarn used for the fringe joint portion 45, the former is superior in heat resistance. The high-temperature inflation gas G is ejected from the inflator 31. For this reason, in terms of heat resistance, it is more preferable to fold a single piece of fabric in half in the vicinity of the inflator 31 than to sew one or two pieces of fabric of the airbag 40 in the vicinity of the inflator 31.

However, in this case, it is difficult to employ configuration in the first and sixth embodiments among the first to seventh embodiments in terms of production. Since the airbag 40 is formed of the piece of fabric, the joint portions must be provided in the order of the outer joint portions 54, 55, the inner joint portion 63 and the fringe joint portion 45. In performing operation in this order, it is very difficult to provide the outer joint portions 54, 55 and the inner joint portion 63 such that the overlapping portions 61 are located in the upstream inflation portion 47. After all, it is needed to employ the configuration in the second and seventh embodiments in which the overlapping portions 61 are located in the downstream inflation portion 48. Accordingly, the second and seventh embodiments is superior to the first and sixth embodiments in which the overlapping portions 61 are located in the upstream inflation portion 47, in terms of production.

The present invention may be embodied as following other embodiments.

<Matters Common to Sixth and Seventh Embodiments>

There are the following two possible joining modes of the band-like overlapping portions 61 with the airbag 40.

According to one mode, the overlapping portions 61 are joined with the fabric portions 43, 44 at their both ends in the direction along the inner joint portion 63 (the substantially vertical direction) via the fringe joint portion 45 without being bent toward the non-overlapping portions. This joining mode is employed in the sixth and seventh embodiments.

According to the second mode, the overlapping portions 61 are bent toward the non-overlapping portions and are joined with the fabric portions 43, 44 of the airbag 40 along with the non-overlapping portions at both ends of the overlapping portions 61 in the direction along the inner joint portion 63 (the substantially vertical direction). This is a joining mode similar to that employed in the first and second embodiments. In this case, since tension is applied to the non-overlapping portions of the partition member 50 as well as the overlapping portions 61 in the direction along the bend line 51 (the inner joint portion 63), both valve body portions 78, 79 are hard to open, thereby improving the sealing property.

<Matters Common to All Embodiments>

In each embodiment, the upper member 56 of the partition member 50 may be divided into two along the bend line 51. Similarly, the lower member 57 may be divided into two along the bend line 51.

In each embodiment, the opposing end 52 of the partition member 50 may be joined with the fabric portion 43 of the airbag 40 in the upstream inflation portion 47 or within the downstream inflation portion 48. Similarly, the opposing end 53 of the partition member 50 may be joined with the fabric portion 44 of the airbag 40 within the upstream inflation portion 47 or within the downstream inflation portion 48.

One of the opposing ends 52, 53 may be joined within the upstream inflation portion 47 and the other of the opposing ends 52, 53 may be joined within the downstream inflation portion 48.

In each embodiment, the inner opening 71 and the inner joint portion 63 do not necessarily have to be provided in the direction perpendicular to the bend line 51 of the partition member 50, but may be provided in the direction diagonally intersecting the bend line 51 of the partition member 50.

Although the airbag 40 may be formed of only the inflation portion 46, it may also have an uninflation portion to which the inflation gas G is not supplied.

Figure 41A:
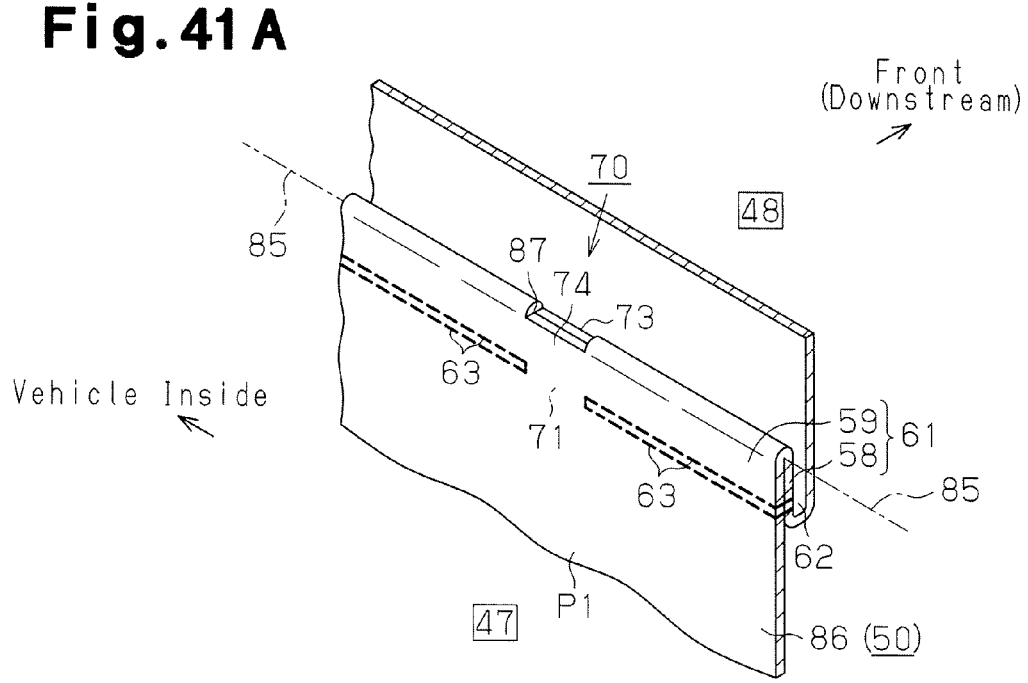
FIG. 41A is a partial perspective view showing a modification of the partition member according to the first embodiment configured of a piece of fabric.
Figure 41B:
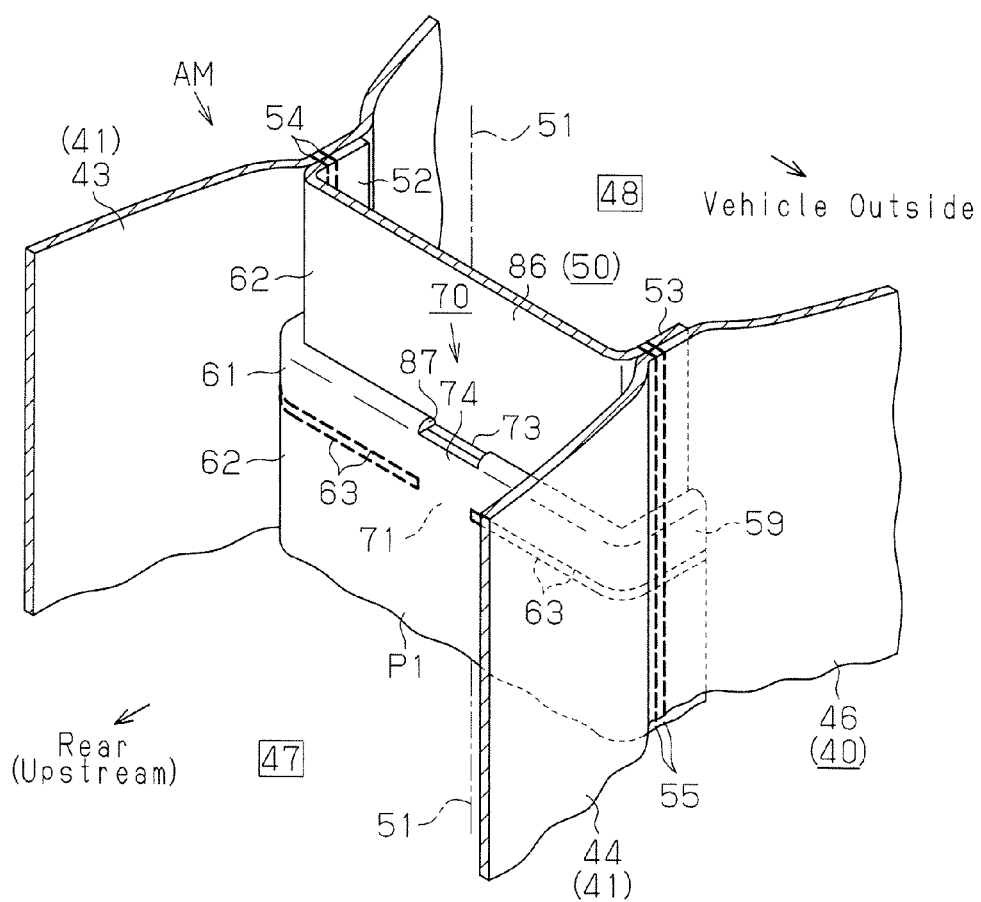
FIG. 41B is a partial perspective view showing a modification of the partition member according to the first embodiment configured of a piece of fabric.
Figure 42:
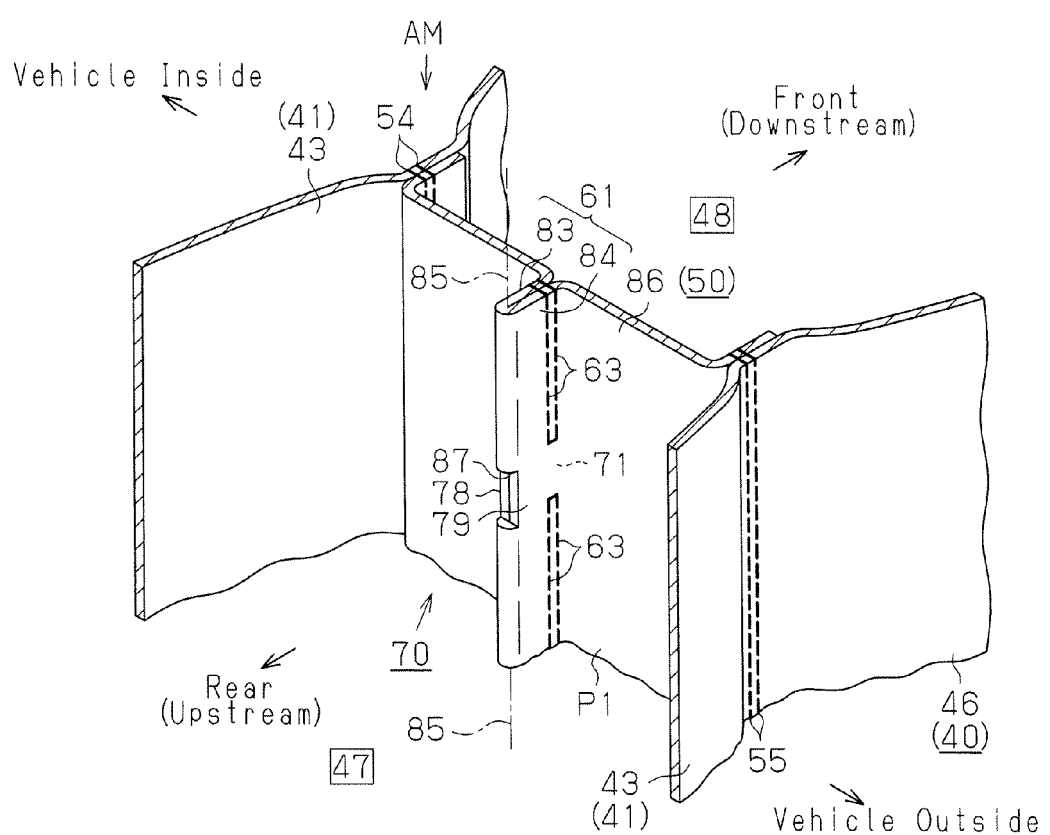
FIG. 42 is a partial perspective view showing a modification of the pressure regulating valve in which the partition member according to the sixth embodiment is configured of a piece of fabric.

In the first embodiment, as shown in FIGS. 41A and 41B, the partition member 50 may be formed of a single member 86 (fabric piece). In this case, the member 86 is folded in half along the bend line 85. The inner joint portion 63 is provided away from the bend line 85 of the partition member 50 folded in half by a certain distance. Parts sandwiched between the inner joint portion 63 and the bend line 85 constitute the pair of band-like overlapping portions 61. On the bend line 85 of the overlapping portions 61, the slit 87 is formed at a part corresponding to at least the inner opening 71. In the overlapping portions 61, parts between the inner opening 71 and the slit 87 constitute the valve body portions 73, 74.

The above-described changes may be made also in the second to fifth embodiments.

In the overlapping portions 61, the parts corresponding to the inner opening 71 (neighboring portions of the inner opening 71, more precisely, portions between the inner opening 71 and the edges 58E, 59E) act as the valve body portions 73, 74. For this reason, as long as during inflation of the upstream inflation portion 47, at least the front ends 73T, 74T of the valve body portions 73, 74 contact each other and are closed, the shape of the portion that does not correspond to the inner opening 71 (non-neighboring portion) in the overlapping portions 61 may be changed. For example, the portion that does not correspond to the inner opening 71 (non-neighboring portion) in the overlapping portions 61 may be partially or entirely joined. This joining may be made through sewing or bonding. Such change can prevent the phenomenon that only the portions that correspond to the inner opening 71 operate as the valve body portions 73, 74 and the portion that does not correspond to the inner opening 71 unnecessarily moves, for example, flaps.

In addition, a notch may be formed at least a part of the portion that does not correspond to the inner opening 71 in the overlapping portions 61.

The partition member 50 and the valve body portions 73, 74 may be formed of different members.

The bend line 51 of the partition member 50 folded in half may be slightly inclined relative to the vertical direction.

Although the side airbag apparatus for protecting mainly the thorax PT of the occupant P has been described in the first to seventh embodiments, the present invention can be applied to the side airbag apparatus for protecting other sites of the occupant P in addition to the thorax PT against impact due to side collision and the like. An application example will be described below. FIG. 43A to FIG. 45B each schematically show an arrangement state of the members such as the partition member 50 in the inflation portion 46 of the airbag 40, and details thereof are omitted and simplified. A hatched portion in each figure represents the partition member 50.

<<Side Airbag Apparatus for Protecting Site from Thorax PT to Head PH of Occupant P>>

Figure 43A:
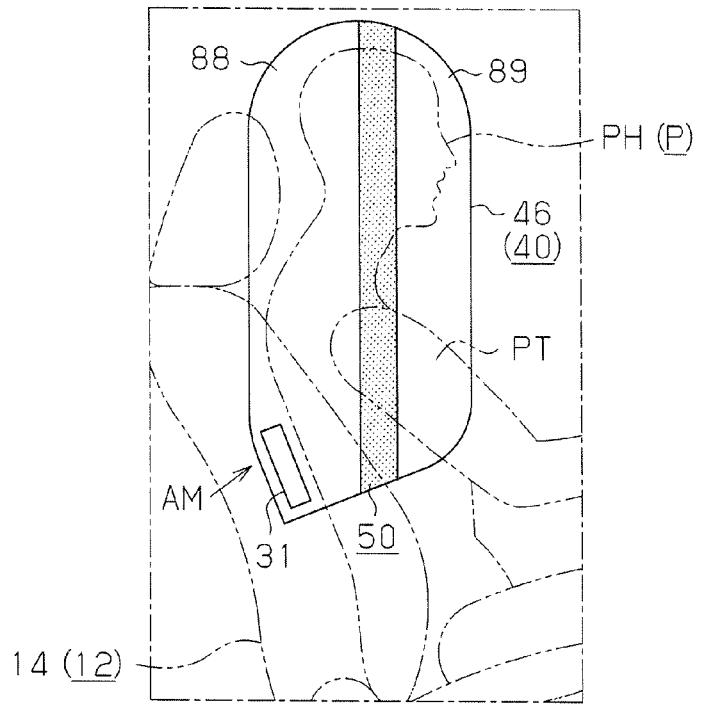
FIG. 43A is a side view showing a modification in which the present invention is applied to a side airbag apparatus that is different from the type according to the first to fifth embodiments.

In this type of side airbag apparatus, as shown in FIG. 43A, when mounted in the vehicle and inflated, the inflation portion 46 of the airbag 40 has an elongated shape extending in the vertical direction so as to inflate in the vicinity of a side of the site from the thorax PT to head PH. When the present invention is applied to this side airbag apparatus, inflation portion 46 may be divided into two front and rear parts by the partition member 50 that has a pressure regulating valve (not shown) and extends in the substantially vertical direction. In the inflation portion 46, a part in the rear of the partition member 50 is an upstream inflation portion 88 and a part in front of the partition member 50 is a downstream inflation portion 89. Although the partition member 50 extends in the vertical direction in this case, the extending direction of the partition member 50 may be changed according to performances required for the airbag 40. The partition member 50 may be inclined relative to the vertical direction. At this time, the angle that the partition member 50 makes with the vertical line (inclination angle) can be changed variously.

Figure 43B:
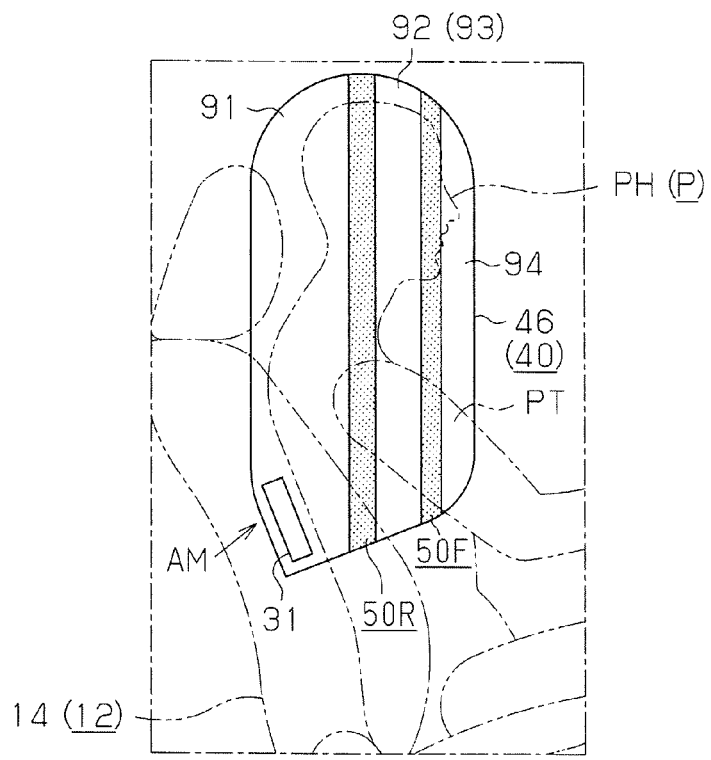
FIG. 43B is a side view showing a modification in which the present invention is applied to a side airbag apparatus that is different from the type according to the first to fifth embodiments.

As shown in FIG. 43B, the partition members 50 may be provided at two positions separated from each other in the front-back direction of the inflation portion 46. To distinguish the two partition members 50, it is defined that the front partition member 50 is a partition member 50F and the rear partition member 50 is a partition member 50R. In this case, the inflation portion 46 is divided into three parts: rear, center and front via the partition members 50R, 50F. Using the rear partition member 50R as a reference, the "rear" part constitutes an upstream inflation portion 91 and the "center" part constitutes a downstream inflation portion 92. Using the front partition member 50F as a reference, the "center" part constitutes an upstream inflation portion 93 and the "front" part constitutes a downstream inflation portion 94. The inflation gas ejected from the inflator 31 flows to the upstream inflation portion 91, the partition member 50R, the downstream inflation portion 92 (the upstream inflation portion 93), the partition member 50F and the downstream inflation portion 94 in this order. Although not shown, the partition members 50 may be provided at three or more positions separated from each other in the front-back direction of the inflation portion 46.

<<Side Airbag Apparatus for Protecting Site from Lumbar Region PP to Thorax PT (Shoulder PS) of Occupant P>>

Figure 44A:
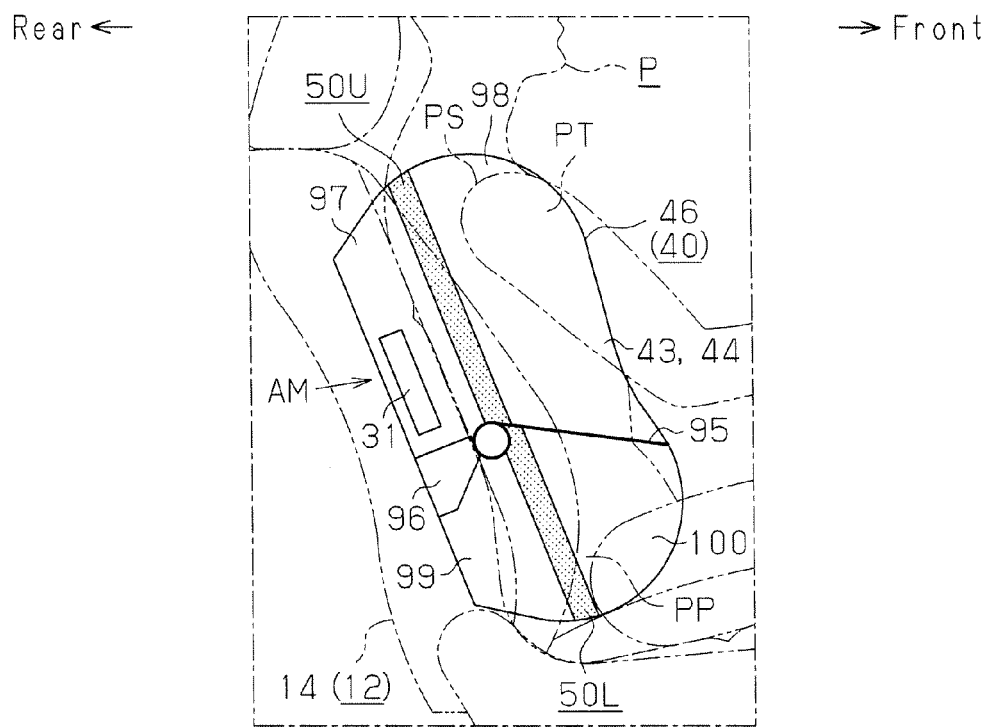
FIG. 44A is a side view showing a modification in which the present invention is applied to a side airbag apparatus that is different from the type according to the first to fifth embodiments.

In this type of side airbag apparatus, as shown in FIG. 44A, when mounted in the vehicle and inflated, the inflation portion 46 of the airbag 40 has an elongated shape extending in the vertical direction so as to inflate in the vicinity of a side of a site from the lumbar region PP to the thorax PT (the shoulder PS). The inflation portion 46 is divided into two upper and lower parts via a partition portion 95 and a check valve 96. The partition portion 95 may be configured of a tether formed by stretching fabric between the fabric portions 43, 44 of the airbag 40, or may be configured of a seam formed by sewing, that is, joining the fabric portions 43, 44 in contact with each other.

The inflator 31 is disposed at an upper area from the partition portion 95. The check valve 96 allows the inflation gas ejected from the inflator 31 to flow from the upper area from the partition portion 95 to the lower area, and prevents the inflation gas from flowing in the reverse direction. The upper area from the partition portion 95 is inflated lateral to, for example, the thorax PT and the shoulder PS, and the lower area from the partition portion 95 inflates lateral to, for example, the lumbar region PP.

When the present invention is applied to the side airbag apparatus, as shown in FIG. 44A, the upper area may be further divided into front and rear parts via a partition member 50U that extends in the substantially vertical direction and has a pressure regulating valve (not shown). Alternatively, the lower part may be divided into front and rear parts via a partition member 50L that extends in the substantially vertical direction and has a pressure regulating valve (not shown). In this case, in the upper area from the partition portion 95, a part in the rear of the partition member 50U constitutes an upstream inflation portion 97 and a part in front of the partition member 50U constitutes the downstream inflation portion 98. In the lower area from the partition portion 95, a part in the rear of the partition member 50L constitutes an upstream inflation portion 99 and a part in front of the partition member 50L constitutes a downstream inflation portion 100.

Although not shown, the partition members 50U, 50L may be provided only in the upper area from the partition portion 95 or only in the lower area.

Figure 44B:
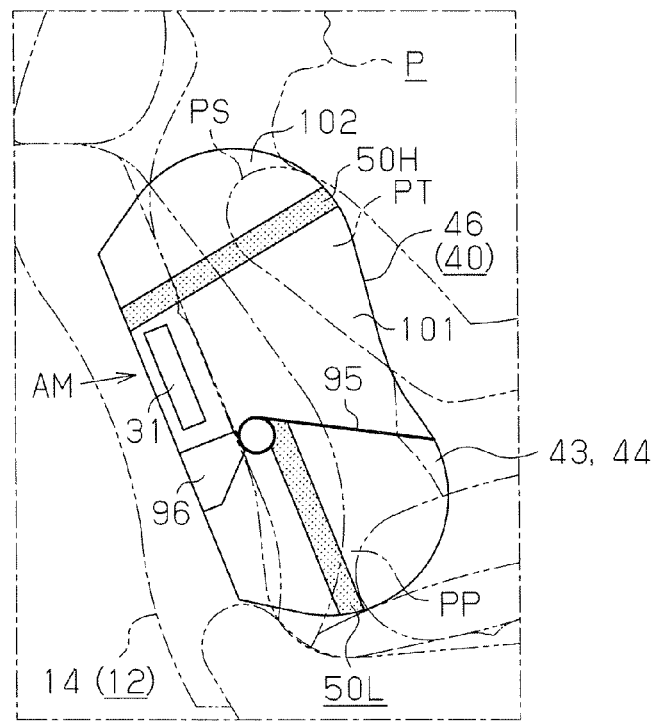
FIG. 44B is a side view showing a modification in which the present invention is applied to a side airbag apparatus that is different from the type according to the first to fifth embodiments.

As a variation of FIG. 44A, as shown in FIG. 44B, the upper area from the partition portion 95 may be divided into upper and lower parts via a partition member 50H extending in the substantially front-back direction, in place of the partition member 50U extending in the substantially vertical direction. In this case, a lower part from the partition member 50H constitutes an upstream inflation portion 101 for protecting the thorax PT and an upper part from the partition member 50H constitutes a downstream inflation portion 102 for protecting the shoulder PS.

Although not shown, the lower area from the partition portion 95 may be divided into upper and lower parts via a partition member extending in the substantially front-back direction in place of the partition member 50L extending in the substantially vertical direction. In this case, an upper part from the partition member constitutes an upstream inflation portion for protecting an upper half of the lumbar region PP and a lower part from the partition member constitutes a downstream inflation portion for protecting a lower half of the lumbar region PP.

Figure 45A:
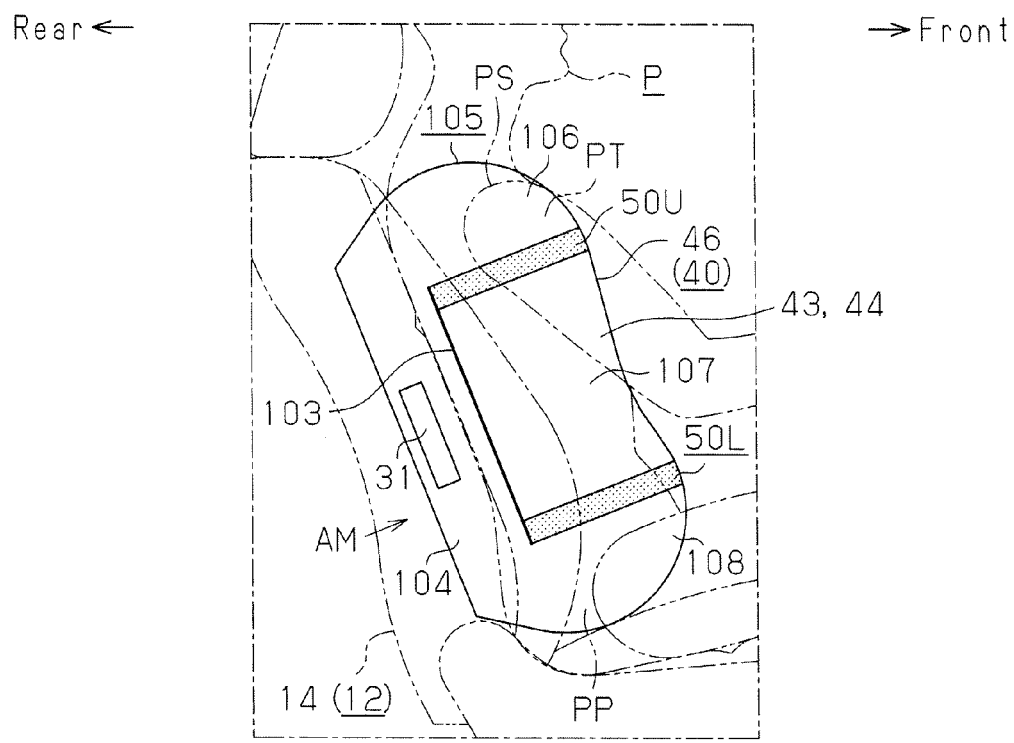
FIG. 45A is a side view showing a modification in which the present invention is applied to a side airbag apparatus that is different from the type according to the first to fifth embodiments.

As shown in FIG. 45A, the inflation portion 46 may be roughly divided into front and rear parts via a partition portion 103 extending in front of the inflator 31 and along the inflator 31 in the substantially vertical direction. Like the above-described partition portion 95 (refer to FIG. 44A and FIG. 44B), the partition portion 103 may be configured of a tether formed by installing fabric between the fabric portions 43, 44 of the airbag 40 or may be configured of a seam formed by sewing, that is, joining the fabric portions 43, 44 in contact with each other.

A part in the rear of the partition portion 103 constitutes an inflator storage portion 104 that stores the inflator 31 therein. A part in front of the partition portion 103 constitutes a protection portion 105 for protecting a site from the shoulder PS to the lumbar region PP of the occupant P. The protection portion 105 may be divided into upper, center and lower parts via the upper and lower pair of partition members 50U, 50L that each have a pressure regulating valve (not shown) and extend in the substantially front-back direction. In this case, using the upper partition member 50U as a reference, the "upper" part constitutes an upstream inflation portion 106 and the "center" part constitutes a downstream inflation portion 107. Using the lower partition member 50L as a reference, the "lower" part constitutes an upstream inflation portion 108 and the "center" part constitutes the downstream inflation portion 107.

The inflation gas ejected from the inflator 31 is supplied to the downstream inflation portion 107 through the inflator storage portion 104, the upstream inflation portion 106 and the partition member 50U in this order, as well as to the downstream inflation portion 107 through the inflator storage portion 104, the upstream inflation portion 108 and the partition member 50L in this order. In this manner, the inflation gas is supplied to the downstream inflation portion 107 through the two routes.

Although not shown, the inflation portion 46 may be divided into two, that is, upper and lower parts via one partition member that has a pressure regulating valve (not shown) and extends in the substantially front-back direction, without being provided with the partition portion 103. The lower part constitutes an upstream inflation portion to which the inflation gas is first supplied from the inflator 31 to protect the lumbar region PP, and the upper part constitutes a downstream inflation portion to which the inflation gas is supplied through the upstream inflation portion to protect the thorax PT (shoulder PS).

Figure 45B:
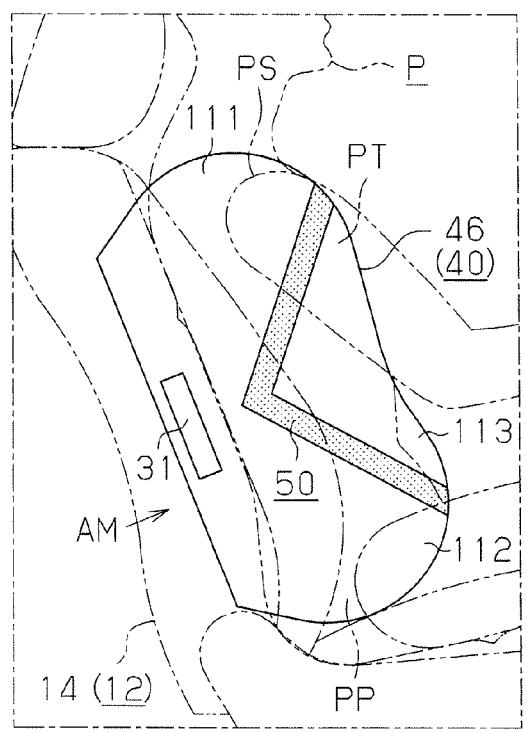
FIG. 45B is a side view showing a modification in which the present invention is applied to a side airbag apparatus that is different from the type according to the first to fifth embodiments.

The shape of the partition member 50 does not necessarily have to be linear and may be non-linear. The partition member 50 having the pressure regulating valve (not shown) may be L-shaped as shown in FIG. 45B. In this case, the inflation portion 46 may be divided into three parts in the substantially vertical direction via the partition member 50. A part located diagonally rearward and upward with respect to partition member 50 constitutes an upstream inflation portion 111, a part located diagonally rearward and downward with respect to partition member 50 constitutes an upstream inflation portion 112 and a part surrounded by the partition member 50 constitutes a downstream inflation portion 113.

Although not shown, the partition member 50 may have a semicircular shape.

The concept of the change above can be appropriately applied to the airbag of each of the side airbag apparatus for protecting only the thorax PT, the side airbag apparatus for protecting the site from the thorax PT to the head PH, the side airbag apparatus for protecting the site from the lumbar region PP to the thorax PT (shoulder PS) and the side airbag apparatus for protecting the site from the lumbar region PP to the head PH.

The present invention can also be applied to a different type of side airbag apparatus from that of the airbag apparatus.

Figure 46:
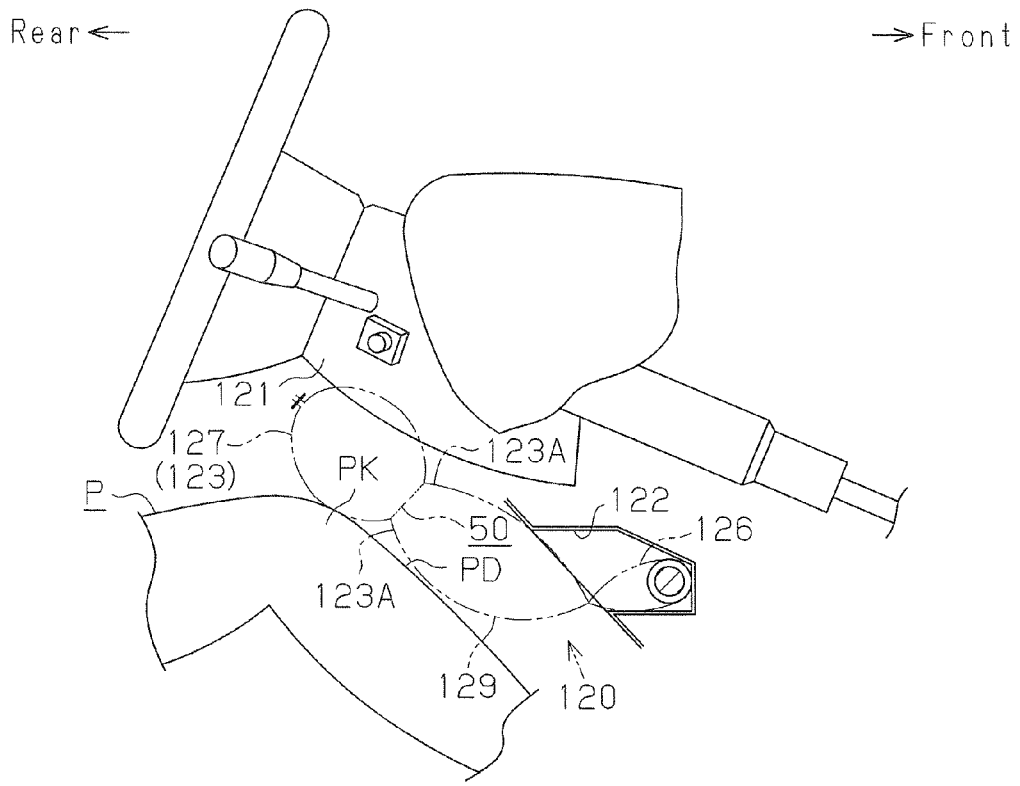
FIG. 46 is a side view showing a modification in which present invention is applied to a knee-protecting airbag apparatus and is a partial side view showing a neighboring portion of a steering column equipped with the airbag, along with a lower limb of the occupant.
Figure 47:
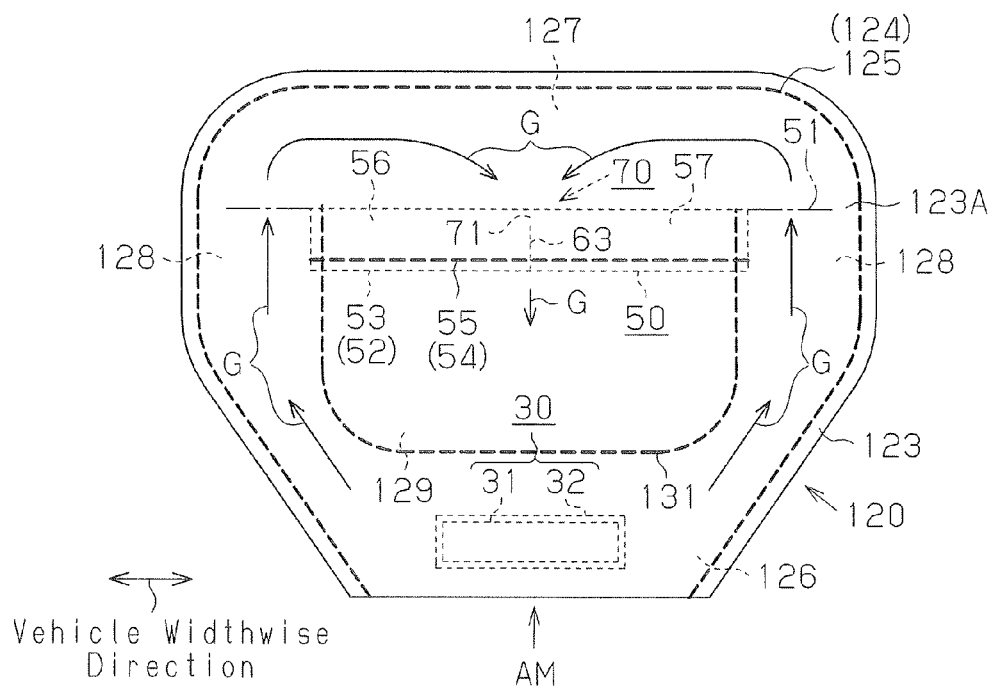
FIG. 47 is a front view showing the airbag module in the uninflated and deployed state in a modification in FIG. 46.

Examples of different types of side airbag apparatus include a knee-protecting airbag apparatus 120 shown in FIGS. 46 and 47. As shown in FIG. 46, the knee-protecting airbag apparatus 120 is inflated in front of and below the lower limb of the occupant P seated in the vehicle seat (not shown) to protect a site from shins PD to knees PK of the occupant P. The knee-protecting airbag apparatus 120 is stored in a storage portion 122 provided below a steering column 121. The storage portion 122 may be provided at an instrument panel in front of and below the occupant seated in a passenger seat.

When an impact applied to the vehicle from the front due to a front collision is detected, an airbag 123 of the knee-protecting airbag apparatus 120 starts to be inflated by the inflation gas, goes out rearward from the storage portion 122, and is inflated and deployed between the occupant P and the steering column 121 in a region from the shins PD to the knees PK of both legs of the occupant P.

In this modification, as shown in FIG. 47, the airbag 123 of the knee-protecting airbag apparatus 120 is formed by joining a pair of front and rear fabric portions 123A with each other via a fringe joint portion 124 provided on fringes of the fabric portions 123A. An inflation portion 125 of the airbag 123 includes an inflator storage portion 126 for storing the inflator assembly 30 therein, an upstream inflation portion 127 for protecting the knees PK, a pair of gas passage parts 128 for guiding the inflation gas G in the inflator storage portion 126 to the upstream inflation portion 127 and a downstream inflation portion 129 located downstream of the upstream inflation portion 127. The inflator storage portion 126 is formed on a lower side of the inflation portion 125 and the upstream inflation portion 127 is formed on an upper side of the inflation portion 125. The downstream inflation portion 129 is formed between the upstream inflation portion 127 and the inflator storage portion 126. The gas passage parts 128 are formed on both side of the downstream inflation portion 129 in the vehicle widthwise direction (the left-right direction in FIG. 47). The inflator storage portion 126 and both gas passage parts 128, and the downstream inflation portion 129 are partitioned by a partition portion 131 substantially U-shaped in a front view. Like the above-described partition portions 95, 103, the partition portion 131 may be configured of a tether formed by installing fabric between the front and rear fabric portions 123A or may be configured of a seam formed by sewing, that is, joining the fabric portions 123A in contact with each other.

The partition member 50 is provided between the upstream inflation portion 127 and the downstream inflation portion 129. When being tensioned to be planar upon inflation of the inflation portion 125, the partition member 50 has a length in the longitudinal direction (the left-right direction in FIG. 47) that is longer than a length in the transverse direction perpendicular to the longitudinal direction.

The partition member 50 is formed of the two members 56, 57 aligned in the vehicle widthwise direction along the bend line 51. The members 56, 57 are joined with each other via the inner joint portion 63 extending in the direction substantially perpendicular to the bend line 51. A part across the bend line 51 is not provided with the inner joint portion 63 for joining the members 56, 57 with each other. The part where the inner joint portion 63 is not provided and joint is undone constitutes the slit-like inner opening 71 for communicating the upstream inflation portion 127 to the downstream inflation portion 129.

In FIG. 47, the partition member 50 folded in half is disposed in the inflation portion 125 in the uninflated and deploy state such that the bend line 51 is located upstream of the opposing ends 52, 53 (the upper side in FIG. 47). The opposing ends 52, 53 are joined with the corresponding fabric portions 123A via the outer joint portions 54, 55. Both ends (left and right ends in FIG. 47) of the partition member 50 in the direction along the bend line 51 (the longitudinal direction) are joined with the fabric portions 123A via a part of the partition portion 131 (an upper end), that is, sewn together.

With such configuration of the knee-protecting airbag apparatus 120, the inflation gas G ejected from the inflator 31 is supplied to the upstream inflation portion 127 through both gas passage parts 128. Due to the inflation gas G, the upstream inflation portion 127 starts to be inflated. The upstream inflation portion 127 is pressed and deformed by the external force generated from restraint of the occupant, thereby increasing the internal pressure to open the pressure regulating valve 70. As a result, the inflation gas G in the upstream inflation portion 127 is supplied to the downstream inflation portion 129. Following the inflation of the upstream inflation portion 127, the downstream inflation portion 129 is inflated. As a result, the upstream inflation portion 127, internal pressure of which earlier increases, can first restrain and protects the knees PK having a higher impact resistance in the lower limb of the occupant P and then, the downstream inflation portion 129, internal pressure of which increases behind the upstream inflation portion 127, can restrain and protect gently the shins PD having a lower impact resistance.

Figure 48:
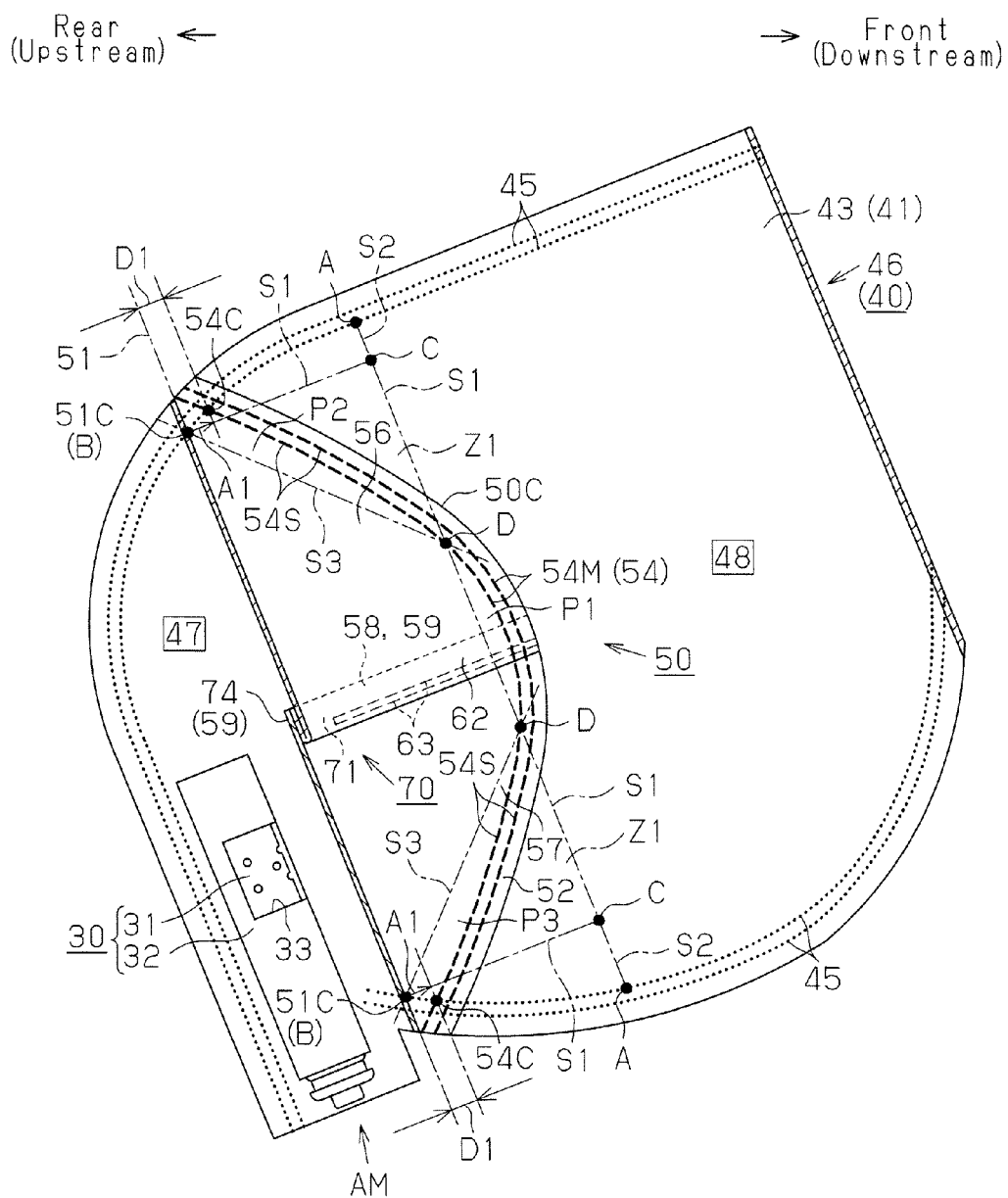
FIG. 48 is a view showing a modification of the outer joint portion of the partition member according to the fifth embodiment and is a partial side sectional view showing the airbag module having the airbag in the uninflated and deployed state, which is cut at the center in the vehicle widthwise direction.

In a modification of the fifth embodiment, as shown in FIG. 48, the shape of the part 54S connecting the fringe joint portion 45 to point D in the outer joint portion 54 may be changed to an arc that bulges from the line segment S3 connecting point B to point D toward point C.

Also in this case, the distance D1 between the intersecting portion 54C of the outer joint portion 54 and the fringe joint portion 45, and the bend line 51 gets close to a minimum value in a possible range.

For this reason, the movement of the intersecting portion 51C of the bend line 51 and the fringe joint portion 45, which is pulled toward the outer joint portion 54, in turn, the pulling force that acts on the intersecting portion 51C can be made close to the minimum value, thereby achieving the same advantage as the above-described advantage (8) of reducing concentration of the stress exerted on the intersecting portion 51C.

Although FIG. 48 shows only members of the airbag 40, which are located on the inner side of the vehicle than the center in the vehicle widthwise direction, the same description also applies to the members on the outer side of the vehicle.

The part 54M connecting point D in the upper set to point D in the lower set in the outer joint portions 54, 55 may be shaped like an arc that bulges so as to become more distant from the bend line 51 as the distance from point D increases.

In the region Z1 surrounded by the line segment S2 connecting point A to point D, the line segment S3 connecting point B to point D, and the fringe joint portion 45, the position of the part 54S connecting the fringe joint portion 45 to point D in the outer joint portion 54 may be changed as long as it is closer to the line segment S3 than the line segment S2.

In the fifth embodiment and the modification of FIG. 48, the edge 50C of the partition member 50 does not necessarily have to extend along the outer joint portions 54, 55. Accordingly, the partition member 50 as in the first embodiment (the edge 50C is linear) may be used.

In each embodiment, the inflator assembly 30 may be provided outside of the airbag 40. In this case, the inflator 31 is connected to the upstream inflation portions 47, 88, 91, 93, 97, 99, 101, 106, 108, 111, 112 and 127 via tubes and the inflation gas G may be supplied from the inflator 31 via the tubes.

In each embodiment, the storage portion 18 may be provided in the body side portion 11 in place of the seat back 14 of the vehicle seat 12 and the airbag module AM may be disposed in the storage portion 18.

(Eighth Embodiment)

Next, an eighth embodiment that embodies the present invention, mainly differences between the eighth embodiment and the first embodiment, will be described with reference to FIGS. 49 to 53.

Figure 49:
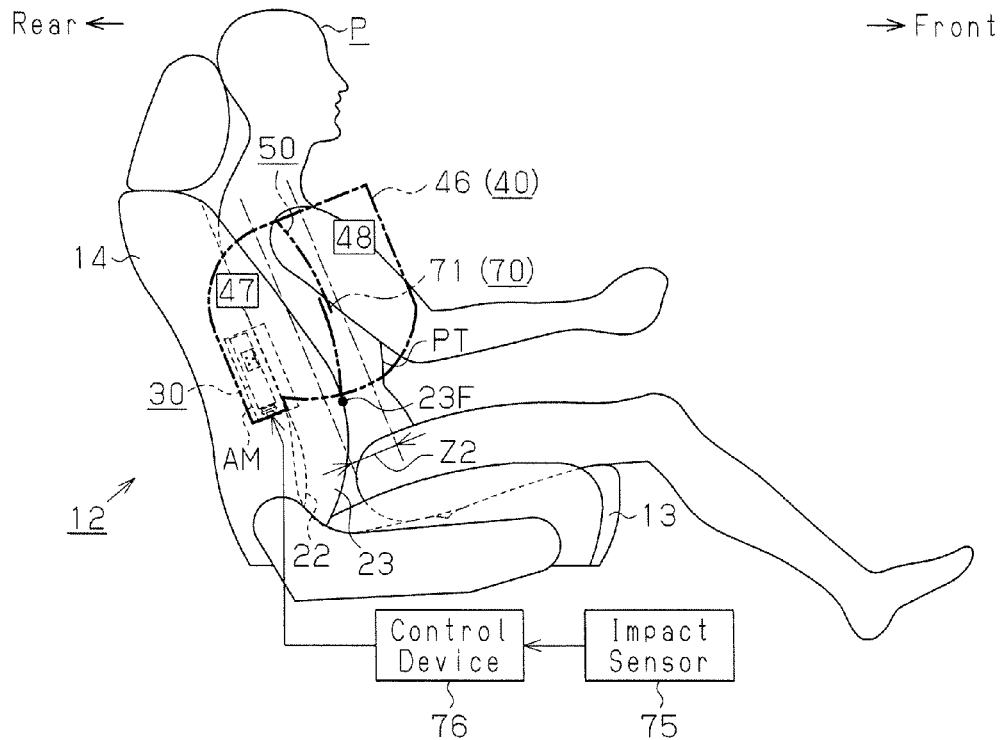
FIG. 49 is a side view showing the vehicle seat provided with the side airbag apparatus along with the occupant according to an eighth embodiment of the present invention.
Figure 50:
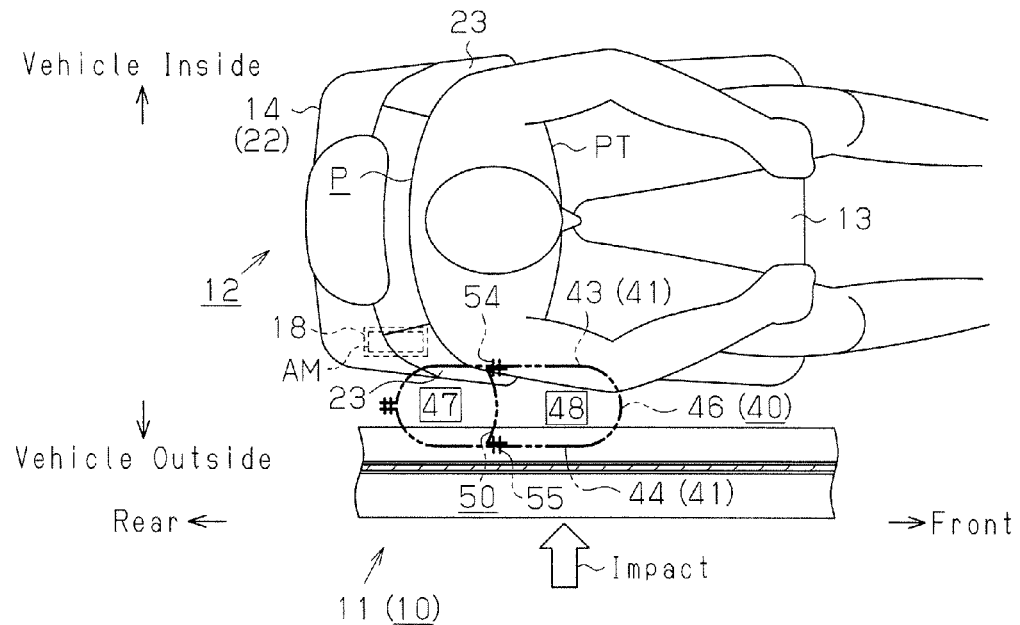
FIG. 50 is a plan sectional view showing a positional relationship among the vehicle seat, the occupant and the body side portion according to the eighth embodiment.

To describe features of the eighth embodiment, a configuration for the seat back 14 will be additionally described. As shown in FIGS. 49 and 50, the seat back 14 includes a seat back main body 22 and a pair of side supports 23 provided on both sides of the seat back main body 22 in the vehicle widthwise direction. The seat back main body 22 is inclined rearward and supports the occupant P from the rear. Both side supports 23 protrude from the seat back main body 22 forward and prevent the occupant P who is seated in the seat cushion 13 and leans on the seat back main body 22 moving in the vehicle widthwise direction.

In the airbag 40, in the state where the upstream inflation portion 47 is inflated and deployed, the inner opening 71, as shown in FIG. 49, is provided so as to be located within a region Z2 between a point away from a front end 23F of the side support 23 in the vehicle seat 12 forward by 85 mm and a point away from the front end 23F rearward by 15 mm. Here, the front end 23F of the side support 23 is a point protruded forward furthest from the seat back main body 22 in the seat back 14. The inner opening 71 is arranged at the above-described point by joining the opposing ends 52, 53 of the partition member 50 with the corresponding fabric portions 43, 44 via the outer joint portions 54, 55 at a place lateral to an intermediate part in the front-back direction of the upper half of the body (for example, the thorax PT) of the occupant P at the time when the inflation portion 46 is inflated (refer to FIG. 50).

If the inner opening 71 is located in front of the above-described region in the state where the upstream inflation portion 47 is inflated and deployed, when an obstacle exists in front of the upstream inflation portion 47, inflation and deployment of the upstream inflation portion 47 may be disturbed by the obstacle. Alternatively, when the inner opening 71 is located in the rear of the above-described region in the state where the upstream inflation portion 47 is inflated and deployed, the upstream inflation portion 47 may have difficulty in breaking the side of the seat back 14 and bursting forward.

The airbag 40 is inflated and deployed as shown in FIGS. 11A to 11C. In the initial stage of inflation and deployment, the above-described inflation of the upstream inflation portion 47 attempts to undo folded state in the order reverse to the order of folding the upstream inflation portion 47. As the upstream inflation portion 47 is inflated while undoing the folded state (being deployed), the side of the seat back 14 is pressed and broken by the airbag 40, and the seat pad 16 of the seat back 14 is pressed by the airbag 40 and broken in the breakable portion 21 (refer to FIG. 3).

Here, in this embodiment, the inner opening 71 is provided so as to be located in the region Z2 in the state where the upstream inflation portion 47 is inflated and deployed. In other words, the inner opening 71 is provided so as to be located in front of the point away from the front end 23F of the side support 23 rearward by 15 mm. This prevents the phenomenon that can occur when the inner opening 71 is located in the rear of the region Z2, that is, the phenomenon that the upstream inflation portion 47 has a difficulty in breaking the side of the seat back 14 and bursting out forward.

Figure 51:
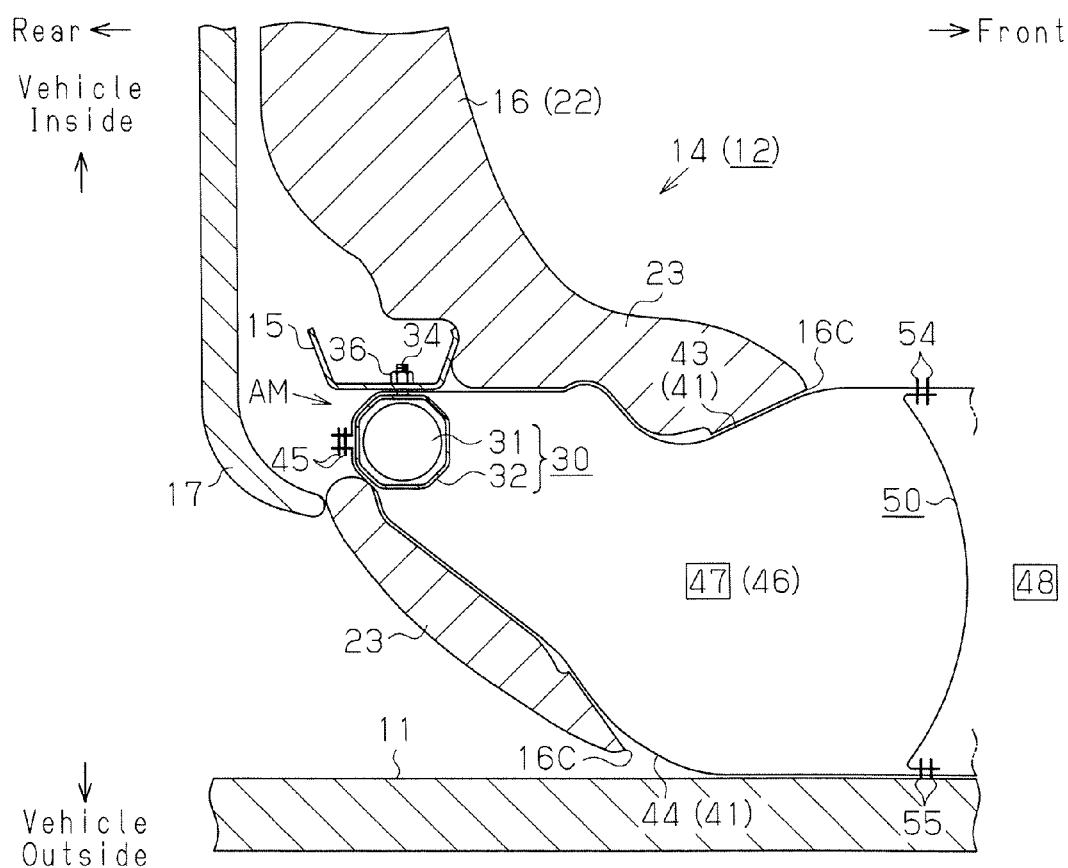
FIG. 51 is a partial sectional plan view showing a state where the airbag bursts out of the vehicle seat and is inflated and deployed with a part being left in the seat back.
Figure 52:
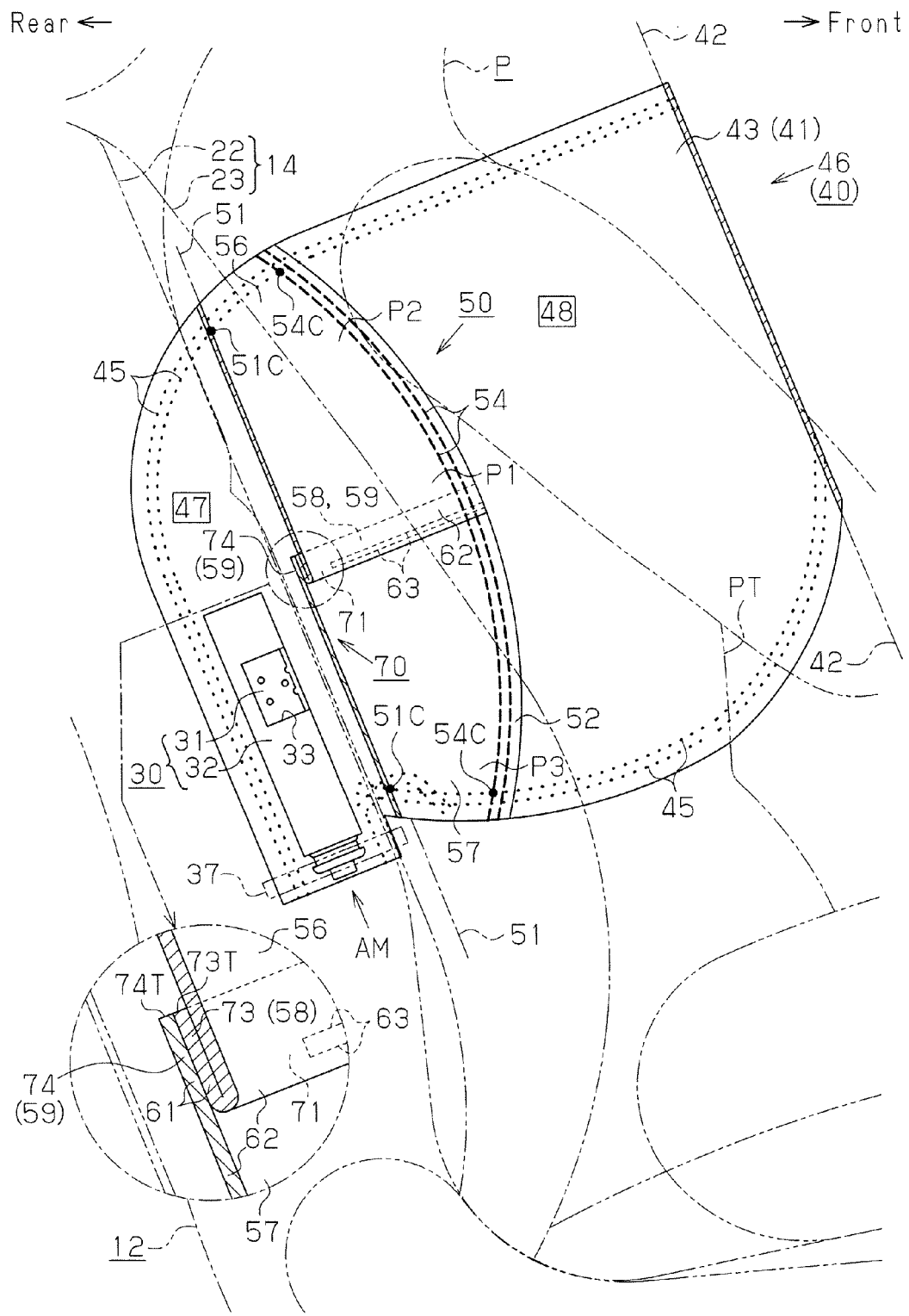
FIG. 52 is a partial side sectional view showing the airbag module having the airbag in the uninflated and deployed state, which is cut at the center in the vehicle widthwise direction, along with the vehicle seat and the occupant.
Figure 53:
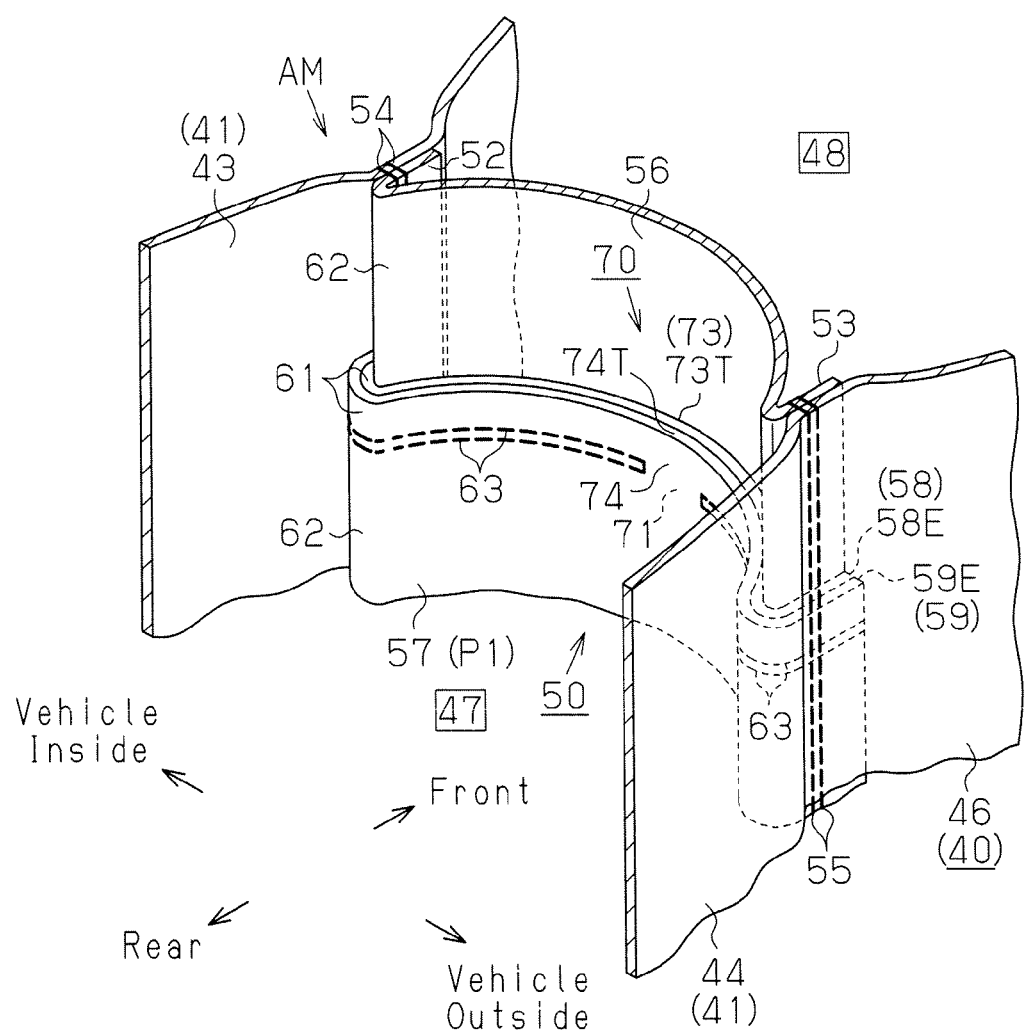
FIG. 53 is a partial perspective view showing the neighboring portion of the pressure regulating valve in the partition member according to the eighth embodiment.

Then, the airbag 40, as shown in FIG. 51, bursts out of the seat back 14 through the breakable portion, with a part (neighboring part of the inflator assembly 30) being left in the seat back 14.

Thereafter, the upstream inflation portion 47 to which the inflation gas G is supplied, as shown in FIG. 50, is deployed while undoing the folded state between the body side portion 11 and the rear half of the upper half of the body (thorax PT, etc.) of the occupant P seated in the vehicle seat 12.

Here, in this embodiment, the inner opening 71 is provided so as to be located in the region Z2 in the state where the upstream inflation portion 47 is inflated and deployed. In other words, the inner opening 71 is provided so as to be located in the rear of the point away from the front end 23F of the side support 23 forward by 85 mm. This prevents the phenomenon that can occur when the inner opening 71 is located in front of the region Z2, that is, the phenomenon that when an obstacle exists in front of the upstream inflation portion 47, inflation and deployment of the upstream inflation portion 47 is disturbed by the obstacle.

Finally, inflation and deployment of the airbag 40 is completed as shown in FIGS. 49 and 50. The relationship between a stroke during inflation and deployment of the airbag 40, and the internal pressure, pressure-receiving area and load of the airbag 40 is shown in FIG. 12.

The eighth embodiment described above in detail can obtain following specific advantages in addition to the advantage obtained in the first embodiment.

The inflation portion 46 of the airbag 40 is partitioned into the upstream inflation portion 47 that receives the inflation gas and the downstream inflation portion 48 that is adjacent to the front side of the upstream inflation portion 47 and receives the inflation gas passing through the upstream inflation portion 47 via the sheet-like partition member 50. The partition member 50 is provided with the inner opening 71 for communicating the upstream inflation portion 47 and the downstream inflation portion 48 to each other, and the pressure regulating valve 70 for opening and closing the inner opening 71 through the pair of valve body portions 73, 74. The valve body portions 73, 74 are pressed by the inflation gas G in the upstream inflation portion 47 and contact each other during inflation of the upstream inflation portion 47 and before restraint of the occupant P to close the inner opening 71, and are separated from each other across the partition member 50 by the external force generated from the restraint when the upstream inflation portion 47 is inflated and restrain the occupant P to open the inner opening 71. Further, the inner opening 71 is provided so as to be located in the region Z2 between the point away from a front end 23F of the side support 23 in the vehicle seat 12 forward by 85 mm and the point away from the front end 23F rearward by 15 mm, in the state where the upstream inflation portion 47 is inflated and deployed (FIG. 49).

For this reason, the partition member 50 can be located at the place pressed from the side at restraint of the occupant P by the upstream inflation portion 47 such that the external force generated from restraint of the occupant P may be easily transmitted to the partition member 50. By bending the partition member 50 such that the valve body portions 73, 74 are easily separated from each other (the pressure regulating valve 70 is easily opened), it becomes possible to properly open the inner opening 71, thereby suitably adjusting the internal pressure of the airbag 40.

Unlike the case where the inner opening 71 is located in front of the region Z2 in the state where the upstream inflation portion 47 is inflated and deployed, the upstream inflation portion 47 can be inflated and deployed without any problem even when the obstacle exists in front of the upstream inflation portion 47. Also, unlike the case where the inner opening 71 is located in the rear of the region Z2 in the state where the upstream inflation portion 47 is inflated and deployed, the upstream inflation portion 47 can break the side of the seat back 14 and burst out of the seat back 14 forward.

(Ninth Embodiment)

Figure 54:
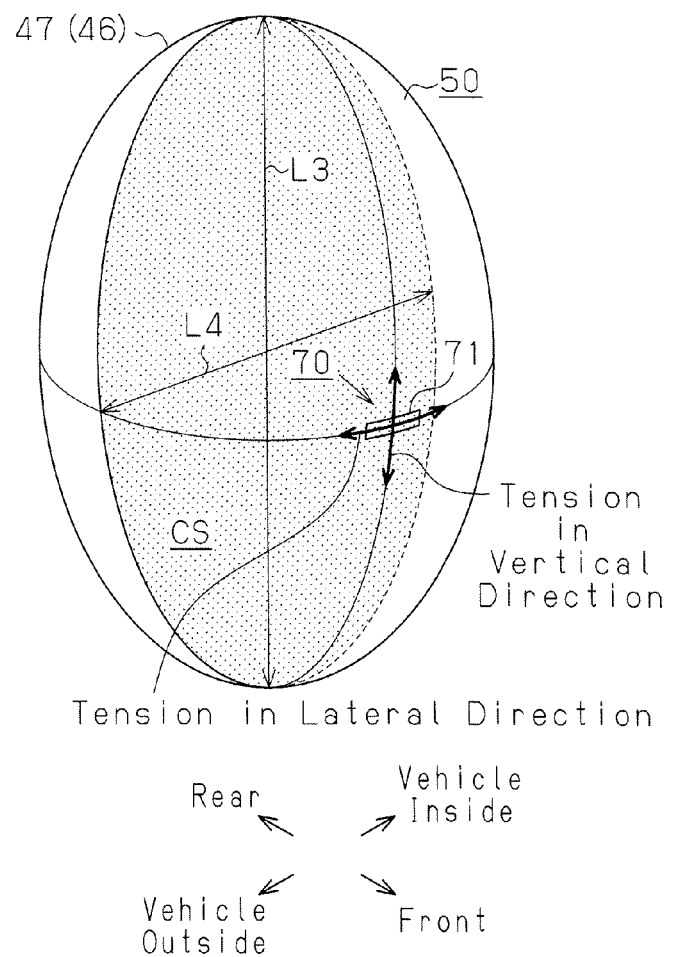
FIG. 54 is a schematic view showing the upstream inflation portion modeled as an ellipsoid according to a ninth embodiment.

Next, a ninth embodiment that embodies the present invention, mainly differences between the eighth embodiment and the first embodiment, will be described with reference to FIG. 9, FIG. 54 and FIG. 55.

Figure 55:
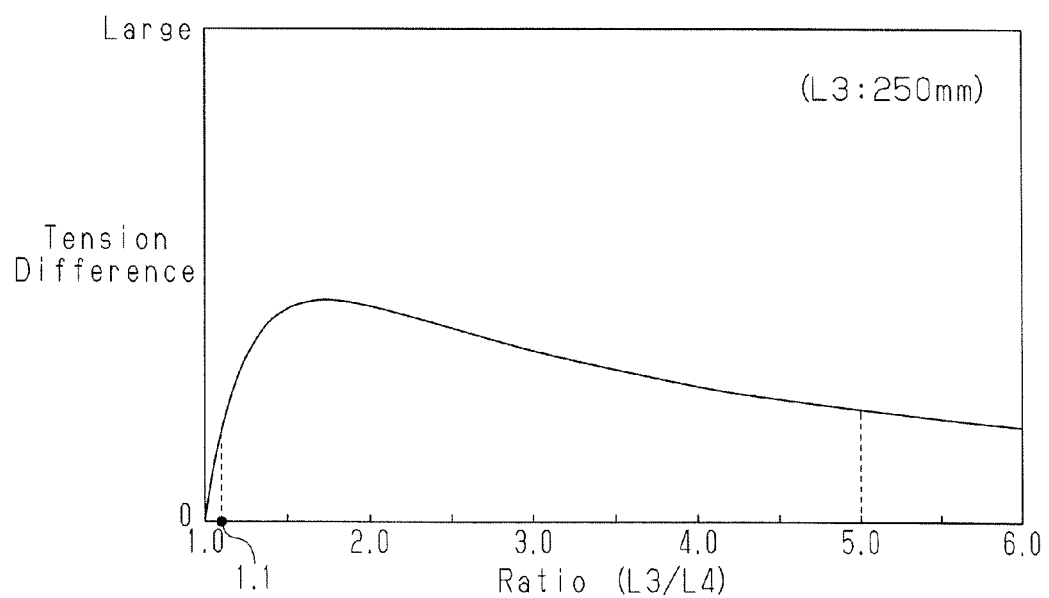
FIG. 55 is a characteristic view showing relationship between a ratio of outer shape of the inflation portion and tension difference according to the ninth embodiment.

In the ninth embodiment, as shown in FIG. 55, the inflation portion 46 in the inflated state has an outer shape having a ratio of a dimension L3 in the vertical direction to a dimension L4 in the widthwise direction of the vehicle seat 12 of 1.1 to 5.0 in a cross section orthogonal to the front-back direction in the place where the partition member 50 is provided.

In the airbag 40, when the upstream inflation portion 47 is inflated, the partition member 50 is inflated like the front half of an ellipsoid. Thus, as shown in FIG. 54, the upstream inflation portion 47 can be modeled as a vertically long ellipsoid. In FIG. 54, a hatched portion denotes a cross section CS orthogonal to the front-back direction in the place where the partition member 50 is provided in the inflation portion 46 in the inflated state.

A long diameter (length of a long axis) of the ellipsoid corresponds to the length L3 in the vertical direction in the outer shape of the inflation portion 46 in the cross section CS, and corresponds to the length L1 in the longitudinal direction of the partition member 50. A short diameter (length of a short axis) of the ellipsoid extending in the vehicle widthwise direction corresponds to the length L4 in the widthwise direction of the vehicle seat 12 in the outer shape of the inflation portion 46 in the cross section CS, and corresponds to the length L2 in the transverse direction of the partition member 50.

The outer shape in the cross section CS can be expressed by the ratio (L3/L4) of the length L3 to the length L4. When the ratio (L3/L4) is larger than 1.0, the outer shape is vertically long.

Here, when the partition member 50 is tensioned in the form of a curved plane with inflation of the upstream inflation portion 47, a tension is applied to the place where the inner opening 71 is provided in the partition member 50. Of the tension, a component applied along the short axis is defined as crosswise tension and a component applied along the long axis is defined as longitudinal tension.

The difference between the crosswise tension and the longitudinal tension (tension difference) correlates the ratio (L3/L4). FIG. 55 shows how the tension difference varies according to the ratio (L3/L4) when the ratio (L3/L4) is varied by changing the length L4 while keeping the length L3 to a constant value (250 mm).

The following is apparent from FIG. 55.

When the ratio (L3/L4) is "1.0", that is, when the outer shape is circular, the crosswise tension is equal to the longitudinal tension. In other words, the tension difference becomes "0", resulting in that the inner opening 71 can be easily opened. In a range where the ratio (L3/L4) is not more than "1.6", the tension difference increases with an increase in the ratio (L3/L4) and becomes maximum when the ratio (L3/L4) is "1.6". In a range where the ratio (L3/L4) is larger than "1.6", the tension difference decreases with an increase in the ratio (L3/L4). When the tension difference is large, a force to close the inner opening 71 is sufficiently larger than a force to open the inner opening 71, resulting in that the inner opening 71 tends to be closed. When the ratio (L3/L4) is "1.6", the tension difference becomes maximum and thus, the inner opening 71 can be closed most easily. In a range where the ratio (L3/L4) is "1.1" to "5.0", it can be considered that the tension difference is large enough to close the inner opening 71.

On the other hand, when the body side portion 11 enters toward the inside of the vehicle due to side collision and the like, the body side portion 11 allows the inflation portion 46 in the inflated state to be pressed against the upper half of the body (thorax PT, etc.) of the occupant P, thereby restraining the upper half of the body (thorax PT, etc.).

At this time, the inflation portion 46 is pressed and deformed by the external force generated from restraint of the occupant. In this connection, the tension strongly applied to the partition member 50 in the widthwise direction of the vehicle seat 12 decreases and the tension applied in the vertical direction increases. Through such change in tension, the tension difference between both directions becomes smaller, resulting in that the valve body portions 73, 74 are bent and separated from each other across the partition member 50 to open the inner opening 71.

There is correspondence between the external force applied to the inflation portion 46 at restraint of the occupant, which is required to open the closed inner opening 71, and the ratio (L3/L4).

As the ratio (L3/L4) increases (the outer shape of the inflation portion 46 in the cross section CS becomes longer in the vertical direction), a larger external force applied to the inflation portion 46 at restraint of the occupant is required, in order to open the inner opening 71. However, when the large external force is applied to the inflation portion 46, the load applied from the airbag 40 to the upper half of the body (for example, thorax PT) of the occupant P at restraint of the occupant also increases. An experiment demonstrated that as long as the ratio (L3/L3) was not more than "5.0", the load applied to the occupant P fell within an allowable range, even if the external force was applied. By the way, the tension difference in the case of the ratio (L3/L4) of "5.0" is similar to the tension difference in the case of the ratio (L3/L4) of "1.1".

In consideration of the above-described subject matter, in order to close the inner opening 71 before restraint of the occupant and to open the inner opening 71 while suppressing excessive load to the occupant P during restraint of the occupant, it is essential that the ratio (L3/L4) falls within the range of 1.1 to 5.0. The ratio (L3/L4) is preferably, 1.2 to 4.5 and more preferably, 1.4 to 2.0. In the side airbag apparatus according to this embodiment that protects the upper half of the body (mainly, the thorax PT) of the occupant P and has the relatively short length L3, the ratio (L3/L4) is set to "1.6".

Next, operation of this embodiment will be described.

In the process of inflation and deployment of the airbag 40, as shown in FIG. 11C, when the width W1 of the inner opening 71 is larger than the sum (=2·W2) of the valve body portions 73, 74, the front ends 73T, 74T are separated from each other. As a result, the pressure regulating valve 70 is opened, thereby canceling flow restriction. This cancellation of prevention enables the inflation gas G in the upstream inflation portion 47 to flow to the downstream inflation portion 48 through the inner opening 71 and between both valve body portions 73, 74 in this order.

Here, as described above, as the ratio (L3/L4) increases (the outer shape of the inflation portion 46 in the cross section CS becomes longer in the vertical direction), a larger external force to open the inner opening 71 is required. However, when a large external force is applied to the inflation portion 46, the load applied from the airbag 40 to the upper half of the body (for example, thorax PT) of the occupant P at restraint of the occupant also becomes large.

In this regard, if the ratio (L3/L4) is not more than 5.0, even when the external force is applied, the load applied to the occupant P falls within the allowable range. In this embodiment, the ratio (L3/L4) is set to 1.6, which is smaller than 5.0. This proper setting of the ratio (L3/L4) prevents the external force required to open the inner opening 71 from being excessive. As a result, when the sufficiently large external force is applied to the inflation portion 46 at restraint of the occupant, the difference between the longitudinal tension and the crosswise tension becomes small and thus, the inner opening 71 is opened. It is prevented that the excessive load is applied to the occupant P when the inner opening 71 is opened.

The ninth embodiment described above in detail can obtain following specific advantages in addition to the advantage obtained in the first embodiment.

The inflation portion 46 of the airbag 40 is partitioned into the upstream inflation portion 47 that receives the inflation gas and the downstream inflation portion 48 that is adjacent to the front side of the upstream inflation portion 47 and receives the inflation gas passing through the upstream inflation portion 47 via the sheet-like partition member 50. The partition member 50 is provided with a pressure regulating valve 70 including the inner opening 71 that is shaped like a slit extending in the widthwise direction of the vehicle seat 12 and communicates the upstream inflation portion 47 to the downstream inflation portion 48 and the pair of valve body portions 73, 74 for opening and closing the inner opening 71. The valve body portions 73, 74 are pressed by the inflation gas G in the upstream inflation portion 47 and contact each other during inflation of the upstream inflation portion 47 and before restraint of the occupant P to close the inner opening 71 (FIG. 11A). And, the valve body portions 73, 74 are pressed by the inflation gas G in the upstream inflation portion 47 and contact each other during inflation of the upstream inflation portion 47 and before restraint of the occupant P to close the inner opening 71, and are separated from each other across the partition member 50 by the external force generated from the restraint when the upstream inflation portion 47 is inflated and restrain the occupant P to open the inner opening 71 (FIG. 11C). Further, the inflation portion 46 in the inflated state has an outer shape having the ratio (L3/L4) of the length (L3) in the vertical direction to the length (L4) in the widthwise direction of the vehicle seat 12 in a range of 1.1 to 5.0 in the cross section CS orthogonal to the front-back direction in the place where the partition member 50 is provided (refer to FIG. 54).

For this reason, before restraint of the occupant, it is possible to close the inner opening 71 by the crosswise tension that is larger than the longitudinal tension and increase only the internal pressure of the upstream inflation portion 47. Further, during restraint of the occupant, it is possible to open the inner opening 71 while suppressing the excessive load on the occupant P and to decrease the internal pressure of the upstream inflation portion 47 as well as to increase the internal pressure of the downstream inflation portion 48. In this manner, the inner opening 71 can be properly opened or closed, thereby suitably adjusting the internal pressure of each of the upstream inflation portion 47 and the downstream inflation portion 48.

The eighth and ninth embodiments can be embodied by following another embodiment.

<Concerning Partition Member 50>

The upper member 56 of the partition member 50 may be divided into two along the bend line 51. Similarly, the lower member 57 may be divided into two along the bend line 51.

The opposing end 52 of the partition member 50 may be joined with the fabric portion 43 of the airbag 40 in the upstream inflation portion 47 or within the downstream inflation portion 48. Similarly, the opposing end 53 of the partition member 50 may be joined with the fabric portion 44 of the airbag 40 within the upstream inflation portion 47 or within the downstream inflation portion 48.

One of the opposing ends 52, 53 may be joined within the upstream inflation portion 47 and the other of the opposing ends 52, 53 may be joined within the downstream inflation portion 48.

The inner opening 71 and the inner joint portion 63 does not necessarily have to be provided in the direction perpendicular to the bend line 51 of the partition member 50 and may be provided in the direction diagonally intersecting the bend line 51 of the partition member 50.

The partition member 50 may be formed of a single member 86 (fabric).

In the overlapping portions 61, the parts corresponding to the inner opening 71 (neighboring portions of the inner opening 71, more precisely, portions between the inner opening 71 and the edges 58E, 59E) act as the valve body portions 73, 74. For this reason, as long as during inflation of the upstream inflation portion 47, at least the front ends 73T, 74T of the valve body portions 73, 74 contact each other and are closed, the shape of the portion that does not correspond to the inner opening 71 (non-neighboring portion) in the overlapping portions 61 may be changed. For example, the portion that does not correspond to the inner opening 71 (non-neighboring portion) in the overlapping portions 61 may be partially or entirely joined. This joint may be made through sewing or bonding. Such change can prevent the phenomenon that only the portions that correspond to the inner opening 71 operate as the valve body portions 73, 74 and the portion that does not correspond to the inner opening 71 unnecessarily moves, for example, flaps.

In addition, a notch may be formed at least a part of the portion that does not correspond to the inner opening 71 in the overlapping portions 61.

The partition member 50 and the valve body portions 73, 74 may be formed of different members.

The bend line 51 of the partition member 50 folded in half may be slightly inclined relative to the vertical direction.

The place where joining between the inner joint portions 63 is undone does not necessarily have to be provided in the place across the bend line 51 and may be provided in the place out of the bend line 51 in the direction orthogonal to the bend line 51.

There may be plural places where joint between the inner joint portions 63 is undone.

Before inflation of the inflation portion 46, the pair of overlapping portions 61 including the valve body portions 73, 74 may be provided in the downstream inflation portion 48 in place of the upstream inflation portion 47.

The partition member 50 folded in half by being folded along the bend line 51 extending in the longitudinal direction such that the opposing ends 52, 53 are close to each other may be disposed in the uninflated and deployed inflation portion 46 in the state where the bend line 51 is located downstream of the opposing ends 52, 53. In this case, before inflation of the inflation portion 46, the pair of overlapping portions 61 including the valve body portions 73, 74 may be provided in the downstream inflation portion 48.

<Concerning Inflation Portion 46>

The airbag 40 may be formed of the inflation portion 46 substantially wholly as in the above-described embodiments, or may partially include an uninflation portion that does not receive the inflation gas G and is uninflated.

The inflation portion 46 may be partitioned into three or more sections via the partition member. In this case, of two sections adjacent in the flowing direction of the inflation gas G across the partition member in the inflation portion 46, the section located on the upstream side is defined as the upstream inflation portion and the section located on the downstream side is defined as the downstream inflation portion. Then, the partition member between the upstream inflation portion and the downstream inflation portion is provided with the pressure regulating valve.

The outer shape of the inflation portion 46 in the inflated state, in the cross section CS orthogonal to the front-back direction in the place where the partition member 50 is provided, may be changed as long as the ratio (L3/L4) falls within the range of 1.1 to 5.0.

<Concerning Inflator Assembly 30>

The inflator assembly 30 may be provided outside of the airbag 40. In this case, the inflator 31 may be connected to the upstream inflation portion 47 via a pipe and the inflation gas G may be supplied from the inflator 31 to the upstream inflation portion 47 via the pipe.

<Concerning Objects to be Protected by the Side Airbag Apparatus>

Although the above-described embodiments describe the side airbag apparatus for protecting the upper half of the body (for example, thorax PT) of the occupant P as an example, the present invention can be applied to a side airbag apparatus for protecting the other sites of the occupant P, for example, various sites including the site from the thorax PT to the head, the site from the lumbar region to the thorax (shoulder) and the site from the lumbar region to the head from the impact from the side collision.

<Others>

The present invention can also be applied to a side airbag apparatus for protecting an occupant P from an impact given to the vehicle seat 12 disposed in a vehicle, in which the seat back 14 is oriented in the direction other than forward in the vehicle, for example, sideward, from the side (in the front-back direction of the vehicle) against the occupant P.

As the object to be protected becomes longer in the vertical direction of the airbag module AM, the length L3 also becomes longer and a preferable value of the ratio (L3/L4) increases accordingly. For example, in the side airbag apparatus for protecting the site from the lumbar region to thorax (shoulder), the ratio (L3/L4) may be set to about "4.3" that is larger than the value in the above-described embodiments.

Vehicles to which the side airbag apparatus according to the present invention include various industrial vehicles in addition to private automobiles.

The present invention can also be applied to a side airbag apparatus equipped in the vehicle seats in vehicles other than automobiles, including airplanes and ships.

The invention claimed is:

1. An airbag apparatus comprising:
   an airbag that is planar before supply of inflation gas and is inflated by supply of the inflation gas;
   an entire inflation portion provided in the airbag;
   a partition member that partitions the entire inflation portion into at least an upstream inflation portion and a downstream inflation portion; and
   a pressure regulating valve that is closed at an early stage of a supply period of the inflation gas to the entire inflation portion, thereby restricting flow of the inflation gas from the upstream inflation portion to the downstream inflation portion, and is opened from the middle of the supply period to cancel the restriction, wherein
   the partition member has a length in a longitudinal direction that is longer than a length in a transverse direction perpendicular to the longitudinal direction when being tensioned to be planar upon inflation of the entire inflation portion, and
   the pressure regulating valve includes:
   a slit-like inner opening that is provided on the partition member and extends in the transverse direction of the partition member; and
   a pair of valve body portions that are provided around the inner opening and are selectively close to and separated from each other,
   wherein the pair of valve body portions are constituted by a pair of overlapping portions, the pair of valve body portions, whole surfaces of the slit-like inner opening, and when an internal pressure is applied to the overlapping portions, whole surfaces of the overlapping portions are pressed by the internal pressure and in close contact with each other, and the overlapping portions are brought into a self-sealing state.

2. The airbag apparatus according to claim 1, wherein from the middle of the supply period, the pressure regulating valve is opened by an external force caused by restraint of an occupant with the airbag.

3. The airbag apparatus according to claim 1, wherein the overlapping portions extend in the transverse direction of the partition member,
   each of the valve bod portins is formed at a position corresponding to the inner opening in each of the overlappin portions,
   The overlapping portions are bent alog a bundary betwee the overlappig portions and non-overlapping portion of the partition member, and are joined with the airbag at both ends of the partition member in the transverse direction, and before inflation of the entire inflation portion, both of the ovelapping portions are disposed in the downstream inflation portion.

4. The airbag apparatus according to claim 1, wherein before inflation of the entire inflation portion, both of the valve body portions are disposed in the upstream inflation portion.

5. The airbag apparatus according to claim 1, wherein the partition member has opposing ends facing each other and is bent in half by being folded along a bend line extending in the longitudinal direction of the partition member such that the opposing ends are close to each other, and the partition member folded in half is disposed in the entire inflation portion in an uninflated and deployed state in the state where the bend line is located upstream of the opposing ends, and is joined with the airbag at both opposing ends and both ends in a direction along the bend line.

6. The airbag apparatus according to claim 1, wherein the partition member has opposing ends facing each other and is bent in half by being folded along a bend line extending in the longitudinal direction of the partition member such that the opposing ends are close to each other, and the partition member folded in half is disposed in the entire inflation portion in an uninflated and deployed state in the state where the bend line is located downstream of the opposing ends, and is joined with the airbag at both opposing ends in a direction along the bend line.

7. The airbag apparatus according to claim 1, wherein the airbag includes a pair of fabric portions and is formed by joining the fabric portions with each other with a fringe joint portion provided along fringes of the fabric portions, the partition member includes opposing ends facing each other, is folded in half such that the opposing ends are close to each other by being folded along a bend line extending in the longitudinal direction of the partition member before supply of the inflation gas, is disposed between the fabric portions of the airbag in the folded state, is joined with the fabric portions at the opposing ends via outer joint portions, and is joined with the fabric portions at both ends in the longitudinal direction of the partition member via the fringe joint portion, and each of the outer joint portions joins the opposing ends with the fabric portions such that the distance between each of the outer joint portions and the bend line is smaller at an intersecting portion with the fringe joint portion than at an intermediate part of the partition member in the longitudinal direction.

8. The airbag apparatus according to claim 7, wherein a part of each of the outer joint portions extends in parallel to the bend line, and given that a point where a line segment along the part of each outer joint portion and the fringe joint portion intersect each other is point A, a point where the bend line and the fringe joint portion intersect each other is point B, a point where a line segment that passes point B and is perpendicular to the bend line and the outer joint portion intersect each other is point C, and a point that is on the outer joint portion and away from point C in a direction toward the pressure regulating valve by the same length as the line segment is point D, in a region surrounded by a line segment connecting point A to point D, a line segment connecting point B to point D, and the fringe joint portion, a part connecting the fringe joint portion to point D in the outer joint portion is provided closer to the line segment connecting point B to point D than to the line segment connecting point A to point D.

9. The airbag apparatus according to claim 8, wherein the part connecting the fringe joint portion to point D in the outer joint portion is linear so as to extend along the line segment connecting point B to point D.

10. The airbag apparatus according to claim 8, wherein the part connecting the fringe joint portion to point D in the outer joint portion is shaped like an arc that bulge from the line segment connecting point B to point D toward point C.

* * * * *